US012698616B2

(12) United States Patent
Nishi

(10) Patent No.: US 12,698,616 B2
(45) Date of Patent: Aug. 4, 2026

(54) MACHINE CONTROLS FOR TRAILER LOADING/UNLOADING

(71) Applicant: SUMITOMO CONSTRUCTION MACHINERY CO., LTD., Tokyo (JP)

(72) Inventor: Takashi Nishi, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 560 days.

(21) Appl. No.: 17/319,423

(22) Filed: May 13, 2021

(65) Prior Publication Data

US 2021/0262195 A1    Aug. 26, 2021

Related U.S. Application Data

(63) Continuation of application No. PCT/JP2019/044787, filed on Nov. 14, 2019.

(30) Foreign Application Priority Data

Nov. 14, 2018    (JP) ................................. 2018-214163

(51) Int. Cl.
*E02F 9/20* (2006.01)
*E02F 9/24* (2006.01)
(Continued)

(52) U.S. Cl.
CPC ................ *E02F 9/205* (2013.01); *E02F 9/24* (2013.01); *E02F 9/26* (2013.01); *G05B 19/4155* (2013.01);
(Continued)

(58) Field of Classification Search
CPC ..... E02F 9/205; E02F 9/24; E02F 9/26; E02F 9/123; E02F 9/2203; E02F 9/2271;
(Continued)

(56) References Cited

U.S. PATENT DOCUMENTS 9,889,850 B2    2/2018    Vandapel
10,549,681 B2    2/2020    Ogihara et al.
(Continued)

FOREIGN PATENT DOCUMENTS

JP        H04-129848        4/1992
JP        H07-082767        3/1995
(Continued)

OTHER PUBLICATIONS

International Search Report for PCT/JP2019/044787 mailed on Feb. 10, 2020.

*Primary Examiner* — Abby J Flynn
*Assistant Examiner* — Sean Patrick Reidy
(74) *Attorney, Agent, or Firm* — IPUSA, PLLC

(57) ABSTRACT

A shovel includes a lower-traveling structure; an upper turning structure which is turnably mounted to the lower traveling structure; and a processing circuitry provided in the upper turning structure, wherein the processing circuitry is configured to, upon receipt of a predetermined command from a predetermined external device, cause the lower-traveling structure to travel either toward a bed of a trailer or from the bed to a rear area of the trailer. A support device configured to support a shovel in loading or unloading a trailer, the support device includes a transmitter configured to transmit, to the shovel, a command for an automatic traveling of the shovel in response to a user's operation so that a lower-traveling structure of the shovel travels from a rear of the trailer to an upper surface of the trailer, or travels from the upper surface of the trailer to the rear of the trailer.

12 Claims, 20 Drawing Sheets

(51) Int. Cl.

| | |
|---|---|
| *E02F 9/26* | (2006.01) |
| *G05B 19/4155* | (2006.01) |
| *G06F 3/14* | (2006.01) |
| *G06V 20/56* | (2022.01) |
| *G06V 40/10* | (2022.01) |
| *E02F 9/12* | (2006.01) |
| *E02F 9/22* | (2006.01) |

(52) U.S. Cl.
CPC .............. *G06F 3/14* (2013.01); *G06V 20/56* (2022.01); *G06V 40/10* (2022.01); *E02F 9/123* (2013.01); *E02F 9/2203* (2013.01); *E02F 9/2271* (2013.01); *E02F 9/2285* (2013.01); *E02F 9/2292* (2013.01); *E02F 9/2296* (2013.01); *G05B 2219/45207* (2013.01)

(58) Field of Classification Search
CPC ..... E02F 9/2285; E02F 9/2292; E02F 9/2296; E02F 9/003; E02F 9/2045; E02F 9/262; E02F 9/265; E02F 9/268; E02F 9/2282; E02F 9/20; E02F 3/435; G05B 19/4155; G05B 2219/45207; G06F 3/14; G06V 20/56; G06V 40/10; G05D 2201/0202; B60P 3/062
USPC ........................................................ 701/2
See application file for complete search history.

(56) References Cited

U.S. PATENT DOCUMENTS

| | | | | |
|---|---|---|---|---|
| 10,876,273 | B2 | 12/2020 | Kozui et al. | |
| 2013/0323006 | A1* | 12/2013 | Smithson | B60P 3/077 |
| | | | | 414/812 |
| 2013/0338848 | A1* | 12/2013 | Park | G01C 9/06 |
| | | | | 701/1 |
| 2015/0352721 | A1* | 12/2015 | Wicks | G06V 20/10 |
| | | | | 700/228 |
| 2019/0204821 | A1* | 7/2019 | Yoon | G05D 1/0223 |
| 2020/0042003 | A1* | 2/2020 | Pfaff | G05D 1/0221 |
| 2020/0071908 | A1* | 3/2020 | Cherney | E02F 9/265 |
| 2020/0089222 | A1* | 3/2020 | Cámara Puerto | G05D 1/0231 |

FOREIGN PATENT DOCUMENTS

| | | |
|---|---|---|
| JP | 2001-187562 | 7/2001 |
| JP | 2002-304441 | 10/2002 |
| JP | 2008-002172 | 1/2008 |
| JP | 2010-198519 | 9/2010 |
| JP | 2011-230653 | 11/2011 |
| JP | 2013-238097 | 11/2013 |
| JP | 2016-024685 | 2/2016 |
| JP | 2016-045674 | 4/2016 |
| JP | 2016-172963 | 9/2016 |
| JP | 2017-182723 | 10/2017 |
| JP | 2018-159194 | 10/2018 |

* cited by examiner

SYS

100

200

300

MACHINE CONTROLS FOR TRAILER LOADING/UNLOADING

CROSS-REFERENCE TO RELATED APPLICATIONS

This U.S. non-provisional application is a continuation of PCT International Application PCT/JP2019/044787 filed on Nov. 14, 2019 and designated the U.S., which is based on and claims priority to Japanese Patent Application No. 2018-214163 filed on Nov. 14, 2018, with the Japan Patent Office. The entire contents of these applications are incorporated herein by reference.

BACKGROUND OF THE INVENTION

1. Field of the Invention

This disclosure relates to a shovel (i.e., an excavator) and the like.

2. Description of the Related Art

A shovel is typically loaded on a trailer and transported to a work site.

For example, Japanese Patent Application Laid-Open discloses a trailer in which a ramp plate capable of raising and lowering is positioned at the rear of the trailer.

SUMMARY OF THE INVENTION

Problem to be Solved by the Invention

However, for a shovel to be transported by a trailer and used on a job site, it is necessary to load and unload the shovel from the trailer (unloading the shovel from the trailer). Therefore, depending on the parking status of the trailer and the topography of the place where the trailer is parked, for example, the ramp plate may tilt to the left or right, and the posture stability of the shovel may be reduced during loading and unloading work of the trailer.

In view of the above problem, the object of the disclosure is to provide a technique that allows an operator to load and unload a shovel on a trailer without boarding a cabin of the shovel.

Means for Solving the Problem

In order to achieve the above, one aspect of the present disclosure provides a shovel including a lower traveling structure; an upper turning structure which is turnably mounted to the lower traveling structure; and a processing circuitry provided in the upper turning structure, wherein the processing circuitry is configured to, upon receipt of a predetermined command from a predetermined external device, cause the lower traveling structure to travel either toward a trailer bed or from the trailer bed to a rear area of the trailer.

Another aspect of the present disclosure provides a control device for a shovel, the shovel including a lower traveling structure and an upper turning structure turnably mounted on the lower traveling structure, the processing circuitry includes a control device configured to, upon receipt of a predetermined command from a predetermined external device, cause the lower traveling structure to travel either toward a bed of a trailer or from the bed to a rear area of the trailer.

Another aspect of the present disclosure provides a support device for a shovel configured to support a shovel in loading or unloading a trailer, the support device includes a transmitter configured to transmit, to the shovel, a command for an automatic traveling of the shovel in response to a user's operation so that a lower traveling structure of the shovel travels from a rear of the trailer to an upper surface of the trailer, or travels from the upper surface of the trailer to the rear of the trailer.

Effects of the Invention

According to the embodiments described above, a technique can be provided that allows an operator to load and unload a shovel on a trailer without boarding a cabin of the shovel.

DETAILED DESCRIPTION OF THE PREFERRED EMBODIMENTS

Hereinafter, embodiments for carrying out the invention with reference to the drawings will be described.

An Example of Support System

First, an overview of an example of a support system SYS according to the present embodiment will be explained with reference to FIG. 1.

Figure 1:
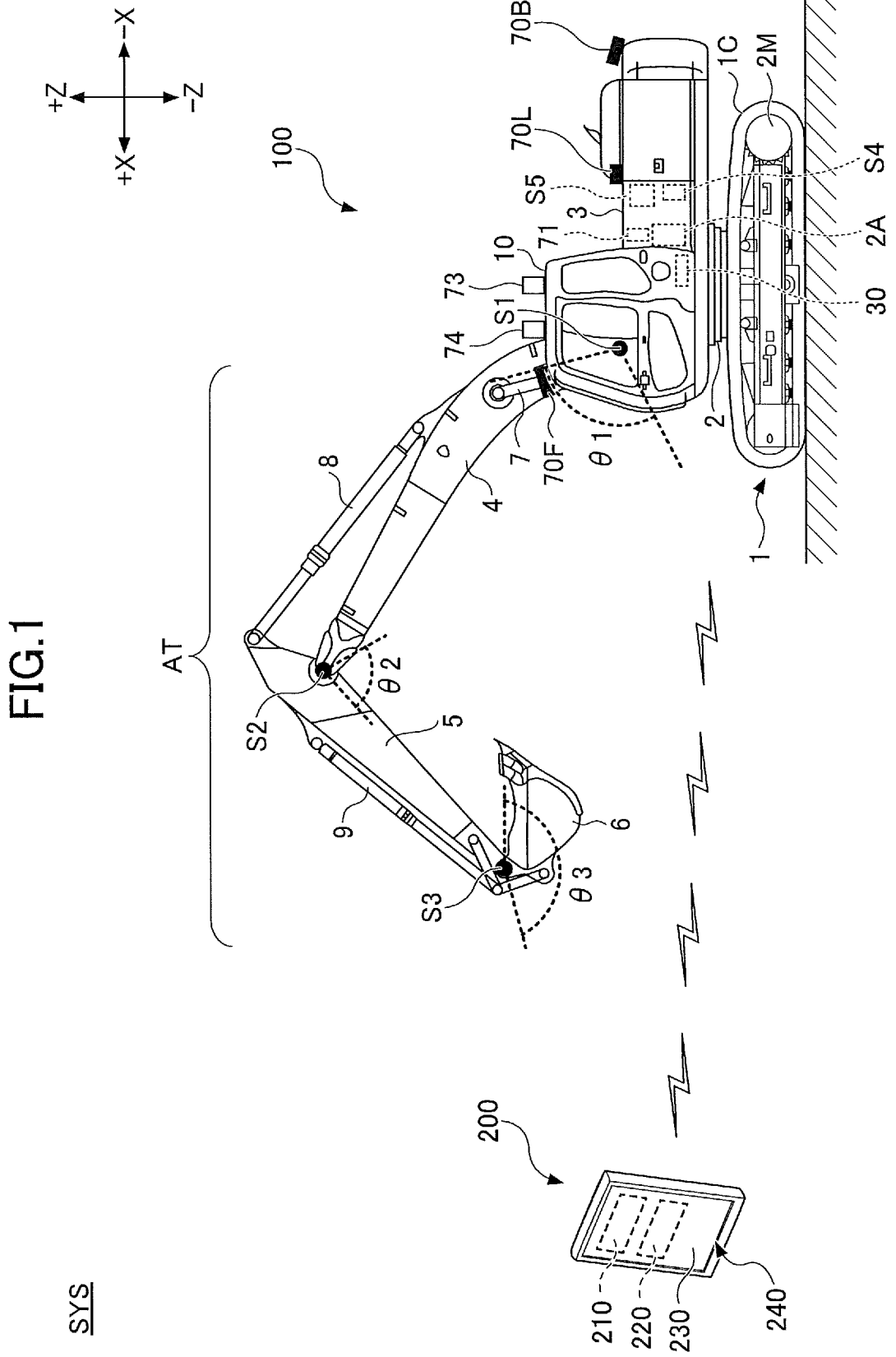
FIG. 1 is a schematic diagram illustrating an example of a configuration of a support system.

FIG. 1 is a schematic diagram illustrating an example of the configuration of the support system SYS according to the present embodiment.

The support system SYS includes a shovel 100 and a support device 200, to support loading a shovel 100 on a trailer and unloading the shovel 100 from trailer.

<Overview of Shovel>

The shovel 100 according to the present embodiment includes a lower traveling structure 1, an upper turning structure 3 mounted to the lower traveling structure 1 so as to be turnable via a turning mechanism 2, and an attachment AT constituting a boom 4, an arm 5, a bucket 6, and a cabin 10.

The lower traveling structure 1 includes a pair of left and right crawlers 1C, specifically, a left crawler 1CL and a right crawler 1CR, as described below. In the lower traveling structure 1, the left crawler 1CL and the right crawler 1CR are hydraulically driven by the traveling hydraulic oil motor 2M (2ML and 2MR), respectively, to drive the shovel 100.

The upper turning structure 3 is driven by a turning hydraulic oil motor 2A and turns with respect to the lower traveling structure 1.

The boom 4 is pivotally mounted to a front center of the upper turning structure 3 in a manner of being able to move up and down, the arm 5 is rotatably mounted to the nose of the boom 4 in a vertical direction, and the bucket 6 as an end attachment is rotatably mounted to the nose of the arm 5 in a vertical direction. The boom 4, arm 5, and bucket 6 are hydraulically driven by a boom cylinder 7, an arm cylinder 8, and a bucket cylinder 9, respectively, as hydraulic actuators.

The cabin 10 is an operator room in which an operator onboards, and is mounted on the front left side of the upper turning structure 3.

The shovel 100 operates an actuator according to the operation of the operator on the cabin 10 to drive an operating element (driven element) such as the lower traveling structure 1, the upper turning structure 3, the boom 4, the arm 5, and the bucket 6.

Alternatively, the shovel 100 may be operatively configured by the operator on the cabin 10, and/or the shovel 100 may be remotely configured by the operator of a predetermined external device (for example, support device 200 or management device 300 described below). In this case, for example, the shovel 100 transmits image information (image capture image) output by a spatial recognition device 70 to the external device. The various image information (for example, various setting screens) displayed on a display device D1 of the shovel 100 described below may also be displayed on the display device provided on the external device in the same manner. This allows the operator to remotely control the shovel 100 while checking, for example, the contents displayed on the display device provided on the external device. The shovel 100 may then operate the actuator in response to a remote-control signal received from the external device representing the contents of the remote-control to drive the operating element such as the lower traveling structure 1, the upper turning structure 3, the boom 4, the arm 5, and the bucket 6. When the shovel 100 is remotely operated, an interior of the cabin 10 may be unmanned. The following explanation assumes at least one of the cases of an operation with respect to an operating device 26 of the operator in the cabin 10 and a remote-control operation of the operator in the external device.

In the shovel 100, the hydraulic actuator may also be automatically operated regardless of operation detail. Thus, the shovel 100 provides a function (hereinafter referred to as "automatic operation function" or "machine control function") to automatically operate at least a part of an operating element such as the lower traveling structure 1, the upper turning structure 3, the boom 4, the arm 5, and the bucket 6.

The automatic operation function may include a function (so-called "semi-automatic operation function") to automatically operate an operating element (hydraulic actuator) other than the operating element (hydraulic actuator) to be operated according to the operation or remote-control operation with respect to the operating device 26. The automatic operation function may also include a function to automatically operate at least a part of a plurality of driven elements (hydraulic actuators) without operation or remotely controlling with respect to the operating device 26 (so-called "fully automatic operation function"). In the shovel 100, the interior of the cabin 10 may be unmanned when a fully automatic operation function is enabled. The automatic operation function may also include a function ("gesture operation function") in which the shovel 100 recognizes a gesture of a person such as a worker around the shovel 100 and automatically operates at least a part of a plurality of driven elements (hydraulic actuators) in accordance with detail of the recognized gesture. In addition, the semi-automatic operation function, the fully automatic operation function, and the gesture operation function may include a mode in which the operation of the operating element (hydraulic actuator) subject to automatic operation is determined automatically in accordance with predefined rules. Further, the semi-automatic operation function, the fully automatic operation function, and the gesture operation function may include a mode in which the shovel 100 autonomously makes various judgments and determines the detail of the operation of an operating element (hydraulic actuator) subject to autonomous operation based on the judgment result (so-called "autonomous operation function").

Further, the shovel 100 is bi-directionally connected to the adjacent support device 200 through the short-range communication device 74. As described below, the shovel 100 automatically causes the lower traveling structure 1 to travel in response to a predetermined command signal received from the support device 200, and the shovel 100 is automatically loaded on and unloaded from the trailer. Specifically, the shovel 100 may automatically drive the lower traveling structure 1 using the aforementioned remote-control function and automatic operation function to automatically load and unload the shovel 100 from the trailer.

<Support Device Overview>

The support device 200 is a terminal device possessed by a user (for example, a transporter loading or unloading the shovel 100 on or from a trailer). The support device 200 may be, for example, a general-purpose portable terminal such as a smartphone, a tablet terminal, a mobile computer, or a dedicated portable terminal.

The support device 200 is communicatively connected to the shovel 100 through a short-range communication device 220. As described below, the support device 200 allows the shovel 100 to automatically load and unload the shovel 100 on or from the trailer by transmitting a predetermined instruction (an automatic loading command or an automatic unloading command as described below) for automatically driving the lower traveling structure 1 of the shovel 100 from the rear of the trailer toward the upper surface (the trailer bed) of the trailer, or from the trailer bed to the rear of the trailer, in accordance with a predetermined operation by a user with respect to an operation input device 230.

In FIG. 1, one shovel 100 and one support device 200 are described, but a plurality of the support devices 200 capable of transmitting the above-described command signal to the shovel 100 may be used. Alternatively, the support device 200 may be a configuration in which the command signal can be transmitted from one support device 200 to each of a plurality of shovels 100.

Configuration of Support System

Next, a configuration of the support system SYS will be described with reference to FIGS. 2 to 5 in addition to FIG. 1.

Figure 2:
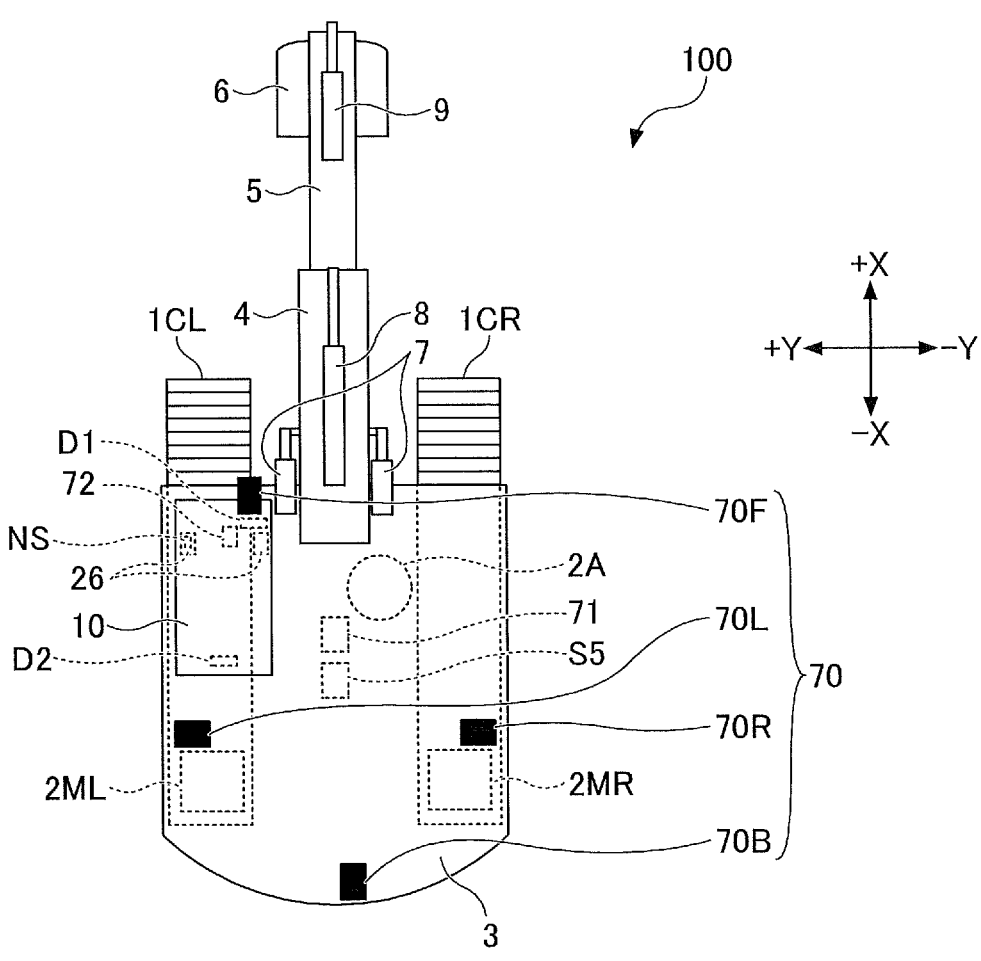
FIG. 2 is a top view of a shovel.
Figure 3:
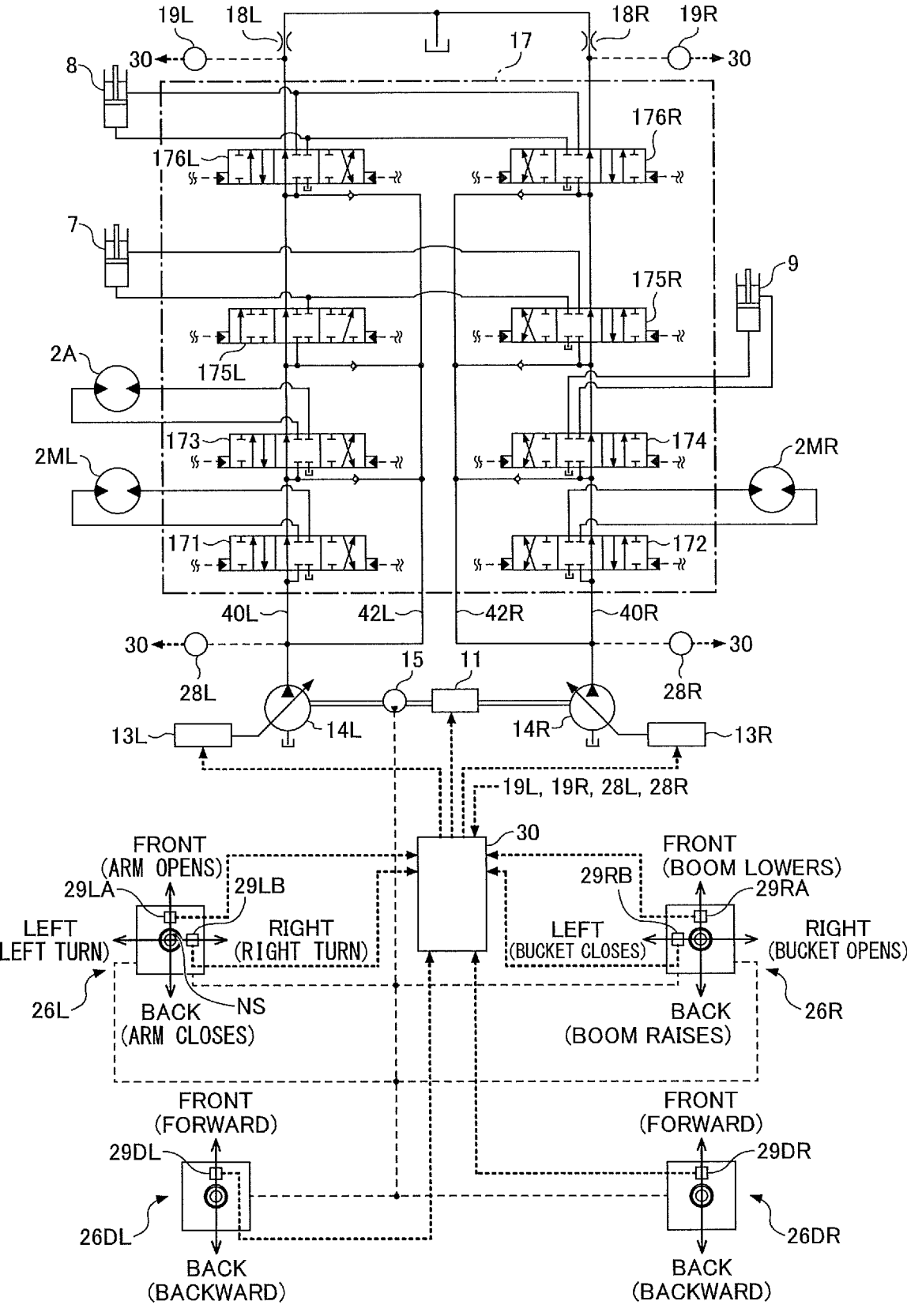
FIG. 3 is a diagram illustrating an example of a configuration of a hydraulic system of the shovel.

FIG. 2 is a top view of the shovel 100. FIG. 3 is a diagram illustrating an example of a configuration of a hydraulic system of the shovel 100. FIG. 4 (FIGS. 4A to 4D) illustrates an example of the components of the operating system for the attachment AT and the upper turning structure 3 in the hydraulic system of the shovel 100. Specifically, FIGS. 4A to 4D illustrate an example of the components of the operating system for the arm 5, boom 4, bucket 6, and upper turning structure 3, respectively. FIG. 5 (FIGS. 5A and 5B) illustrates an example of components of the operating system for the lower traveling structure 1 in the hydraulic system of the shovel 100. Specifically, FIGS. 5A and 5B illustrate an example of the components of the operating system for the left crawler 1CL and the right crawler 1CR of the lower traveling structure 1 in the hydraulic system of the shovel 100, respectively.

<Configuration of Shovel>

First, a configuration of the hydraulic system of the shovel 100 will be described.

The hydraulic system of the shovel 100 in accordance with the present embodiment includes an engine 11, a regulator 13, a main pump 14, a pilot pump 15, a control valve 17, an operating device 26, a discharging pressure sensor 28, an operating pressure sensor 29, and a controller 30. The hydraulic system of the shovel 100 in accordance with the present embodiment includes hydraulic actuators such as traveling hydraulic oil motors 2ML and 2MR, a turning hydraulic oil motor 2A, a boom cylinder 7, an arm cylinder 8, and a bucket cylinder 9 for hydraulically driving the lower traveling structure 1, the upper turning structure 3, the boom 4, the arm 5, and the bucket 6, respectively, as described above.

The engine 11 is a main power source of the hydraulic system and is mounted, for example, on the rear of the upper turning structure 3. Specifically, the engine 11, under direct or indirect control by the controller 30, rotates at a predetermined target speed and drives the main pump 14 and the pilot pump 15. The engine 11 is, for example, a diesel engine fueled with diesel oil.

The regulator 13 controls a discharge amount of the main pump 14. For example, the regulator 13 adjusts an angle (tilt angle) of a swash plate of the main pump 14 in response to control instructions from the controller 30. The regulator 13 includes regulators 13L and 13R corresponding to each of main pumps 14L and 14R described below.

The main pump 14, for example, in the same manner as the engine 11, is mounted on the rear of the upper turning structure 3 and is driven by the engine 11 as described above to supply hydraulic oil to the control valve 17 through a high-pressure hydraulic line. The main pump 14 is, for example, a variable displacement hydraulic pump. As described above, under the control of the controller 30, the length of the piston stroke is adjusted by the regulator 13 by adjusting the tilt angle of the swash plate, and the amount of discharge flow (discharging pressure) is controlled. The main pump 14 includes main pumps 14L and 14R.

The pilot pump 15, for example, is mounted on the rear of the upper turning structure 3 and provides pilot pressure to the operating device 26 through a pilot line. The pilot pump 15 is, for example, a fixed displacement hydraulic pump driven by the engine 11 as described above.

The control valve 17 is, for example, mounted in a central portion of the upper turning structure 3 and is a hydraulic control device that controls the hydraulic drive system in response to an operation or remote-control operation of the operating device 26 by an operator. As described above, the control valve 17 is connected to the main pump 14 via a high-pressure hydraulic line and selectively supplies hydraulic oil supplied from the main pump 14 to the hydraulic actuator (the traveling hydraulic oil motors 2ML and 2MR, the turning hydraulic oil motor 2A, the boom cylinder 7, the arm cylinder 8, and the bucket cylinder 9) in response to the operation and remote-control operation of the operating device 26. Specifically, the control valve 17 includes control valves 171 to 176 for controlling the flow rate and flow direction of hydraulic oil supplied from the main pump 14 to each of the hydraulic actuators. The control valve 171 corresponds to the traveling hydraulic oil motor 2ML. The control valve 172 corresponds to the traveling hydraulic oil motor 2MR. The control valve 173 corresponds to the turning hydraulic oil motor 2A. The control valve 174 also corresponds to the bucket cylinder 9. The control valve 175 corresponds to the boom cylinder 7 and includes the control valves 175L and 175R. The control valve 176 corresponds to the arm cylinder 8 and includes the control valves 176L and 176R.

The operation device 26 is provided near a cockpit of the cabin 10 and is an operation-input way for the operator to operate the operation of various operation elements (the lower traveling structure 1, the upper turning structure 3, the boom 4, the arm 5, the bucket 6, and the like). In other words, the operating device 26 is the operation input ways for the operator to operate the hydraulic actuators (that is, the traveling hydraulic oil motors 2ML and 2MR, the turning hydraulic oil motor 2A, the boom cylinder 7, the arm cylinder 8, the bucket cylinder 9, and the like) driving the respective operating elements.

As illustrated in FIGS. 3, 4A to 4D, 5A, and 5B, the operating device 26 is a hydraulic pilot type. The operating device 26 is connected to the control valve 17 via a shuttle valve 32, which will be described later, provided on the pilot line on its secondary outlet. Thus, a pilot pressure corresponding to the operational status of the lower traveling structure 1, the upper turning structure 3, the boom 4, the arm 5, the bucket 6, and the like of the operating device 26, may be input to the control valve 17. Thus, the control valve 17 can drive the respective hydraulic actuators according to the operational status of the operating device 26. The operating device 26 includes an attachment AT, that is, the boom 4 (boom cylinder 7), the arm 5 (arm cylinder 8), the bucket 6 (bucket cylinder 9), and left and right operating levers 26L and 26R for manipulating the upper turning structure 3. The operating device 26 also includes a traveling lever 26D for operating the lower traveling structure 1, and the traveling lever 26D includes a left traveling lever 26DL for operating the left crawler 1CL and a right traveling lever 26DR for operating the right crawler 1CR.

The left operating lever 26L is used to rotate the upper turning structure 3 and the arm 5. When the left operating lever 26L is operated in the forward-backward direction (that is, the forward-backward direction of the upper turning structure 3) as viewed from the operator in the cabin 10, the hydraulic oil discharged from the pilot pump 15 is used to output the control pressure (pilot pressure) according to the operation amount of the lever to the pilot line on the secondary outlet. When the left operating lever 26L is operated in the left and right directions (that is, the left and right directions of the upper turning structure 3) as viewed from the operator in the cabin 10, the hydraulic oil discharged from the pilot pump 15 is used to output the control pressure (pilot pressure) according to the amount of the lever operation to the pilot line on the secondary outlet.

The right operating lever 26R is used to operate the boom 4 and the bucket 6. When the right operating lever 26R is operated in the forward-backward direction as viewed from the operator in the cabin 10, the hydraulic oil discharged from the pilot pump 15 is used to output the control pressure (pilot pressure) according to the amount of the lever operation to the pilot line on the secondary outlet. When the right operating lever 26R is operated in the left and right directions, the hydraulic oil discharged from the pilot pump 15 is used to output the control pressure (pilot pressure) according to the amount of the lever operation to the pilot line on the secondary outlet.

The left traveling lever 26DL is used to operate the left crawler 1CL as described above and may be configured to interlock with a left traveling pedal (not illustrated). When the left traveling lever 26DL is operated in the forward-backward direction as viewed from the operator in the cabin 10, the hydraulic oil discharged from the pilot pump 15 is used to output the control pressure (pilot pressure) according to the amount of the lever operation to the pilot line on the secondary outlet.

The right traveling lever 26DR is used to operate the right crawler 1CR as described above and may be configured to interlock with the right traveling pedal (not illustrated). When the right traveling lever 26DR is operated in the forward-backward direction as viewed from the operator in the cabin 10, the hydraulic oil discharged from the pilot pump 15 is used to output the control pressure (pilot pressure) according to the amount of the lever operation to the pilot line on the secondary outlet.

The operating device 26 (left operating lever 26L, right operating lever 26R, left traveling lever 26DL, and right traveling lever 26DR) may be an electric type device that outputs an electrical signal (hereinafter referred to as an "operation signal") rather than a hydraulic pilot type that outputs a pilot pressure. In this case, an electrical signal (operation signal) from the operating device 26 is input to the controller 30, and the controller 30 controls each control valve 171 to 176 in the control valve 17 in response to the electrical signal input to achieve operation of the various hydraulic actuators according to the operation detail for the operating device 26. For example, the control valves 171 to 176 in the control valve 17 may be solenoid spool valves driven by instructions from the controller 30. Alternatively, for example, a hydraulic control valve ("control valve for operation") may be located between the pilot pump 15 and the pilot ports of each control valve 171 to 176, which operates in response to electrical signals from the controller 30. The control valve for operation may be, for example, a proportional valve 31, and a shuttle valve 32 is omitted. In this case, when a manual operation is performed using the electric operating device 26, the controller 30 may control the control valves for operation and increase or lower the pilot pressure by the electrical signals corresponding to the amount of operation (for example, the amount of operation of the lever) to operate the control valves 171 to 176 in accordance with the operation detail for the operating device 26. Hereinafter, the control valves for operation are assumed as the proportional valve 31.

A discharging pressure sensor 28 detects the discharging pressure of the main pump 14. A detection signal corresponding to the discharging pressure detected by the discharging pressure sensor 28 is loaded into the controller 30. The discharging pressure sensor 28 includes discharging pressure sensors 28L and 28R for detecting the discharging pressures of the main pumps 14L and 14R, respectively.

An operating pressure sensor 29 detects the pilot pressure on the secondary outlet of the operating device 26, that is, the pilot pressure corresponding to the operational status of the respective operating elements (for example, hydraulic actuators) in the operating device 26. The pilot pressure detection signal corresponding to the operational status such as of the lower traveling structure 1, the upper turning structure 3, the boom 4, the arm 5, the bucket 6, and the like in the operating device 26 by the operating pressure sensor 29 is loaded into the controller 30. The operating pressure sensor 29 includes operating pressure sensors 29LA, 29LB, 29RA, 29RB, 29DL, 29DR.

The operating pressure sensor 29LA detects the operation detail of the forward-backward direction for the left operating lever 26L by the operator (for example, operation direction and operation amount) in the form of the hydraulic oil pressure ("operating pressure") in the pilot line of the corresponding secondary outlet of the left operating lever 26L.

The operating pressure sensor 29LB detects the operation detail of the left-right direction for the left operating lever 26L by the operator (for example, operation direction and operation amount) in the form of the operating pressure in the pilot line of the corresponding secondary outlet of the left operating lever 26L.

The operating pressure sensor 29RA detects the operation detail of the forward-backward direction for the right operating lever 26R by the operator (for example, operation direction and operation amount) in the form of the operating pressure in the pilot line of the corresponding secondary outlet of the right operating lever 26R.

The operating pressure sensor 29RB detects the operation detail of the left-right direction for the right operating lever 26R by the operator (for example, operation direction and operation amount) in the form of the operating pressure in the pilot line of the corresponding secondary outlet of the right operating lever 26R.

The operating pressure sensor 29DL detects the operation detail of the forward-backward direction for the left traveling lever 26DL by the operator (for example, operation direction and operation amount) in the form of the operating pressure in the pilot line of the corresponding secondary outlet of the left traveling lever 26DL.

The operating pressure sensor 29DR detects the operation detail of the forward-backward direction for the right traveling lever 26DR by the operator (for example, operation direction and operation amount) in the form of the operating pressure in the pilot line of the corresponding secondary outlet of the right traveling lever 26DR.

The operation detail of the operating device 26 (left operating lever 26L, right operating lever 26R, left traveling lever 26DL, and right traveling lever 26DR) may be detected by sensors other than the operating pressure sensor 29 (for example, potentiometers mounted on the right operating lever 26R, left traveling lever 26DL, and right traveling lever 26DR).

The controller 30 is provided, for example, in the cabin 10 to perform drive control for the shovel 100. The controller 30 may realize its functions in any hardware, software, or combination thereof. For example, the controller 30 is mainly configured by a microcomputer including a Central Processing Unit (CPU), a memory device such as Random Access Memory (RAM) (also referred to as a "main memory"), a non-volatile auxiliary storage device such as Read Only Memory (ROM), and interfaces for various inputs and outputs. The controller 30 realizes various functions, for example, by executing various programs stored in the ROM or the non-volatile auxiliary storage device on the CPU.

Some of the functions of the controller 30 may be realized by other controllers (controlling device). That is, the functions of the controller 30 may be realized in a manner that is distributed by a plurality of controllers.

Here, as illustrated in FIG. 3, in the hydraulic system of the shovel 100, the hydraulic system part of the drive system that drives the hydraulic actuators circulates the hydraulic oil from each of the main pumps 14L and 14R driven by the engine 11 to the hydraulic oil tanks through the center bypass oil passages 40L and 40R and also the parallel oil passages 42L and 42R.

The center bypass oil passage 40L starts at the main pump 14L and passes sequentially through the control valves 171, 173, 175L, and 176L disposed in the control valve 17 in order to reach the hydraulic oil tank.

The center bypass oil passage 40R starts at the main pump 14R and passes sequentially through the control valves 172, 174, 175R, and 176R disposed within the control valve 17 in order to reach the hydraulic oil tank.

The control valve 171 is a spool valve which feeds hydraulic oil discharged from the main pump 14L to the traveling hydraulic oil motor 2ML and discharges the hydraulic oil discharged from the traveling hydraulic oil motor 2ML to the hydraulic oil tank.

The control valve 172 is a spool valve which feeds hydraulic oil discharged from the main pump 14R to the traveling hydraulic oil motor 2MR and discharges the hydraulic oil discharged from the traveling hydraulic oil motor 2MR to the hydraulic oil tank.

The control valve 173 is a spool valve which feeds hydraulic oil discharged from the main pump 14L to the turning hydraulic oil motor 2A and discharges the hydraulic oil discharged from the turning hydraulic oil motor 2A to the hydraulic oil tank.

The control valve 174 is a spool valve which feeds hydraulic oil discharged from the main pump 14R to the bucket cylinder 9 and discharges the hydraulic oil in the bucket cylinder 9 to the hydraulic oil tank.

The control valves 175L and 175R are spool valves that feed the hydraulic oil discharged by the main pumps 14L and 14R to the boom cylinder 7 and discharge the hydraulic oil in the boom cylinder 7 to the hydraulic oil tank, respectively.

The control valves 176L and 176R are spool valves that feed the hydraulic oil discharged by the main pumps 14L and 14R to the arm cylinder 8 and discharge the hydraulic oil in the arm cylinder 8 to the hydraulic oil tank, respectively.

The control valves 171, 172, 173, 174, 175L, 175R, 176L, and 176R regulate the flow of hydraulic oil supplied to and discharged from the hydraulic actuators, respectively, depending upon the pilot pressures acting on the pilot ports. In each control valves 171, 172, 173, 174, 175L, 175R, 176L, and 176R, these switch the flow direction of hydraulic oil supplied to and discharged from the hydraulic actuators in response to the pilot pressure applied to either one of the two pilot ports.

The parallel oil passage 42L feeds the hydraulic oil of the main pump 14L to the control valves 171, 173, 175L, and 176L in parallel with the center bypass oil passage 40L. Specifically, the parallel oil passage 42L branches from the center bypass oil passage 40L at the upstream side of the control valve 171 and is configured to feed the hydraulic oil of the main pump 14L in parallel with each of the control valves 171, 173, 175L, and 176L. This allows the parallel oil passage 42L to feed the hydraulic oil to the downstream control valve when the flow of hydraulic oil through the center bypass oil passage 40L is restricted or interrupted by either the control valves 171, 173, or 175L.

The parallel oil passage 42R feeds the hydraulic oil of the main pump 14R to the control valves 172, 174, 175R, and 176R in parallel with the center bypass oil passage 40R. Specifically, the parallel oil passage 42R branches from the center bypass oil passage 40R at the upstream side of the control valve 172 and is configured to feed the hydraulic oil of the main pump 14R in parallel with each of the control valves 172, 174, 175R, and 176R. This allows the parallel oil passage 42R to feed the hydraulic oil to the downstream control valve when the flow of hydraulic oil through the center bypass oil passage 40R is restricted or interrupted by either the control valves 172, 174, or 175R.

The regulators 13L and 13R adjust the discharge amounts of the main pumps 14L and 14R by adjusting the tilt angles of the swash plates of the main pumps 14L and 14R, respectively, under the control of the controller 30.

The discharging pressure sensor 28L detects the discharging pressure of the main pump 14L, and a detection signal corresponding to the detected discharging pressure is incorporated into the controller 30. The same applies to the discharging pressure sensor 28R. Thus, the controller 30 can control the regulators 13L and 13R according to the discharging pressure of the main pumps 14L and 14R.

The center bypass oil passages 40L and 40R are provided with negative control throttles 18L and 18R between the control valves 176L and 176R which are situated most downstream and the hydraulic oil tank, respectively. Accordingly, the flow of hydraulic oil discharged by the main pumps 14L and 14R is restricted by the negative control throttles (hereinafter also refers to "Negacon") 18L and 18R. The negative control throttles 18L and 18R generate a control pressure (hereinafter referred to as "pressure of negative control throttles") for controlling the regulators 13L and 13R.

Negative control pressure sensors 19L and 19R detect the negative control pressure of the negative control throttles 18L and 18R, respectively, and the detection signal corresponding to the detected negative control pressure is incorporated into the controller 30.

The controller 30 may control the regulators 13L and 13R in response to the discharging pressures of the main pumps 14L and 14R detected by the discharging pressure sensors 28L and 28R to adjust the discharge amounts of the main pumps 14L and 14R. For example, the controller 30 may control the regulator 13L in response to an increase in the discharging pressure of the main pump 14L to adjust the tilt angle of the swash plate of the main pump 14L to reduce the discharge amount. The same applies to the regulator 13R. Accordingly, the controller 30 can control the total horsepower of the main pumps 14L and 14R so that the absorbed horsepower of the main pumps 14L and 14R, which is expressed as the product of the discharging pressure and the discharge amount, does not exceed the output horsepower of the engine 11.

The controller 30 may adjust the discharge amount of the main pumps 14L and 14R by controlling the regulators 13L and 13R in response to the negative control pressure detected by the negative control pressure sensors 19L and 19R. For example, the controller 30 reduces the discharge amount of the main pumps 14L and 14R as the negative control pressure increases. The controller 30 increases the discharge amount of the main pumps 14L and 14R as the negative control pressure reduces.

Specifically, in the standby status in which none of the hydraulic actuators in the shovel 100 is operated (the status illustrated in FIG. 3), the hydraulic oil discharged from the main pumps 14L and 14R passes through the center bypass oil passages 40L and 40R to the negative control throttles 18L and 18R. The flow of hydraulic oil discharged from the main pumps 14L and 14R increases the negative control pressure generated upstream of the negative control throttles 18L and 18R. As a result, the controller 30 reduces the discharge amount of the main pumps 14L and 14R to the acceptable minimum discharge amount and suppresses the pressure loss (pumping loss) when the discharged hydraulic oil passes through the center bypass oil passages 40L and 40R.

In contrast, when any of the hydraulic actuators is operated through the operating device 26, the hydraulic oil discharged from the main pumps 14L and 14R flows into the hydraulic actuator which is an operation target through a control valve corresponding to the target hydraulic actuator. The amount of the flow of the hydraulic oil discharged from the main pumps 14L and 14R leading to the negative control throttles 18L and 18R is reduced or eliminated, thereby lowering the negative control pressure generated upstream of the negative control throttles 18L and 18R. As a result, the controller 30 can increase the discharged amount of the main pumps 14L and 14R, circulate sufficient hydraulic oil in the target hydraulic actuator, and reliably drive the target hydraulic actuator.

Also illustrated in FIGS. 4A to 4D, 5A, and 5B, in the hydraulic system of the shovel 100, the hydraulic system portion of the operating system includes the pilot pump 15, the operating device 26 (left operating lever 26L, right operating lever 26R, left traveling lever 26DL, and right traveling lever 26DR), a proportional valve 31, a shuttle valve 32, and a proportional valve 33.

The proportional valve 31 is provided on the pilot line connecting the pilot pump 15 and the shuttle valve 32, and is configured to change its flow area (cross-sectional area through which hydraulic oil can flow). The proportional valves 31 operate in response to a control command input from the controller 30. Thus, the controller 30 may supply hydraulic oil discharged from the pilot pumps 15 to the pilot port of the corresponding control valve in the control valve 17 via the proportional valve 31 and the shuttle valve 32, even if the operating device 26 (specifically, the left operating lever 26L, the right operating lever 26R, the left traveling lever 26DL, or the right traveling lever 26DR) is not operated by an operator. Accordingly, the controller 30 can realize an automatic operation function or a remote-control function of the shovel 100 by controlling the proportional valve 31. The proportional valve 31 includes the proportional valves 31AL, 31AR, 31BL, 31BR, 31CL, 31CR, 31DL, 31DR, 31EL, 31ER, 31FL, and 31FR.

The shuttle valve 32 has two inlet ports and one outlet port. The hydraulic oil having the higher pilot pressure of the pilot pressures input to the two inlet ports is output to the outlet port. In the shuttle valve 32, one of the two inlet ports are connected to the operating device 26, and the other is connected to the proportional valve 31. The outlet port of the shuttle valve 32 is connected through the pilot line to the pilot port of the corresponding control valve within the control valve 17. Thus, the shuttle valve 32 can cause the higher of the pilot pressure generated by the operating device 26 and the pilot pressure generated by the proportional valve 31 to act on the pilot port of the corresponding control valve. That is, by having the proportional valve 31 output the pilot pressure higher than the pilot pressure of the secondary outlet from the operating device 26, the controller 30 can control the corresponding control valve regardless of the operation of the operating device 26 by the operator. As a result, the controller 30 can control the lower traveling structure 1, the upper turning structure 3, and the attachment AT. The shuttle valve 32 includes shuttle valves 32AL, 32AR, 32BL, 32BR, 32CL, 32CR, 32DL, 32DR, 32EL, 32ER, 32FL, and 32FR.

The proportional valve 33 is provided on the pilot line connecting the operating device 26 and the shuttle valve 32. The proportional valve 33 is configured to, for example, change the flow area thereof. The proportional valve 33 operates in response to control commands input from the controller 30. This allows the controller 30 to forcibly depressurize the pilot pressure output from the operating device 26 when the operating device 26 (specifically, lever devices 26A to 26C) is operated by an operator. Accordingly, the controller 30 can be forced to inhibit or stop the operation of the hydraulic actuator corresponding to the operation of the operating device 26, even when the operating device 26 is being operated. The controller 30 can, for example, reduce the pilot pressure output from the operating device 26 to be lower than the pilot pressure output from the proportional valve 31, even when the operating device 26 is being operated. Thus, the controller 30 can control the proportional valve 31 and the proportional valve 33, for example, to ensure that the desired pilot pressures are applied to the pilot ports of the control valves in the control valve 17 regardless of the operation detail of the operating device 26. Accordingly, the controller 30 can more appropriately realize the automatic operation function and the remote-control function of the shovel 100 by controlling the proportional valve 33 in addition to the proportional valve 31. The proportional valve 33 includes a proportional valve 33AL, 33AR, 33BL, 33BR, 33CL, 33CR, 33DL, 33DR, 33EL, 33ER, 33FL, and 33FR as described below.

Figure 4A:
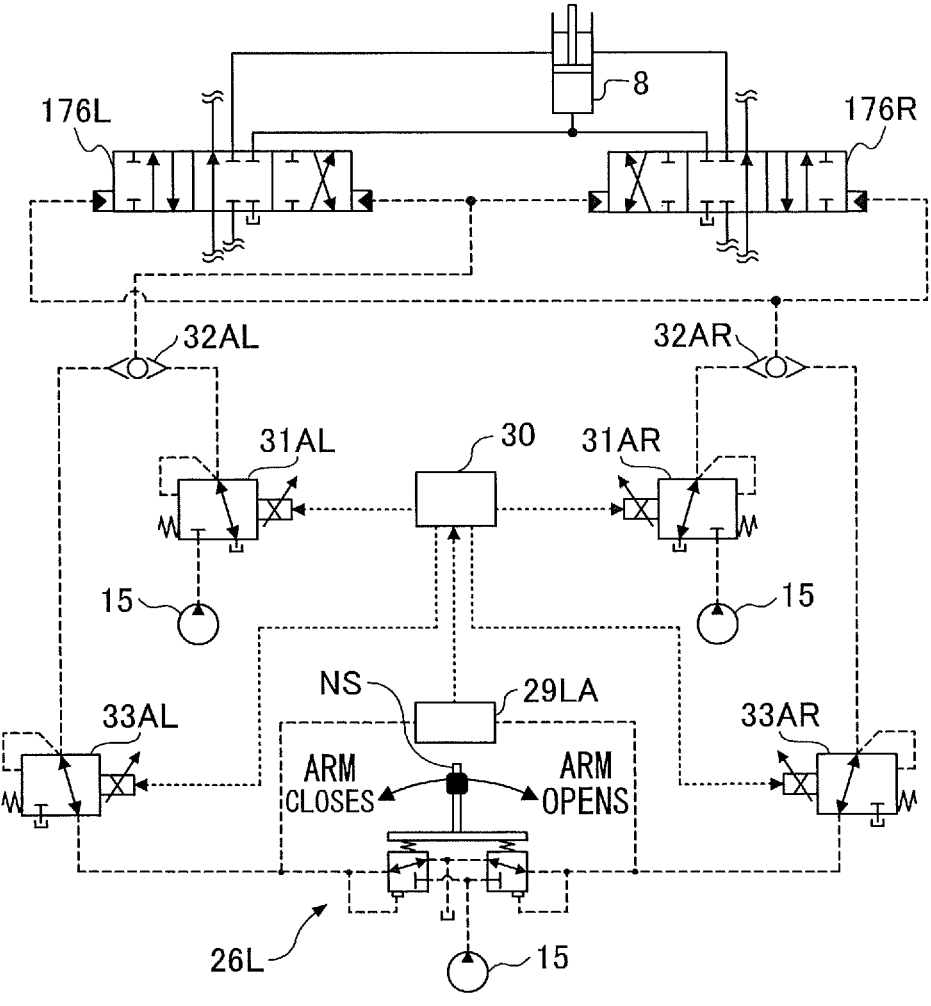
FIG. 4A illustrates an example of a part of components of an operating system for an arm in the hydraulic system of the shovel.
Figure 5A:
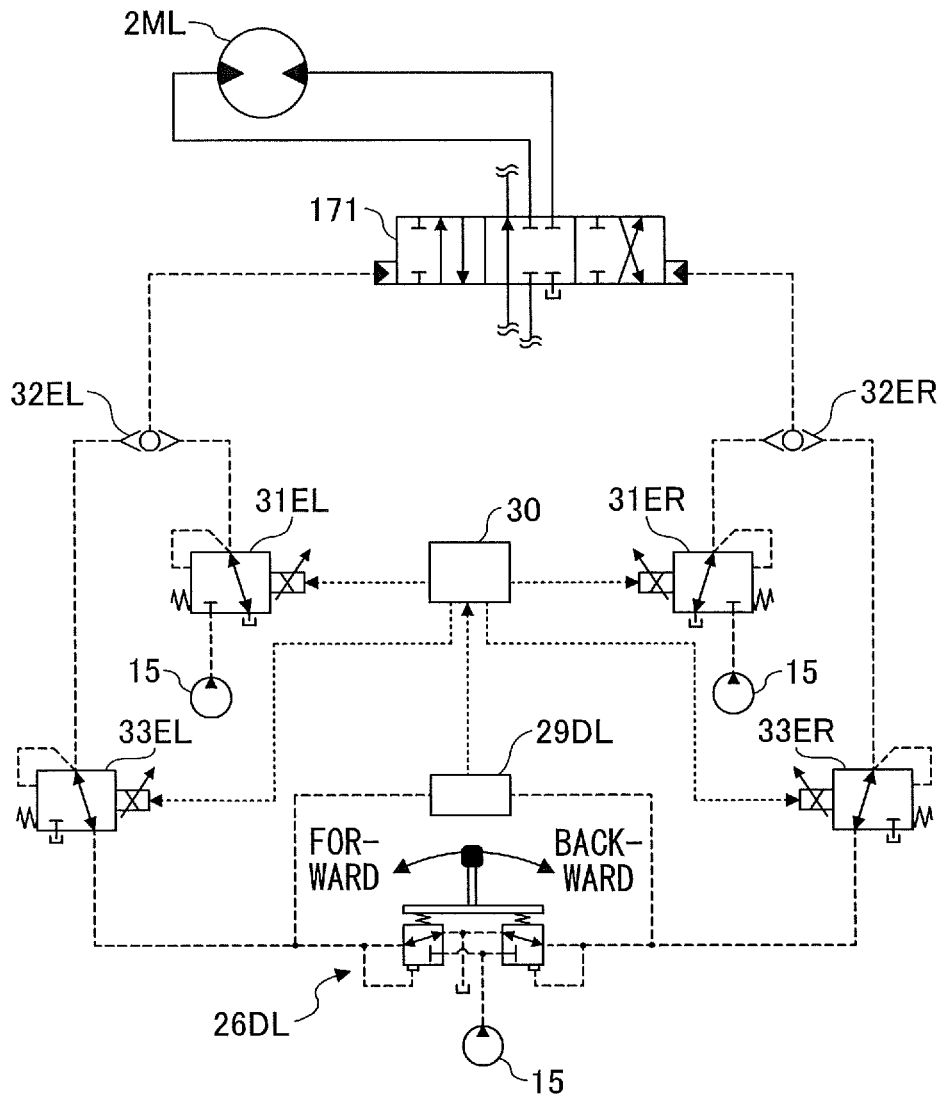
FIG. 5A illustrates an example of a part of components of the operating system for a left crawler of a lower traveling structure in the hydraulic system of the shovel.
Figure 5B:
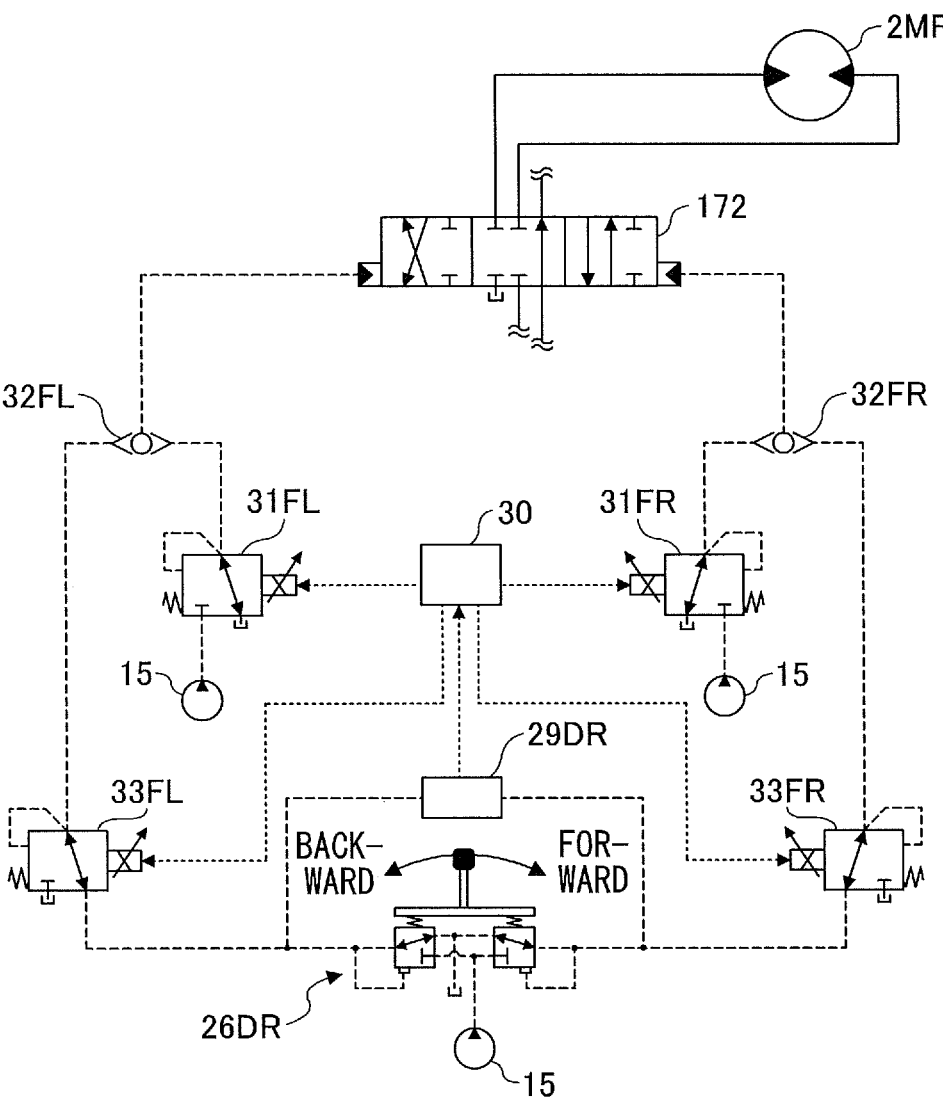
FIG. 5B illustrates an example of a part of components of the operating system for a right crawler of the lower traveling structure in the hydraulic system of the shovel.

As illustrated in FIG. 4A, the left operating lever 26L is used to operate the arm cylinder 8 corresponding to the arm 5 in a manner where the operator tilts in the forward-backward direction. That is, when the left operating lever 26L is tilted in the forward-backward direction, the arm 5 is an operation target. The left operating lever 26L uses the hydraulic oil discharged from the pilot pump 15 to output the pilot pressure to the secondary outlet in response to the operation detail in the forward-backward direction.

Two inlet ports of the shuttle valve 32AL are connected to the pilot line of the secondary outlet in the left operating lever 26L corresponding to the direction of closing the arm 5 (hereinafter referred to as "arm closing operation") and connected to the pilot line of the secondary outlet in the proportional valve 31AL, respectively. The outlet port of the shuttle valve 32 is connected to a right pilot port of the control valve 176L and connected to a left pilot port of the control valve 176R.

Two inlet ports of the shuttle valve 32AR are connected to the pilot line of the secondary outlet in the left operating lever 26L corresponding to the direction of opening the arm 5 (hereinafter referred to as "arm opening operations") and connected to the pilot line of the secondary outlet in the proportional valve 31AR, respectively. The outlet port of the shuttle valve 32 is connected to a left pilot port of the control valve 176L and connected to a right pilot port of the control valve 176R.

That is, the left operating lever 26L acts through the shuttle valves 32AL, 32AR on the pilot ports of the control valves 176L and 176R depending on the operation detail in the forward-backward direction. Specifically, when closing of the arm, the left operating lever 26L outputs the pilot pressure in response to the amount of operation to one of the inlet ports of the shuttle valve 32AL and acts on the right pilot port of the control valve 176L and the left pilot port of the control valve 176R through the shuttle valve 32AL. When opening of the arm is operated, the left operating lever 26L outputs the pilot pressure in response to the amount of operation to one of the inlet ports of the shuttle valve 32AR and acts on the left pilot port of the control valve 176L and the right pilot port of the control valve 176R through the shuttle valve 32AR.

The proportional valve 31AL operates in response to a control current input from the controller 30. Specifically, the proportional valve 31AL uses hydraulic oil discharged from the pilot pump 15 to output pilot pressure in response to the control current input from the controller 30 to the other pilot port of the shuttle valve 32AL. This allows the proportional valve 31AL to adjust the pilot pressure acting on the right pilot port of the control valve 176L and the left pilot port of the control valve 176R through the shuttle valve 32AL.

The proportional valve 31AR operates in response to a control current input from the controller 30. Specifically, the proportional valve 31AR uses hydraulic oil discharged from the pilot pump 15 to output pilot pressure in response to the control current input from the controller 30 to the other pilot port of the shuttle valve 32AR. This allows the proportional valve 31AR to adjust the pilot pressure acting on the left pilot port of the control valve 176L and the right pilot port of the control valve 176R through the shuttle valve 32AR.

That is, the proportional valves 31AL and 31AR can adjust the pilot pressure output to the secondary outlet so that the control valves 176L and 176R can be stopped at any valve position, regardless of the operational status of the left operating lever 26L in the forward-backward direction.

The proportional valve 33AL operates in response to a control current input from the controller 30. Specifically, if the control current from the controller 30 is not input, the proportional valve 33AL outputs the pilot pressure corresponding to the arm closing operation of the left operating lever 26L to the secondary outlet. In contrast, the proportional valve 33AL depressurizes the pilot pressure of the pilot line on the secondary outlet corresponding to the arm closing operation of the left operating lever 26L to a degree corresponding to the control current when the control current from the controller 30 is input, and outputs the depressurized pilot pressure to one of the inlet ports of the shuttle valve 32AL. Accordingly, the proportional valve 33AL can forcibly suppress or stop the operation of the arm cylinder 8 corresponding to the arm closing operation if necessary even when the arm closing operation is performed by the left operating lever 26L. The proportional valve 33AL can also lower the pilot pressure acting on one of the inlet ports of the shuttle valve 32AL relative to the pilot pressure acting on the other inlet port of the shuttle valve 32AL from the proportional valve 31AL, even when the left operating lever 26L is in the arm closing operation. Thus, the controller 30 controls the proportional valve 31AL and the proportional valve 33AL to ensure that the desired pilot pressure is applied to the pilot ports on the arm closing side of the control valves 176L and 176R.

The proportional valve 33AR operates in response to a control current input from the controller 30. Specifically, if the control current from the controller 30 is not input, the proportional valve 33AR outputs the pilot pressure corresponding to the arm opening operation of the left operating lever 26L to the secondary outlet. In contrast, the proportional valve 33AR depressurizes the pilot pressure of the pilot line on the secondary outlet corresponding to the arm opening operation of the left operating lever 26L to a degree corresponding to the control current when the control current from the controller 30 is input, and outputs the depressurized pilot pressure to one of the inlet ports of the shuttle valve 32AR. Accordingly, the proportional valve 33AR can forcibly suppress or stop the operation of the arm cylinder 8 corresponding to the arm opening operation if necessary even when the arm opening operation is performed by the left operating lever 26L. The proportional valve 33AR can also lower the pilot pressure acting on one of the inlet ports of the shuttle valve 32AR relative to the pilot pressure acting on the other inlet port of the shuttle valve 32AR from the proportional valve 31AR, even when the left operating lever 26L is in the arm opening operation. Thus, the controller 30 controls the proportional valve 31AR and the proportional valve 33AR to ensure that the desired pilot pressure is applied to the pilot ports on the arm opening side of the control valves 176L and 176R.

As described above, the proportional valves 33AL and 33AR can forcibly suppress or stop the operation of the arm cylinder 8 corresponding to the operational status of the left operating lever 26L in the forward-backward direction. The proportional valves 33AL and 33AR can also lower the pilot pressure acting on one of the inlet ports of the shuttle valves 32AL and 32AR and ensure that the pilot pressure of the proportional valves 31AL and 31AR acts on the pilot port of the control valves 176L and 176R through the shuttle valves 32AL and 32AR.

The controller 30 may control the proportional valve 31AR instead of the proportional valve 33AL to forcibly suppress or stop the operation of the arm cylinder 8 corresponding to the arm closing operation of the left operating lever 26L. For example, the controller 30 may control the proportional valve 31AR when the arm closing operation is performed with the left operating lever 26L to apply a predetermined pilot pressure from the proportional valve 31AR through the shuttle valve 32AR to the pilot port on the arm opening side of the control valves 176L and 176R. As a result, the pilot pressure is applied to the pilot port on the arm opening side of the control valves 176L and 176R in a manner opposite to the pilot pressure acting on the pilot port on the arm closing side of the control valves 176L and 176R from the left operating lever 26L through the shuttle valve 32AL. Accordingly, the controller 30 may forcibly bring the control valves 176L and 176R close to the neutral position to suppress or stop the operation of the arm cylinder 8 corresponding to the arm closing operation of the left operating lever 26L. Similarly, instead of controlling the proportional valve 33AR, the controller 30 may control the proportional valve 31AL to forcibly suppress or stop the operation of the arm cylinder 8 corresponding to the arm opening operation of the left operating lever 26L.

The operating pressure sensor 29LA detects the operation detail in the forward-backward direction by an operator relative to the left operating lever 26L in the form of pressure (operating pressure), and the detection signal corresponding to the detected pressure is loaded into the controller 30. This allows the controller 30 to grasp the operation detail in the forward-backward direction with respect to the left operating lever 26L. The operation detail in the forward-backward direction with respect to the left operating lever 26L to be detected may include, for example, an operation direction, an operation amount (operation angle), and the like. Hereinafter, the same applies to the operation detail in the left-right direction with respect to the left operating lever 26L and the operation detail in the forward-backward direction and left-right direction with respect to the right operating lever 26R.

The controller 30 may supply the hydraulic oil discharged from the pilot pump 15 to the right pilot port of the control valve 176L and the left pilot port of the control valve 176R through the proportional valve 31AL and shuttle valve 32AL, regardless of the arm closing operation by an operator with respect to the left operating lever 26L. The controller 30 may also supply hydraulic oil discharged from the pilot pump 15 to the left pilot port of the control valve 176L and the right pilot port of the control valve 176R through the proportional valve 31AR and shuttle valve 32AR, regardless of the arm opening operation by the operator with respect to the left operating lever 26L. That is, the controller 30 can automatically control the opening/closing operation of the arm 5 to realize an automatic operation function, a remote-control function, and the like of the shovel 100.

Figure 4B:
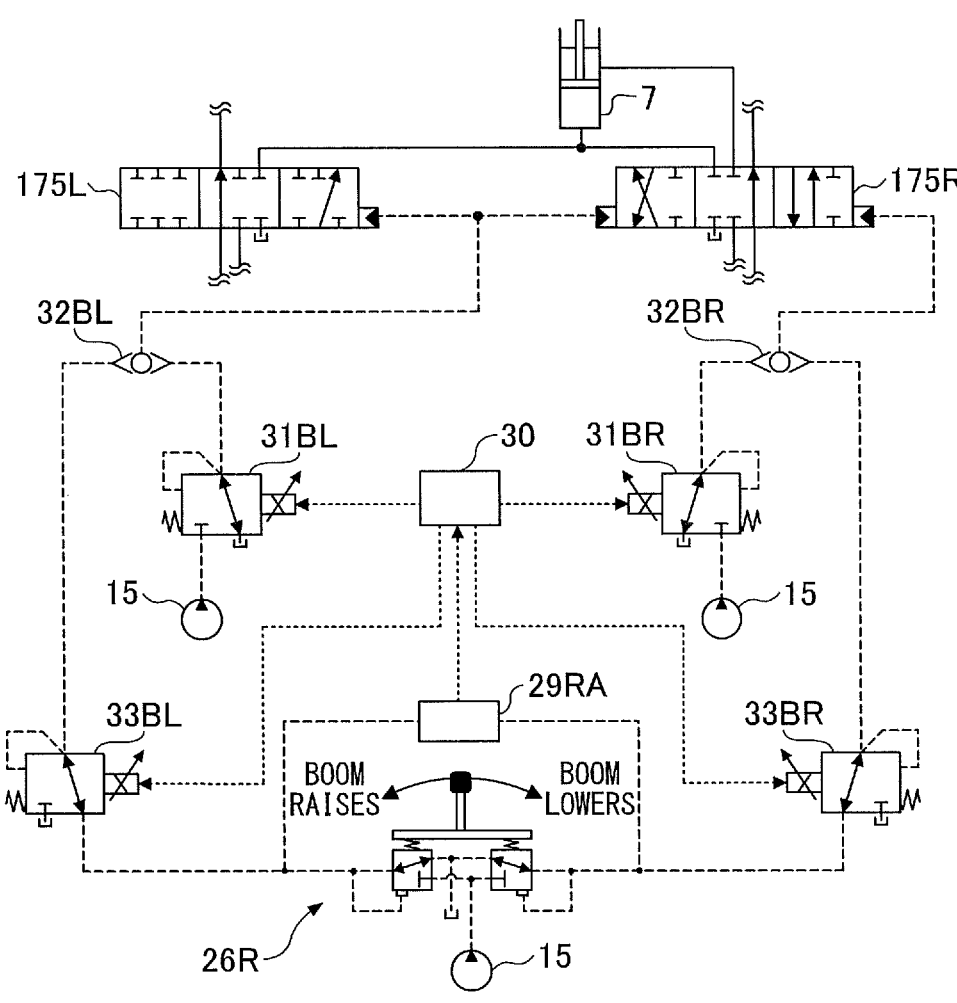
FIG. 4B illustrates an example of a part of components of the operating system for a boom in the hydraulic system of the shovel.

For example, as illustrated in FIG. 4B, the right operating lever 26R is used to operate the boom cylinder 7 corresponding to the boom 4 in a manner where the operator tilts in the forward-backward direction. That is, when the right operating lever 26R is tilted in the forward-backward direction, the boom 4 is an operation target. The right operating lever 26R uses the hydraulic oil discharged from the pilot pump 15 to output the pilot pressure to the secondary outlet in response to the operation detail in the forward-backward direction.

Two inlet ports of a shuttle valve 32BL are connected to the pilot line of the secondary outlet in the right operating lever 26R corresponding to the direction of raising the boom 4 (hereinafter referred to as "boom raising operations") and connected to the pilot line of the secondary outlet in the proportional valve 31BL, respectively. The outlet port of the shuttle valve 32BL is connected to a right pilot port of the control valve 175L and connected to a left pilot port of the control valve 175R.

Two inlet ports of a shuttle valve 32BR are connected to the pilot line of the secondary outlet in the right operating lever 26R corresponding to the direction of lowering the boom 4 (hereinafter referred to as "boom lowering operations") and connected to the pilot line of the secondary outlet in the proportional valve 31BR, respectively. The outlet port of the shuttle valve 32BR is connected to a right pilot port of the control valve 175R.

That is, the right operating lever 26R acts on the pilot ports of the control valves 175L and 175R in response to the operation detail in the forward-backward direction through the shuttle valves 32BL and 32BR. Specifically, when raising the boom, the right operating lever 26R outputs the pilot pressure in response to the amount of operation to one of the inlet ports of the shuttle valve 32BL and acts on the right pilot port of the control valve 175L and the left pilot port of the control valve 175R through the shuttle valve 32BL. When the boom is lowered, the right operating lever 26R outputs the pilot pressure in response to the amount of operation to one of the inlet ports of the shuttle valve 32BR and acts on the right pilot port of the control valve 176L and the right pilot port of the control valve 175R through the shuttle valve 32BR.

The proportional valve 31BL operates in response to a control current input from the controller 30. Specifically, the proportional valve 31BL uses hydraulic oil discharged from the pilot pump 15 to output the pilot pressure in response to the control current input from the controller 30 to the other inlet port of the shuttle valve 32BL. This allows the proportional valve 31BL to adjust the pilot pressure acting on the right pilot port of the control valve 175L and the left pilot port of the control valve 175R through the shuttle valve 32BL.

The proportional valve 31BR operates in response to a control current input from the controller 30. Specifically, the proportional valve 31BR uses hydraulic oil discharged from the pilot pump 15 to output the pilot pressure in response to the control current input from the controller 30 to the other inlet port of the shuttle valve 32BR. This allows the proportional valve 31BR to adjust the pilot pressure acting on the right pilot port of the control valve 175R through the shuttle valve 32BR.

That is, the proportional valves 31BL and 31BR can adjust the pilot pressure output to the secondary outlet so that the control valves 175L and 175R can be stopped at any valve position, regardless of the operational status of the right operating lever 26R in the forward-backward direction.

The proportional valve 33BL operates in response to a control current input from the controller 30. Specifically, if the control current from the controller 30 is not input, the proportional valve 33BL outputs the pilot pressure corresponding to the boom raising operation of the right operating lever 26R to the secondary outlet. In contrast, the proportional valve 33BL depressurizes the pilot pressure of the pilot line on the secondary outlet corresponding to the boom raising operation of the right operating lever 26R to a degree corresponding to the control current when the control current from the controller 30 is input, and outputs the depressurized pilot pressure to one of the inlet ports of the shuttle valve 32BL. Accordingly, the proportional valve 33BL can forcibly suppress or stop the operation of the boom cylinder 7 corresponding to the boom raising operation if necessary even when the boom raising operation is performed by the right operating lever 26R. The proportional valve 33BL can also lower the pilot pressure acting on one of the inlet ports of the shuttle valve 32BL relative to the pilot pressure acting on the other inlet port of the shuttle valve 32BL from the proportional valve 31BL, even when the right operating lever 26R is in the boom raising operation. Thus, the controller 30 controls the proportional valve 31BL and the proportional valve 33BL to ensure that the desired pilot pressure is applied to the pilot ports on the boom raising side of the control valves 175L and 175R.

The proportional valve 33BR operates in response to a control current input from the controller 30. Specifically, if the control current from the controller 30 is not input, the proportional valve 33BR outputs the pilot pressure corresponding to the boom lowering operation of the right operating lever 26R to the secondary outlet. In contrast, the proportional valve 33BR depressurizes the pilot pressure of the pilot line on the secondary outlet corresponding to the boom lowering operation of the right operating lever 26R to a degree corresponding to the control current when the control current from the controller 30 is input, and outputs the depressurized pilot pressure to one of the inlet ports of the shuttle valve 32BR. Accordingly, the proportional valve 33BR can forcibly suppress or stop the operation of the boom cylinder 7 corresponding to the boom lowering operation if necessary even when the boom lowering operation is performed by the right operating lever 26R. The proportional valve 33BR can also lower the pilot pressure acting on one of the inlet ports of the shuttle valve 32BR relative to the pilot pressure acting on the other inlet port of the shuttle valve 32BR from the proportional valve 31BR, even when the right operating lever 26R is in the boom lowering operation. Thus, the controller 30 controls the proportional valve 31BR and the proportional valve 33BR to ensure that the desired pilot pressure is applied to the pilot ports on the boom lowering side of the control valves 175L and 175R.

As described above, the proportional valves 33BL and 33BR can forcibly suppress or stop the operation of the boom cylinder 7 corresponding to the operational status of the right operating lever 26R in the forward-backward direction. The proportional valves 33BL and 33BR can also lower the pilots pressure acting on one of the inlet ports of the shuttle valves 32BL and 32BR and ensure that the pilot pressure of the proportional valves 31BL and 31BR acts on the pilot port of the control valves 175L and 175R through the shuttle valves 32BL and 32BR.

The controller 30 may control the proportional valve 31BR instead of the proportional valve 33BL to forcibly suppress or stop the operation of the boom cylinder 7 corresponding to the boom raising operation of the right operating lever 26R. For example, the controller 30 may control the proportional valve 31BR when the boom raising operation is performed with the right operating lever 26R to apply a predetermined pilot pressure from the proportional valve 31BR through the shuttle valve 32BR to the pilot port on the boom lowering side of the control valves 175L and 17R. As a result, the pilot pressure is applied to the pilot port on the boom lowering side of the control valves 175L and 175R in a manner opposite to the pilot pressure acting on the pilot port on the boom raising side of the control valves 175L and 175R from the right operating lever 26R through the shuttle valve 32BL. Accordingly, the controller 30 may forcibly bring the control valves 175L and 175R close to the neutral position to suppress or stop the operation of the boom cylinder 7 corresponding to the boom raising operation of the right operating lever 26R. Similarly, instead of controlling the proportional valve 33BR, the controller 30 may control the proportional valve 31BL to forcibly suppress or stop the operation of the boom cylinder 7 corresponding to the boom lowering operation of the right operating lever 26R.

The operating pressure sensor 29RA detects the operation detail in the forward-backward direction by an operator relative to the right operating lever 26R in the form of pressure (operating pressure), and the detection signal corresponding to the detected pressure is loaded into the controller 30. This allows the controller 30 to grasp the operation detail in the forward-backward direction with respect to the right operating lever 26R.

The controller 30 may supply the hydraulic oil discharged from the pilot pump 15 to the right pilot port of the control valve 175L and the left pilot port of the control valve 175R through the proportional valve 31BL and shuttle valve 32BL, regardless of the boom raising operation by an operator with respect to the right operating lever 26R. The controller 30 may also supply hydraulic oil discharged from the pilot pump 15 to the right pilot port of the control valve 175R through the proportional valve 31BR and shuttle valve 32BR, regardless of the boom lowering operation by the operator with respect to the right operating lever 26R. That is, the controller 30 can automatically control the raising/lowering operation of the boom 4 to realize an automatic operation function, a remote-control function, and the like of the shovel 100.

Figure 4C:
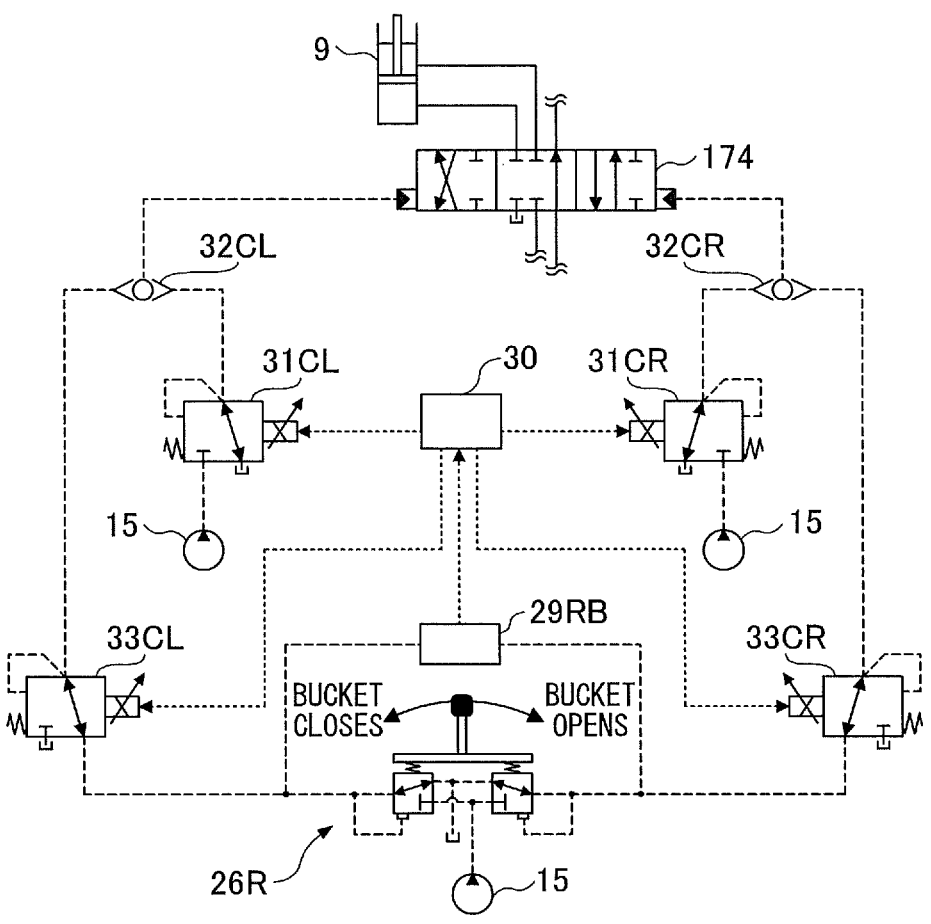
FIG. 4C illustrates an example of a part of components of the operating system for a bucket in the hydraulic system of the shovel.

As illustrated in FIG. 4C, the right operating lever 26R is used to operate the bucket cylinder 9 corresponding to the bucket 6 in a manner where the operator tilts in the left-right direction. That is, when the right operating lever 26R is tilted in the left-right direction, the bucket 6 is an operation target. The right operating lever 26R uses the hydraulic oil discharged from the pilot pump 15 to output the pilot pressure to the secondary outlet in response to the operation detail in the left-right direction.

Two inlet ports of a shuttle valve 32CL are connected to the pilot line of the secondary outlet in the right operating lever 26R corresponding to the direction of closing the bucket 6 (hereinafter referred to as "bucket closing operations") and connected to the pilot line of the secondary outlet in the proportional valve 31CL, respectively. The outlet port of the shuttle valve 32CL is connected to a left pilot port of the control valve 174.

Two inlet ports of a shuttle valve 32CR are connected to the pilot line of the secondary outlet in the right operating lever 26R corresponding to the direction of opening the bucket 6 (hereinafter referred to as "bucket opening operations") and connected to the pilot line of the secondary outlet in the proportional valve 31CR, respectively. The outlet port of the shuttle valve 32CR is connected to a right pilot port of the control valve 174.

That is, the right operating lever 26R acts on the pilot ports of the control valve 174 in response to the operation detail in the left-right direction through the shuttle valves 32CL and 32CR. Specifically, when closing the bucket, the right operating lever 26R outputs the pilot pressure in response to the amount of operation to one of the inlet ports of the shuttle valve 32CL and acts on the left pilot port of the control valve 174 through the shuttle valve 32CL. When the bucket is opened, the right operating lever 26R outputs the pilot pressure in response to the amount of operation to one of the inlet ports of the shuttle valve 32CR and acts on the right pilot port of the control valve 174 through the shuttle valve 32CR.

The proportional valve 31CL operates in response to a control current input from the controller 30. Specifically, the proportional valve 31CL uses hydraulic oil discharged from the pilot pump 15 to output the pilot pressure in response to the control current input from the controller 30 to the other pilot port of the shuttle valve 32CL. This allows the proportional valve 31CL to adjust the pilot pressure acting on the left pilot port of the control valve 174 through the shuttle valve 32CL.

The proportional valve 31CR operates in response to a control current input from the controller 30. Specifically, the proportional valve 31CR uses hydraulic oil discharged from the pilot pump 15 to output pilot pressure in response to the control current input from the controller 30 to the other pilot port of the shuttle valve 32CR. This allows the proportional valve 31CR to adjust the pilot pressure acting on the right pilot port of the control valve 174 through the shuttle valve 32CR.

That is, the proportional valves 31CL and 31CR can adjust the pilot pressure output to the secondary outlet so that the control valve 174 can be stopped at any valve position, regardless of the operational status of the right operating lever 26R in the left-right direction.

The proportional valve 33CL operates in response to a control current input from the controller 30. Specifically, if the control current from the controller 30 is not input, the proportional valve 33CL outputs the pilot pressure corresponding to the bucket closing operation of the right operating lever 26R to the secondary outlet. In contrast, the proportional valve 33CL depressurizes the pilot pressure of the pilot line on the secondary outlet corresponding to the bucket closing operation of the right operating lever 26R to a degree corresponding to the control current when the control current from the controller 30 is input, and outputs the depressurized pilot pressure to one of the inlet ports of the shuttle valve 32CL. Accordingly, the proportional valve 33CL can forcibly suppress or stop the operation of the bucket cylinder 9 corresponding to the bucket closing operation if necessary even when the bucket closing operation is performed by the right operating lever 26R. The proportional valve 33CL can also lower the pilot pressure acting on one of the inlet ports of the shuttle valve 32CL relative to the pilot pressure acting on the other inlet port of the shuttle valve 32CL from the proportional valve 31CL, even when the right operating lever 26R is in the bucket closing operation. Thus, the controller 30 controls the proportional valve 31CL and the proportional valve 33CL to ensure that the desired pilot pressure is applied to the pilot ports on the bucket closing side of the control valve 174.

The proportional valve 33CR operates in response to a control current input from the controller 30. Specifically, if the control current from the controller 30 is not input, the proportional valve 33CR outputs the pilot pressure corresponding to the bucket opening operation of the right operating lever 26R to the secondary outlet. In contrast, the proportional valve 33CR depressurizes the pilot pressure of the pilot line on the secondary outlet corresponding to the bucket opening operation of the right operating lever 26R to a degree corresponding to the control current when the control current from the controller 30 is input, and outputs the depressurized pilot pressure to one of the inlet ports of the shuttle valve 32CR. Accordingly, the proportional valve 33CR can forcibly suppress or stop the operation of the bucket cylinder 9 corresponding to the bucket opening operation if necessary even when the bucket opening operation is performed by the right operating lever 26R. The proportional valve 33CR can also lower the pilot pressure acting on one of the inlet ports of the shuttle valve 32CR relative to the pilot pressure acting on the other inlet port of the shuttle valve 32CR from the proportional valve 31CR, even when the right operating lever 26R is in the bucket opening operation. Thus, the controller 30 controls the proportional valve 31CR and the proportional valve 33CR to ensure that the desired pilot pressure is applied to the pilot ports on the bucket opening side of the control valve 174.

As described above, the proportional valves 33CL and 33CR can forcibly suppress or stop the operation of the bucket cylinder 9 corresponding to the operational status of the right operating lever 26R in the left-right direction. The proportional valves 33CL and 33CR can also lower the pilot pressure acting on one of the inlet ports of the shuttle valves 32CL and 32CR and ensure that the pilot pressure of the proportional valves 31CL and 31CR acts on the pilot port of the control valve 174 through the shuttle valves 32CL and 32CR.

The controller 30 may control the proportional valve 31CR instead of the proportional valve 33CL to forcibly suppress or stop the operation of the bucket cylinder 9 corresponding to the bucket closing operation of the right operating lever 26R. For example, the controller 30 may control the proportional valve 31CR when the bucket closing operation is performed with the right operating lever 26R to apply a predetermined pilot pressure from the proportional valve 31CR through the shuttle valve 32CR to the pilot port on the bucket opening side of the control valve 174. As a result, the pilot pressure is applied to the pilot port on the bucket closing side of the control valve 174 in a manner opposite to the pilot pressure acting on the pilot port on the bucket opening side of the control valve 174 from the right operating lever 26R through the shuttle valve 32CL. Accordingly, the controller 30 may forcibly bring the control valve 174 close to the neutral position to suppress or stop the operation of the bucket cylinder 9 corresponding to the bucket closing operation of the right operating lever 26R. Similarly, instead of controlling the proportional valve 33CR, the controller 30 may control the proportional valve 31CL to forcibly suppress or stop the operation of the bucket cylinder 9 corresponding to the bucket opening operation of the right operating lever 26R.

The operating pressure sensor 29RB detects the operation detail in the left-right direction by an operator relative to the right operating lever 26R in the form of pressure (operating pressure), and the detection signal corresponding to the detected pressure is loaded into the controller 30. This allows the controller 30 to grasp the operation detail in the left-right direction with respect to the right operating lever 26R.

The controller 30 may supply the hydraulic oil discharged from the pilot pump 15 to the left pilot port of the control valve 175L and the left pilot port of the control valve 174 through the proportional valve 31CL and shuttle valve 32CL, regardless of the bucket closing operation by an operator with respect to the right operating lever 26R. The controller 30 may also supply hydraulic oil discharged from the pilot pump 15 to the right pilot port of the control valve 174 through the proportional valve 31CR and shuttle valve 32CR, regardless of the bucket opening operation by the operator with respect to the right operating lever 26R. That is, the controller 30 can automatically control the opening/closing operation of the bucket 6 to realize an automatic operation function, a remote-control function, and the like of the shovel 100.

Figure 4D:
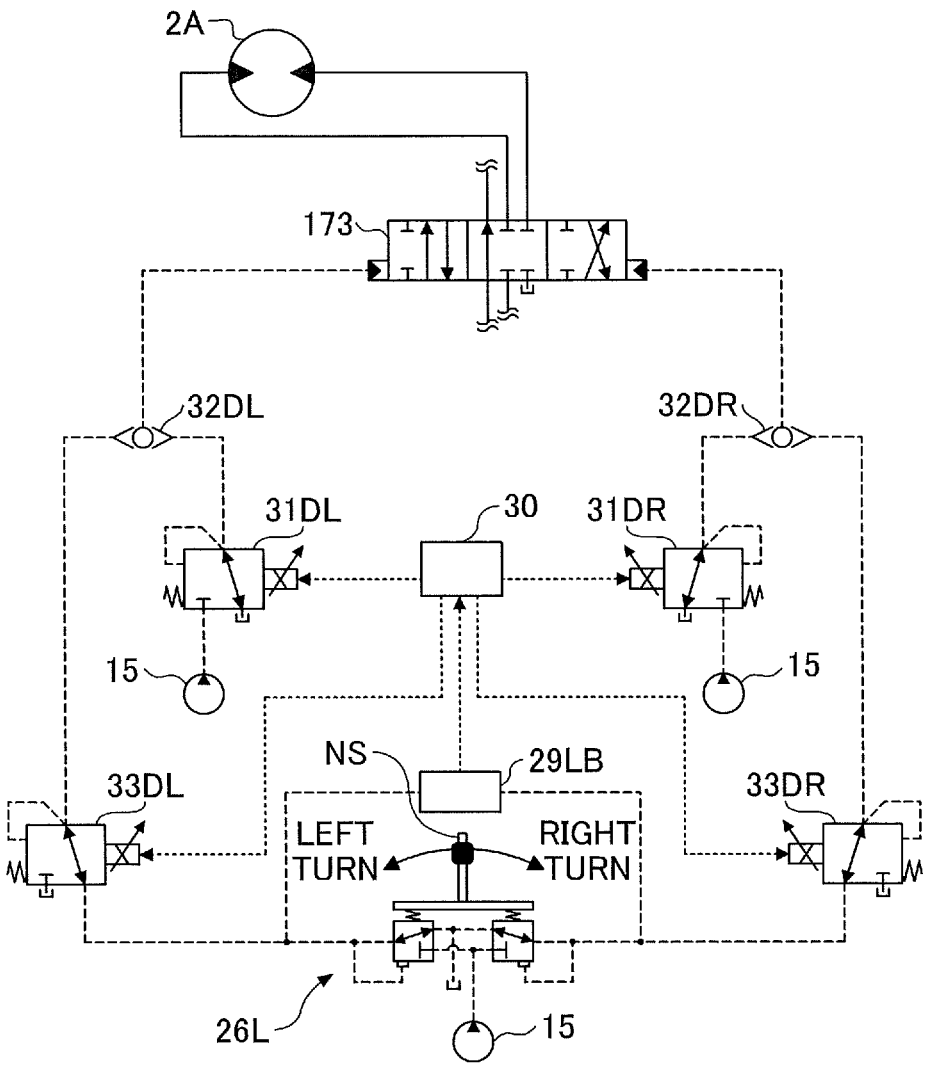
FIG. 4D illustrates an example of a part of components of the operating system for an upper turning structure in the hydraulic system of the shovel.

For example, as illustrated in FIG. 4D, the left operating lever 26L is used to operate the turning hydraulic oil motor 2A corresponding to the upper turning structure 3 (turning mechanism 2) in a manner where the operator tilts in the left-right direction. That is, when the left operating lever 26L is tilted in the left-right direction, the upper turning structure 3 is an operation target. The left operating lever 26L uses the hydraulic oil discharged from the pilot pump 15 to output the pilot pressure to the secondary outlet in response to the operation detail in the left-right direction.

Two inlet ports of a shuttle valve 32DL are connected to the pilot line of the secondary outlet in the left operating lever 26L corresponding to the left turn operation of the upper turning structure 3 (hereinafter referred to as "left turn operation") and connected to the pilot line of the secondary outlet in the proportional valve 31DL, respectively. The outlet port of the shuttle valve 32DL is connected to a left pilot port of the control valve 173.

Two inlet ports of a shuttle valve 32DR are connected to the pilot line of the secondary outlet in the left operating lever 26L corresponding to the right turn operation of the upper turning structure 3 (hereinafter referred to as "right turn operation") and connected to the pilot line of the secondary outlet in the proportional valve 31DR, respectively. The outlet port of the shuttle valve 32DR is connected to a right pilot port of the control valve 173.

That is, the left operating lever 26L acts on the pilot ports of the control valve 173 in response to the operation detail in the left-right direction through the shuttle valves 32DL and 32DR. Specifically, when a left turning operation is conducted, the left operating lever 26L outputs the pilot pressure in response to the amount of operation to one of the inlet ports of the shuttle valve 32DL and acts on the left pilot port of the control valve 173 through the shuttle valve 32DL. When the right turning operation is conducted, the left operating lever 26L outputs the pilot pressure in response to the amount of operation to one of the inlet ports of the shuttle valve 32DR and acts on the right pilot port of the control valve 173 through the shuttle valve 32DR.

The proportional valve 31DL operates in response to a control current input from the controller 30. Specifically, the proportional valve 31DL uses hydraulic oil discharged from the pilot pump 15 to output pilot pressure in response to the control current input from the controller 30 to the other pilot port of the shuttle valve 32DL. This allows the proportional valve 31DL to adjust the pilot pressure acting on the left pilot port of the control valve 173 through the shuttle valve 32DL.

The proportional valve 31DR operates in response to a control current input from the controller 30. Specifically, the proportional valve 31DR uses hydraulic oil discharged from the pilot pump 15 to output pilot pressure in response to the control current input from the controller 30 to the other pilot port of the shuttle valve 32DR. This allows the proportional valve 31DR to adjust the pilot pressure acting on the right pilot port of the control valve 173 through the shuttle valve 32DR.

That is, the proportional valves 31DL and 31DR can adjust the pilot pressure output to the secondary outlet so that the control valve 173 can be stopped at any valve position, regardless of the operational status of the left operating lever 26L in the left-right direction.

The proportional valve 33DL operates in response to a control current input from the controller 30. Specifically, if the control current from the controller 30 is not input, the proportional valve 33DL outputs the pilot pressure corresponding to the left turn operation of the left operating lever 26L to the secondary outlet. In contrast, the proportional valve 33DL depressurizes the pilot pressure of the pilot line on the secondary outlet corresponding to the left turning operation of the left operating lever 26L to a degree corresponding to the control current when the control current from the controller 30 is input, and outputs the depressurized pilot pressure to one of the inlet ports of the shuttle valve 32DL. Accordingly, the proportional valve 33DL can forcibly suppress or stop the operation of the turning hydraulic oil motor 2A corresponding to the left turning operation if necessary even when the left turning operation is performed by the left operating lever 26L. The proportional valve 33DL can also lower the pilot pressure acting on one of the inlet ports of the shuttle valve 32DL relative to the pilot pressure acting on the other inlet port of the shuttle valve 32DL from the proportional valve 31DL, even when the left operating lever 26L is in the left turning operation. Thus, the controller 30 controls the proportional valve 31DL and the proportional valve 33DL to ensure that the desired pilot pressure is applied to the pilot ports on the left turning side of the control valve 173.

The proportional valve 33DR operates in response to a control current input from the controller 30. Specifically, if the control current from the controller 30 is not input, the proportional valve 33DR outputs the pilot pressure corresponding to the right turn operation of the left operating lever 26L to the secondary outlet. In contrast, the proportional valve 33DR depressurizes the pilot pressure of the pilot line on the secondary outlet corresponding to the right turning operation of the left operating lever 26L to a degree corresponding to the control current when the control current from the controller 30 is input, and outputs the depressurized pilot pressure to one of the inlet ports of the shuttle valve 32DR. Accordingly, the proportional valve 33DR can forcibly suppress or stop the operation of the turning hydraulic oil motor 2A corresponding to the left turning operation if necessary even when the right turning operation is performed by the left operating lever 26L. The proportional valve 33DR can also lower the pilot pressure acting on one of the inlet ports of the shuttle valve 32DR relative to the pilot pressure acting on the other inlet port of the shuttle valve 32DR from the proportional valve 31DR, even when the left operating lever 26L is in the right turning operation. Thus, the controller 30 controls the proportional valve 31DR and the proportional valve 33DR to ensure that the desired pilot pressure is applied to the pilot ports on the right turning side of the control valve 173.

As described above, the proportional valves 33DL and 33DR can forcibly suppress or stop the operation of the turning hydraulic oil motor 2A corresponding to the operational status of the left operating lever 26L in the left-right direction. The proportional valves 33DL and 33DR can also lower the pilot pressure acting on one of the inlet ports of the shuttle valves 32DL and 32DR and ensure that the pilot pressure of the proportional valves 31DL and 31DR acts on the pilot port of the control valve 173 through the shuttle valves 32DL and 32DR.

The controller 30 may control the proportional valve 31DR instead of the proportional valve 33DL to forcibly suppress or stop the operation of the turning hydraulic oil motor 2A corresponding to the left turning operation of the left operating lever 26L. For example, the controller 30 may control the proportional valve 31DR when the left turning operation is performed with the left operating lever 26L to apply a predetermined pilot pressure from the proportional valve 31DR through the shuttle valve 32DR to the pilot port on the right turning side of the control valve 173. As a result, the pilot pressure is applied to the pilot port on the right turning side of the control valve 173 in a manner opposite to the pilot pressure acting on the pilot port on the left turning side of the control valve 173 from the left operating lever 26L through the shuttle valve 32DL. Accordingly, the controller 30 may forcibly bring the control valve 173 close to the neutral position to suppress or stop the operation of the turning hydraulic oil motor 2A corresponding to the left turning operation of the left operating lever 26L. Similarly, instead of controlling the proportional valve 33DR, the controller 30 may control the proportional valve 31DL to forcibly suppress or stop the operation of the turning hydraulic oil motor 2A corresponding to the right turning operation of the left operating lever 26L.

The operating pressure sensor 29LB detects the operational status by an operator with respect to the left operating lever 26L in the form of pressure, and the detection signal corresponding to the detected pressure is loaded into the controller 30. This allows the controller 30 to grasp the operation detail in the left-right direction with respect to the left operating lever 26L.

The controller 30 may supply the hydraulic oil discharged from the pilot pump 15 to the left pilot port of the control valve 173 through the proportional valve 31DL and shuttle valve 32DL, regardless of the left turning operation by an operator with respect to the left operating lever 26L. The controller 30 may also supply hydraulic oil discharged from the pilot pump 15 to the right pilot port of the control valve 173 through the proportional valve 31DR and shuttle valve 32DR, regardless of the right turning operation by the operator with respect to the left operating lever 26L. That is, the controller 30 can automatically control the turning operation of the upper turning structure 3 in the left-right direction to realize an automatic operation function, a remote-control function, and the like of the shovel 100.

For example, as illustrated in FIG. 5A, a left traveling lever 26DL is used to operate a traveling hydraulic oil motor 2ML corresponding to a left crawler 1CL. That is, the left traveling lever 26DL is an operation target. The left traveling lever 26DL uses the hydraulic oil discharged from the pilot pump 15 to output the pilot pressure to the secondary outlet in response to the operation detail in the forward-backward direction.

Two inlet ports of a shuttle valve 32EL are connected to the pilot line of the secondary outlet in the left traveling lever 26DL corresponding to the operation in the forward direction of the left crawler 1 CL (hereinafter referred to as "operation in the forward direction") and connected to the pilot line of the secondary outlet in the proportional valve 31EL, respectively. The outlet port of the shuttle valve 32EL is connected to a left pilot port of the control valve 171.

Two inlet ports of a shuttle valve 32ER are connected to the pilot line of the secondary outlet in the left traveling lever 26DL corresponding to the operation in the backward direction of the left crawler 1 CL (hereinafter referred to as "operation in the backward direction") and connected to the pilot line of the secondary outlet in the proportional valve 31ER, respectively. The outlet port of the shuttle valve 32ER is connected to a right pilot port of the control valve 171.

That is, the left traveling lever 26DL acts on the pilot ports of the control valve 171 in response to the operation detail in the forward-backward direction through the shuttle valves 32EL and 32ER. Specifically, when the operation in the forward direction is conducted, the left traveling lever 26DL outputs the pilot pressure in response to the amount of operation to one of the inlet ports of the shuttle valve 32EL and acts on the left pilot port of the control valve 171 through the shuttle valve 32EL. When the operation in the forward direction is conducted, the left traveling lever 26DL outputs the pilot pressure in response to the amount of operation to one of the inlet ports of the shuttle valve 32ER and acts on the right pilot port of the control valve 171 through the shuttle valve 32ER.

The proportional valve 31EL operates in response to a control current input from the controller 30. Specifically, the proportional valve 31EL uses hydraulic oil discharged from the pilot pump 15 to output pilot pressure in response to the control current input from the controller 30 to the other pilot port of the shuttle valve 32EL. This allows the proportional valve 31EL to adjust the pilot pressure acting on the left pilot port of the control valve 171 through the shuttle valve 32EL.

The proportional valve 31ER operates in response to a control current input from the controller 30. Specifically, the proportional valve 31ER uses hydraulic oil discharged from the pilot pump 15 to output pilot pressure in response to the control current input from the controller 30 to the other pilot port of the shuttle valve 32ER. This allows the proportional valve 31ER to adjust the pilot pressure acting on the right pilot port of the control valve 171 through the shuttle valve 32ER.

That is, the proportional valves 31EL and 31ER can adjust the pilot pressure output to the secondary outlet so that the control valve 171 can be stopped at any valve position, regardless of the operational status of the left traveling lever 26DL.

The proportional valve 33EL operates in response to a control current input from the controller 30. Specifically, if the control current from the controller 30 is not input, the proportional valve 33EL outputs the pilot pressure corresponding to the operation in the forward direction of the left traveling lever 26DL to the secondary outlet. In contrast, the proportional valve 33EL depressurizes the pilot pressure of the pilot line on the secondary outlet corresponding to the operation in the forward direction of the left traveling lever 26DL to a degree corresponding to the control current when the control current from the controller 30 is input, and outputs the depressurized pilot pressure to one of the inlet ports of the shuttle valve 32EL. Accordingly, the proportional valve 33EL can forcibly suppress or stop the operation of the traveling hydraulic oil motor 2ML corresponding to the operation in the forward direction if necessary even when the operation in the forward direction is performed by the left traveling lever 26DL. The proportional valve 33EL can also lower the pilot pressure acting on one of the inlet ports of the shuttle valve 32EL relative to the pilot pressure acting on the other inlet port of the shuttle valve 32EL from the proportional valve 31EL, even when the left traveling lever 26DL is in the operation in the forward direction. Thus, the controller 30 controls the proportional valve 31EL and the proportional valve 33EL to ensure that the desired pilot pressure is applied to the pilot ports on the operation in the forward direction side of the control valve 171.

The proportional valve 33ER operates in response to a control current input from the controller 30. Specifically, if the control current from the controller 30 is not input, the proportional valve 33ER outputs the pilot pressure corresponding to the operation in the backward direction of the left traveling lever 26DL to the secondary outlet. In contrast, the proportional valve 33ER depressurizes the pilot pressure of the pilot line on the secondary outlet corresponding to the operation in the backward direction of the left traveling lever 26DL to a degree corresponding to the control current when the control current from the controller 30 is input, and outputs the depressurized pilot pressure to one of the inlet ports of the shuttle valve 32ER. Accordingly, the proportional valve 33ER can forcibly suppress or stop the operation of the traveling hydraulic oil motor 2ML corresponding to the operation in the backward direction if necessary even when the operation in the backward direction is performed by the left traveling lever 26DL. The proportional valve 33ER can also lower the pilot pressure acting on one of the inlet ports of the shuttle valve 32ER relative to the pilot pressure acting on the other inlet port of the shuttle valve 32ER from the proportional valve 31ER, even when the left traveling lever 26DL is in the operation in the backward direction. Thus, the controller 30 controls the proportional valve 31ER and the proportional valve 33ER to ensure that the desired pilot pressure is applied to the pilot ports on the operation in the backward direction side of the control valve 171.

As described above, the proportional valves 33EL and 33ER can forcibly suppress or stop the operation of the traveling hydraulic oil motor 2ML corresponding to the operational status of the left traveling lever 26DL in the forward-backward direction. The proportional valves 33EL and 33ER can also lower the pilot pressure acting on one of the inlet ports of the shuttle valves 32EL and 32ER and ensure that the pilot pressure of the proportional valves 31EL and 31ER acts on the pilot port of the control valve 171 through the shuttle valves 32EL and 32ER.

The controller 30 may control the proportional valve 31ER instead of the proportional valve 33EL to forcibly suppress or stop the operation of the traveling hydraulic oil motor 2ML corresponding to the forward operation of the left traveling lever 26DL. For example, the controller 30 may control the proportional valve 31ER when the forward operation is performed with the left traveling lever 26DL to apply a predetermined pilot pressure from the proportional valve 31ER through the shuttle valve 32ER to the pilot port on the backward side of the control valve 171. As a result, the pilot pressure is applied to the pilot port on the backward side of the control valve 171 in a manner opposite to the pilot pressure acting on the pilot port on the forward side of the control valve 171 from the left traveling lever 26DL through the shuttle valve 32EL. Accordingly, the controller 30 may forcibly bring the control valve 171 close to the neutral position to suppress or stop the operation of the traveling hydraulic oil motor 2ML corresponding to the forward operation of the left traveling lever 26DL. Similarly, instead of controlling the proportional valve 33ER, the controller 30 may control the proportional valve 31EL to forcibly suppress or stop the operation of the traveling hydraulic oil motor 2ML corresponding to the backward operation of the left traveling lever 26DL.

The operating pressure sensor 29DL detects the operational detail to the forward-backward direction by an operator with respect to the left traveling lever 26DL in the form of pressure, and the detection signal corresponding to the detected pressure is loaded into the controller 30. This allows the controller 30 to grasp the operation detail in the forward-backward direction with respect to the left traveling lever 26DL.

The controller 30 may supply the hydraulic oil discharged from the pilot pump 15 to the left pilot port of the control valve 171 through the proportional valve 31EL and shuttle valve 32EL, regardless of the forward operation by an operator with respect to the left traveling lever 26DL. The controller 30 may also supply hydraulic oil discharged from the pilot pump 15 to the right pilot port of the control valve 171 through the proportional valve 31ER and shuttle valve 32ER, regardless of the backward operation by the operator with respect to the left traveling lever 26DL. That is, the controller 30 can automatically control the traveling operation of the left crawler 1CL in the forward-backward direction to realize an automatic operation function, a remote-control function, and the like of the shovel 100.

For example, as illustrated in FIG. 5B, a right traveling lever 26DR is used to operate a traveling hydraulic oil motor 2MR corresponding to a right crawler 1CR. That is, the right crawler 1CR is an operation target. The right traveling lever 26DR uses the hydraulic oil discharged from the pilot pump 15 to output the pilot pressure to the secondary outlet in response to the operation detail in the forward-backward direction.

Two inlet ports of a shuttle valve 32FR are connected to the pilot line of the secondary outlet in the right traveling lever 26DR corresponding to the operation in the forward direction of the right crawler 1CR and connected to the pilot line of the secondary outlet in the proportional valve 31FR, respectively. The outlet port of the shuttle valve 32FR is connected to a right pilot port of the control valve 172.

Two inlet ports of a shuttle valve 32FL are connected to the pilot line of the secondary outlet in the right traveling lever 26DR corresponding to the operation in the backward direction of the right crawler 1CR and connected to the pilot line of the secondary outlet in the proportional valve 31FL, respectively. The outlet port of the shuttle valve 32FL is connected to a left pilot port of the control valve 172.

That is, the right traveling lever 26DR acts on the pilot ports of the control valve 172 in response to the operation detail in the forward-backward direction through the shuttle valves 32FL and 32FR. Specifically, when the operation in the forward direction is conducted, the right traveling lever 26DR outputs the pilot pressure in response to the amount of operation to one of the inlet ports of the shuttle valve 32FR and acts on the right pilot port of the control valve 172 through the shuttle valve 32FR. When the operation in the backward direction is conducted, the right traveling lever 26DR outputs the pilot pressure in response to the amount of operation to one of the inlet ports of the shuttle valve 32FL and acts on the left pilot port of the control valve 172 through the shuttle valve 32FL.

The proportional valve 31FL operates in response to a control current input from the controller 30. Specifically, the proportional valve 31FL uses hydraulic oil discharged from the pilot pump 15 to output pilot pressure in response to the control current input from the controller 30 to the other pilot port of the shuttle valve 32FL. This allows the proportional valve 31FL to adjust the pilot pressure acting on the left pilot port of the control valve 172 through the shuttle valve 32FL.

The proportional valve 31FR operates in response to a control current input from the controller 30. Specifically, the proportional valve 31FR uses hydraulic oil discharged from the pilot pump 15 to output pilot pressure in response to the control current input from the controller 30 to the other pilot port of the shuttle valve 32FR. This allows the proportional valve 31FR to adjust the pilot pressure acting on the right pilot port of the control valve 172 through the shuttle valve 32FR.

That is, the proportional valves 31FL and 31FR can adjust the pilot pressure output to the secondary outlet so that the control valve 172 can be stopped at any valve position, regardless of the operational status of the right traveling lever 26DR.

The proportional valve 33FL operates in response to a control current input from the controller 30. Specifically, if the control current from the controller 30 is not input, the proportional valve 33FL outputs the pilot pressure corresponding to the operation in the forward direction of the right traveling lever 26DR to the secondary outlet. In contrast, the proportional valve 33FL depressurizes the pilot pressure of the pilot line on the secondary outlet corresponding to the operation in the forward direction of the right traveling lever 26DR to a degree corresponding to the control current when the control current from the controller 30 is input, and outputs the depressurized pilot pressure to one of the inlet ports of the shuttle valve 32FL. Accordingly, the proportional valve 33FL can forcibly suppress or stop the operation of the traveling hydraulic oil motor 2MR corresponding to the operation in the forward direction if necessary even when the operation in the forward direction is performed by the right traveling lever 26DR. The proportional valve 33FL can also lower the pilot pressure acting on one of the inlet ports of the shuttle valve 32FL relative to the pilot pressure acting on the other inlet port of the shuttle valve 32FL from the proportional valve 31FL, even when the right traveling lever 26DR is in the operation in the forward direction. Thus, the controller 30 controls the proportional valve 31FL and the proportional valve 33FL to ensure that the desired pilot pressure is applied to the pilot ports on the operation in the forward direction side of the control valve 172.

The proportional valve 33FR operates in response to a control current input from the controller 30. Specifically, if the control current from the controller 30 is not input, the proportional valve 33FR outputs the pilot pressure corresponding to the operation in the backward direction of the right traveling lever 26DR to the secondary outlet. In contrast, the proportional valve 33FR depressurizes the pilot pressure of the pilot line on the secondary outlet corresponding to the operation in the backward direction of the right traveling lever 26DR to a degree corresponding to the control current when the control current from the controller 30 is input, and outputs the depressurized pilot pressure to one of the inlet ports of the shuttle valve 32FR. Accordingly, the proportional valve 33FR can forcibly suppress or stop the operation of the traveling hydraulic oil motor 2MR corresponding to the operation in the backward direction if necessary even when the operation in the backward direction is performed by the right traveling lever 26DR. The proportional valve 33FR can also lower the pilot pressure acting on one of the inlet ports of the shuttle valve 32FR relative to the pilot pressure acting on the other inlet port of the shuttle valve 32FR from the proportional valve 31FR, even when the right traveling lever 26DR is in the operation in the backward direction. Thus, the controller 30 controls the proportional valve 31FR and the proportional valve 33FR to ensure that the desired pilot pressure is applied to the pilot ports on the operation in the backward direction side of the control valve 172.

As described above, the proportional valves 33FL and 33FR can forcibly suppress or stop the operation of the traveling hydraulic oil motor 2MR corresponding to the operational status of the right traveling lever 26DR in the left-right direction. The proportional valves 33FL and 33FR can also lower the pilot pressure acting on one of the inlet ports of the shuttle valves 32FL and 32FR and ensure that the pilot pressure of the proportional valves 31FL and 31FR acts on the pilot port of the control valve 172 through the shuttle valves 32FL and 32FR.

The controller 30 may control the proportional valve 31FR instead of the proportional valve 33FL to forcibly suppress or stop the operation of the traveling hydraulic oil motor 2MR corresponding to the forward operation of the right traveling lever 26DR. For example, the controller 30 may control the proportional valve 31FR when the forward operation is performed with the right traveling lever 26DR to apply a predetermined pilot pressure from the proportional valve 31FR through the shuttle valve 32FR to the pilot port on the backward side of the control valve 172. As a result, the pilot pressure is applied to the pilot port on the backward side of the control valve 172 in a manner opposite to the pilot pressure acting on the pilot port on the forward side of the control valve 172 from the right traveling lever 26DR through the shuttle valve 32FL. Accordingly, the controller 30 may forcibly bring the control valve 172 close to the neutral position to suppress or stop the operation of the traveling hydraulic oil motor 2MR corresponding to the forward operation of the right traveling lever 26DR. Similarly, instead of controlling the proportional valve 33FR, the controller 30 may control the proportional valve 31FL to forcibly suppress or stop the operation of the traveling hydraulic oil motor 2MR corresponding to the backward operation of the right traveling lever 26DR.

The operating pressure sensor 29DR detects the operational detail to the forward-backward direction by an operator with respect to the right traveling lever 26DR in the form of pressure, and the detection signal corresponding to the detected pressure is loaded into the controller 30. This allows the controller 30 to grasp the operation detail in the forward-backward direction with respect to the right traveling lever 26DR.

The controller 30 may supply the hydraulic oil discharged from the pilot pump 15 to the right pilot port of the control valve 172 through the proportional valve 31FR and shuttle valve 32FR, regardless of the forward operation by an operator with respect to the right traveling lever 26DR. The controller 30 may also supply hydraulic oil discharged from the pilot pump 15 to the left pilot port of the control valve 172 through the proportional valve 31FL and shuttle valve 32FL, regardless of the backward operation by the operator with respect to the right traveling lever 26DR. That is, the controller 30 can automatically control the traveling operation of the right crawler 1CR in the forward-backward direction to realize an automatic operation function, a remote-control function, and the like of the shovel 100.

The control system of the shovel 100 according to the present embodiment includes the controller 30, a spatial recognition device 70, an orientation detecting device 71, an input device 72, a positioning device 73, a short-range communication device 74, a display device D1, an audio output device D2, a boom angle sensor S1, an arm angle sensor S2, a bucket angle sensor S3, an airframe tilt sensor S4, and a turning status sensor S5.

The controller 30 controls the shovel 100 as described above.

For example, the controller 30 sets a target rotation speed based on a work mode preset by a predetermined operation on the input device 72, such as an operator, and performs drive control for constant rotation of the engine 11.

For example, the controller 30 outputs a control command to the regulator 13 as needed to change the discharge amount of the main pump 14.

For example, when the operating device 26 is electric, the controller 30 may control the proportional valve 31 to realize the operation of the hydraulic actuator according to the operation detail of the operating device 26 as described above.

For example, the controller 30 may realize the remote-control operation of the shovel 100 using the proportional valve 31. Specifically, the controller 30 may output to the proportional valve 31 a control command corresponding to the detail of the remote-control specified by the remote-control signal received from an external device. The proportional valve 31 may then use the hydraulic oil supplied from the pilot pump 15 to output a pilot pressure corresponding to a control command from the controller 30 to apply the pilot pressure to the pilot port of the corresponding control valve in the control valve 17. Thus, the detail of the remote-control operation are reflected in the operation of the control valve 17, and the hydraulic actuator realizes the operation of various operating elements (driven elements) according to the detail of the remote-control.

For example, the controller 30 controls a peripheral monitoring function. In the peripheral monitoring function, based on the information acquired by the spatial recognition device 70, intruding of a monitoring target into a predetermined range (hereinafter referred to as "monitoring range") around the shovel 100 is monitored. Determining the entry of a monitoring target into the monitoring range may be performed by the spatial recognition device 70 or by an external unit (for example, the controller 30) of the spatial recognition device 70. Monitoring targets may include, for example, persons, trucks, trailers, other construction machines, poles, suspended loads, pylons, buildings, and the like.

For example, the controller 30 controls an object detection alarm function. In the object detection alarm function, when it is determined that a monitoring target is in the monitoring range, the peripheral monitoring function notifies the presence of a monitoring target with respect to the operator in the cabin 10 or the surroundings of the shovel 100. The controller 30 may realize the object detection alarm function using, for example, a display device D1 or an audio output device D2.

For example, the controller 30 controls an operation restriction function. In the operation restriction function, for example, the operation of the shovel 100 is restricted when it is determined that a monitoring target is in the monitoring range of the peripheral monitoring function. Hereinafter, the case where the monitoring target is a person will be mainly described.

For example, the controller 30 may allow the operator to operate the operating device 26, disable the operation of the actuator, or limit the operation to the operation in a slow speed status, when it is determined that a monitoring target such as a person is within a predetermined range (within the monitoring range) from the shovel 100 based on the information acquired by the spatial recognition device 70 before the actuator operates. Specifically, the controller 30 may disable the actuator by locking the gate lock valve when it is determined that a person is within the monitoring range. In the case of the electric operating device 26, the actuator can be disabled by disabling the signal from the controller 30 to the operating proportional valve (proportional valve 31). The same applies to other types of operating devices 26 when an operational proportional valve (proportional valve 31) is used to output a pilot pressure corresponding to a control command from the controller 30 and to apply the pilot pressure to a pilot port of a corresponding control valve in the control valve 17. When it is desired to operate the actuator at a slow speed, the control signal from the controller 30 to the operation proportional valve (proportional valve 31) can be limited to the detail corresponding to the relatively small pilot pressure, thereby allowing the actuator to operate at a slow speed. Thus, when it is determined that the monitoring target is within the monitored range, the actuator is not driven even if the operating device 26 is operated, or is driven at an operating speed (slow speed) that is less than the operating speed corresponding to the operating input to the operating device 26. Additionally, the actuator operation may be stopped or decelerated regardless of the operator's operation when it is determined that the monitoring target, such as a person, is within the monitored range while the operator is operating the operation device 26. Specifically, the actuator may be stopped by locking the gate lock valve when it is determined that a person is within the monitoring range. When a pilot pressure corresponding to a control command from the controller 30 is output and an operation proportional valve (proportional valve 31) is used to apply the pilot pressure to a pilot port of a corresponding control valve in the control valve, the actuator may be disabled or restricted to a slow speed by a signal from the controller 30 to the operation proportional valve (proportional valve 31) or a deceleration command may be output to the operation proportional valve (proportional valve 31). Also, when the detected monitoring target is a truck, a control relating to stop the actuator or to decelerate the actuator may not be performed. For example, the actuator may be controlled to avoid the detected truck. In this manner, the type of object detected is recognized and the actuator may be controlled based on that recognition.

The controller 30 may, of course, be applied to the case where the remote-control operation of the shovel 100 is performed with the same operation restriction function as that of the operating device 26. In this case, the remote-control may include the manner in which the shovel 100 is allowed to automatically load and unload to and from a trailer by automatic loading and unloading commands transmitted from the support device 200 to the shovel 100. That is, the controller 30 may restrict the actuator's operation to disable or slow speed operation even when an automatic loading command or an automatic unloading command is received when it is determined that a person is within the monitoring range from the shovel 100 based on the information acquired by the spatial recognition device 70 before the actuator operates. The controller 30 may also stop or decelerate the operation of the actuator regardless of the automatic loading command or the automatic unloading command when it is determined that a monitoring target, such as a person, is within the monitored range while the actuator is operating in response to receiving the automatic loading command or the automatic unloading command.

The spatial recognition device 70 is configured to recognize an object present in the three-dimensional space around the shovel 100 and measure (calculate) a positional relationship such as a distance from the spatial recognition device 70 or the shovel 100 to the recognized object. The spatial recognition device 70 may include, for example, an ultrasonic sensor, a millimeter wave radar, a monocular camera, a stereo camera, Light Detecting and Ranging (LIDAR), a distance image sensor, an infrared sensor, and the like. In the present embodiment, the spatial recognition device 70 includes a forward recognition sensor 70F mounted on the top front end of the cabin 10, a backward recognition sensor 70B mounted on the top rear end of the upper turning structure 3, a left recognition sensor 70L mounted on the top left end of the upper turning structure 3, and a right recognition sensor 70R mounted on the top right end of the upper turning structure 3. The shovel 100 may also be mounted with an upward recognition sensor for recognizing objects present in the upper space of the upper turning structure 3.

An orientation detecting device 71 detects information regarding the relative relationship between the orientation of the upper turning structure 3 and the orientation of the lower traveling structure 1 (for example, the turning angle of the upper turning structure 3 relative to the lower traveling structure 1).

The orientation detecting device 71 may include, for example, a combination of a geomagnetic sensor mounted on the lower traveling structure 1 and a geomagnetic sensor mounted on the upper turning structure 3. The orientation detecting device 71 may also include a combination of a GNSS (Global Navigation Satellite System) receiver mounted on the lower traveling structure 1 and a GNSS receiver mounted on the upper turning structure 3. The orientation detecting device 71 may include a rotary encoder, a rotary position sensor, or the like capable of detecting a relative turning angle with respect to the lower traveling structure 1 of the upper turning structure 3, that is, a turning status sensor S5 described later. For example, the orientation detecting device 71 may be mounted to a center joint that is turned in connection with the turning mechanism 2 for realizing a relative rotation between the lower traveling structure 1 and the upper turning structure 3. The orientation detecting device 71 may also include a camera mounted on the upper turning structure 3. In this case, the orientation detecting device 71 detects the image of the lower traveling structure 1 included in the input image by performing known image processing on the image (the input image) captured by the camera mounted on the upper turning structure 3. The orientation detecting device 71 can specify the longitudinal direction of the lower traveling structure 1 by detecting an image of the lower traveling structure 1 using a known image recognition technique and derive an angle formed between the direction of the front and rear axes of the upper turning structure 3 and the longitudinal direction of the lower traveling structure 1. At this time, the direction of the front and rear axes of the upper turning structure 3 can be derived from the position where the camera is mounted. In particular, since the crawler 1C protrudes from the upper turning structure 3, the orientation detecting device 71 can determine the longitudinal direction of the lower traveling structure 1 by detecting an image of the crawler 1C.

When the upper turning structure 3 is driven to rotate by a motor instead of the turning hydraulic oil motor 2A, the orientation detecting device 71 may be a resolver.

The input device 72 is provided within reach of a seated operator in the cabin 10. The input device 72 receives various operation inputs from the operator and outputs a signal corresponding to the operation inputs to the controller 30. The input device 72 includes a touch panel mounted on a display of a display device D1 for displaying various information images, a knob switch mounted on the tip of a left operating lever 26L or a right operating lever 26R, and a button switch, a lever, a toggle, or the like mounted around the display device D1. A signal corresponding to the operation detail for the input device 42 is loaded into the controller 30.

The positioning device 73 measures the position and direction of the upper turning structure 3. The positioning device 73 is, for example, a GNSS compass that detects the position and orientation of the upper turning structure 3, and detecting signals corresponding to the position and orientation of the upper turning structure 3 are loaded into the controller 30. Among the functions of the positioning device 73, the function of detecting the orientation of the upper turning structure 3 may be replaced by an azimuth sensor mounted on the upper turning structure 3.

The short-range communication device 74 is mounted, for example, on the upper turning structure 3 and communicates bidirectionally with a predetermined device (for example, support device 200) located at a relatively short distance (for example, a few meters to several tens of meters) around the shovel 100 in compliance with a predetermined short-range communication method (for example, Bluetooth (Registered trademark) communication, WiFi communication, and the like).

The display device D1 is provided in a location within the cabin 10 where it is easily visible from a seated operator and displays various information images under the control of the controller 30. The display device D1 is, for example, a liquid crystal display or an organic electroluminescence (EL) display. The display device D1 may be connected to the controller 30 via an on-board communication network such as Controller Area Network (CAN) or the display device D1 may be connected to the controller 30 via a one-to-one dedicated line.

The audio output device D2 is provided, for example, in the cabin 10, connected to the controller 30, and outputs audio under the control of the controller 30. The audio output device D2 may be, for example, a speaker, a buzzer, and the like. The audio output device D2 outputs various kinds of information audio in accordance with the audio output command from the controller 30.

The boom angle sensor S1 is mounted to the boom 4. The boom angle sensor S1 detects the elevation angle of the boom 4 with respect to the upper turning structure 3 (hereinafter, referred to as the "boom angle"). For example, the boom angle sensor S1 detects the angle formed by the straight line connecting the fulcrums at both ends of the boom 4 with respect to the turning plane of the upper turning structure 3 in a side view. The boom angle sensor S1 may include, for example, a rotary encoder, an acceleration sensor, a gyro sensor (angular velocity sensor), a 6-axis sensor, an Inertial Measurement Unit (IMU), or the like. The same shall apply to an arm angle sensor S2, a bucket angle sensor S3, and an airframe tilt sensor S4. The detection signal corresponding to the boom angle detected by the boom angle sensor S1 is loaded into the controller 30.

The arm angle sensor S2 is mounted to the arm 5. The arm angle sensor S2 detects the rotation angle of the arm 5 with respect to the boom 4 (hereinafter, referred to as the "arm angle"). For example, the arm angle sensor S2 detects the angle formed by the straight line connecting the fulcrums at both ends of the arm 5 with respect to the straight line connecting the fulcrums at both ends of the boom 4 in a side view. The detection signal corresponding to the arm angle detected by arm angle sensor S2 is loaded into the controller 30.

The bucket angle sensor S3 is mounted to the bucket 6. The bucket angle sensor S3 detects the rotation angle of the bucket 6 with respect to the arm 5 (hereinafter, referred to as "bucket angle"). For example, the bucket angle sensor S3 detects the angle formed by the straight line connecting the fulcrum of the bucket 6 and the tip (the edge of the blade) with respect to the straight line connecting the fulcrums at both ends of the arm 5 in a side view. The detection signal corresponding to the bucket angle detected by the bucket angle sensor S3 is loaded into the controller 30.

The airframe tilt sensor S4 detects the tilt status of the airframe (for example, the upper turning structure 3) with respect to a predetermined reference plane (for example, a horizontal plane). For example, the airframe tilt sensor S4 is mounted on the upper turning structure 3 and detects the tilt angle of the shovel 100 (that is, the upper turning structure 3) around the twin axes in the forward-backward direction and the left-right direction (hereinafter, "forward-backward tilt angle" and "left-right tilt angle"). The detection signal corresponding to the tilt angle (forward-backward tilt angle and left-right tilt angle) detected by the airframe tilt sensor S4 is loaded into the controller 30.

The turning status sensor S5 is mounted to the upper turning structure 3 and outputs detection information concerning the turning status of the upper turning structure 3. The turning status sensor S5 detects, for example, the turning angle speed and the turning angle of the upper turning structure 3. The turning status sensor S5 includes, for example, a gyro sensor, a resolver, a rotary encoder, or the like. The detection information concerning the turning status detected by the turning status sensor S5 is loaded into the controller 30.

In addition, when the airframe tilt sensor S4 includes a gyro sensor capable of detecting the angular velocity of a 3-axis, a 6-axis sensor, an IMU, or the like, the turning status (for example, the turning angular velocity) of the upper turning structure 3 may be detected based on the detection signal of the airframe tilt sensor S4. In this case, the turning status sensor S5 may be omitted.

<Support Device Configuration>

The support device 200 includes a control device (processing circuitry) 210, a short-range communication device 220, an operation input device 230, and a display device 240.

The control device 210 performs various controls with respect to the support device 200. The control device 210 is mainly configured to include, for example, memory devices such as CPU, RAM, and the like, non-volatile auxiliary storage devices such as ROM and the like, and interface devices for various inputs and outputs. For example, the control device 210 performs various functions by executing various programs stored in the ROM or the auxiliary storage device on the CPU.

The short-range communication device 220 provides two-way communication with a predetermined device (for example, shovel 100) provided at a relatively short distance (for example, a few meters to several tens of meters) around the support device 200 in accordance with a predetermined short-range communication method (for example, Bluetooth communication, WiFi communication, and the like).

The operation input device 230 receives various operation inputs from a user with respect to the support device 200 and outputs information regarding the operation detail to the control device 210. The operation input device 230 is, for example, a button switch provided separately from the touch panel mounted on the display device 240 (display) or the display device 240.

The display device 240 is, for example, a liquid crystal display or an organic EL display, and displays various information images under the control of the control device 210.

Example of Functional Configuration for Loading-unloading Support Functions

Figure 6:
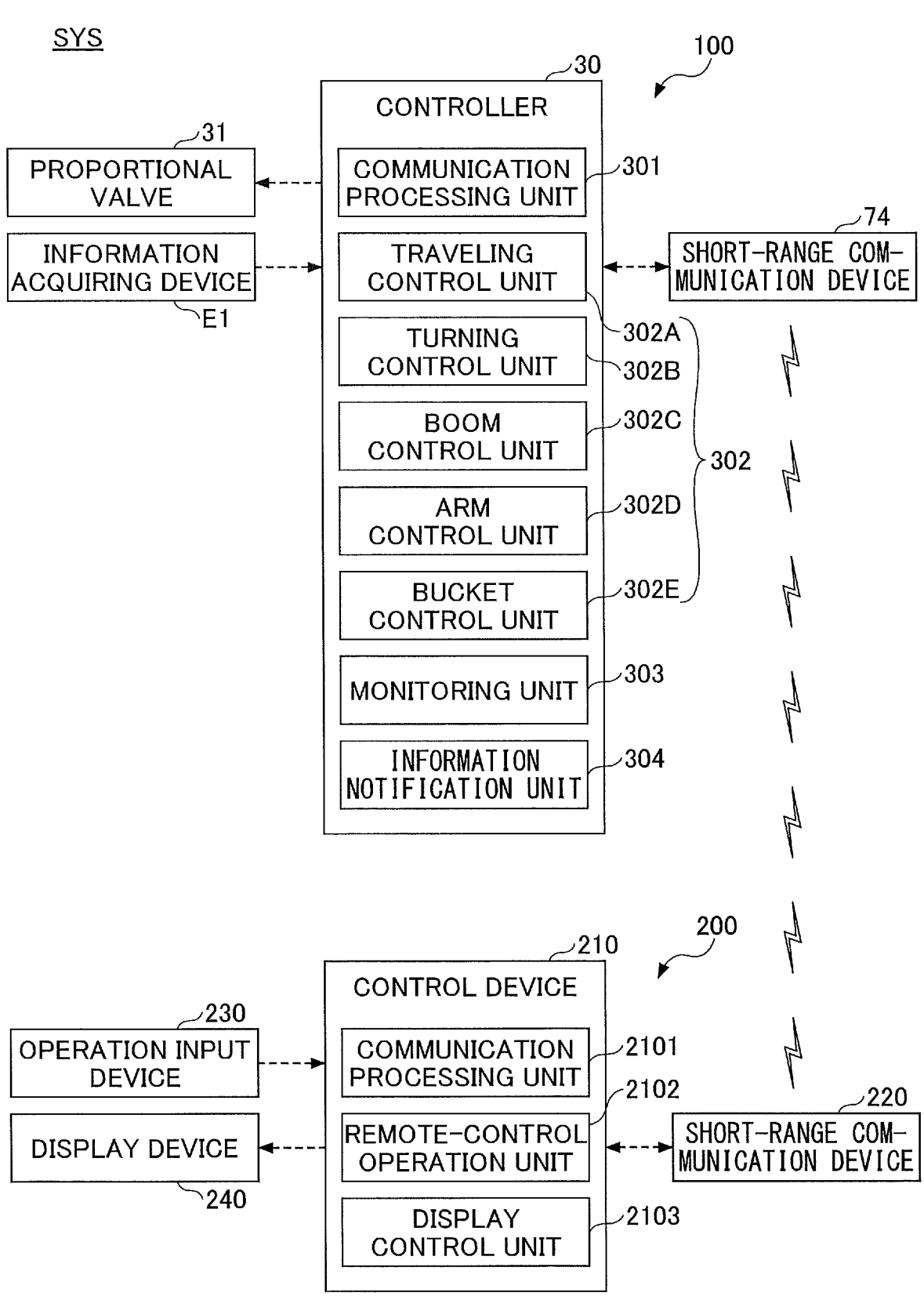
FIG. 6 is a functional block diagram illustrating an example of a configuration of loading and unloading support system functions.
Figure 7:
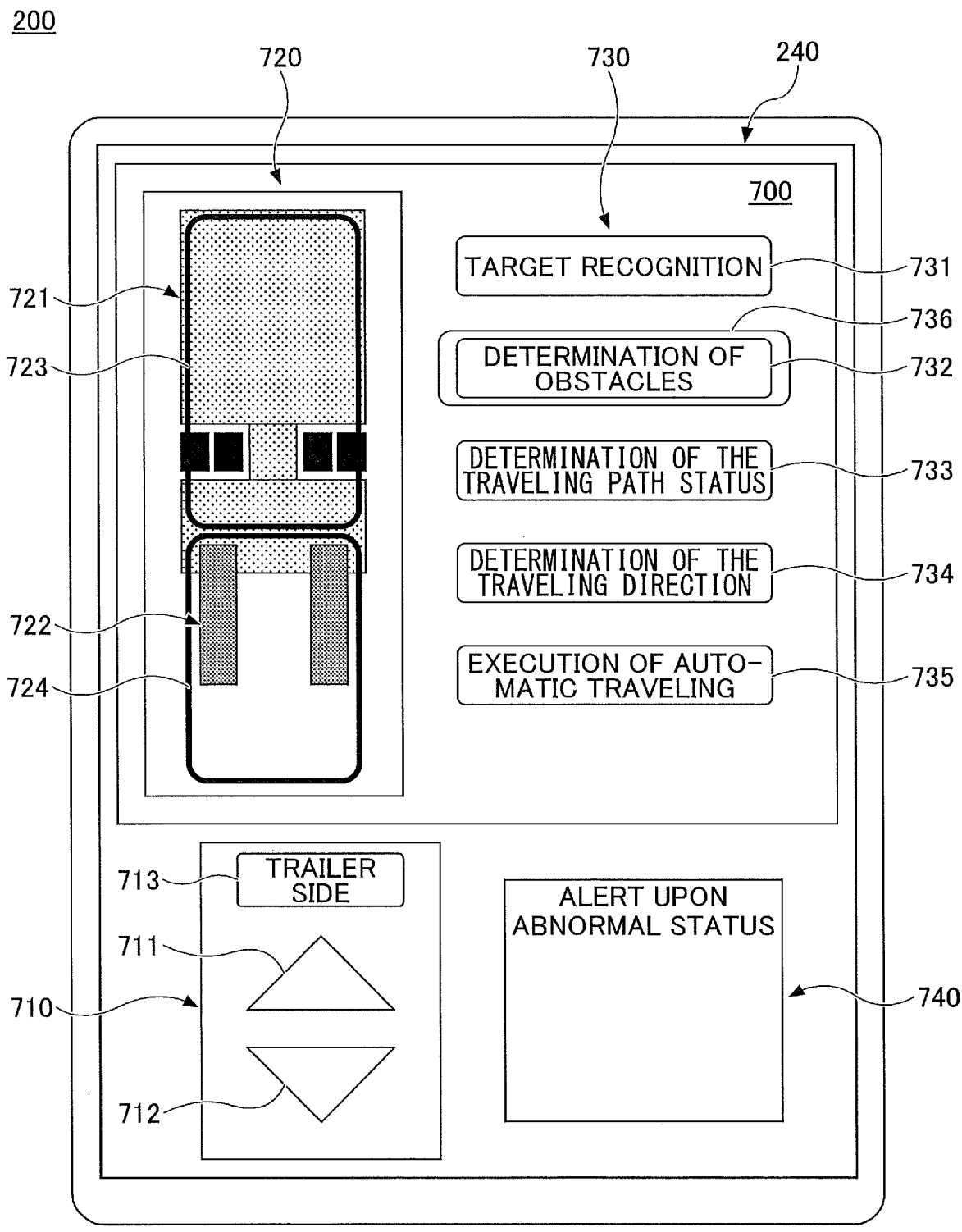
FIG. 7 is a diagram illustrating an example of an operation screen displayed on a display unit of a support device.

Referring to FIGS. 6 and 7, an example of a functional configuration for a function that supports loading and unloading of the shovel 100 into and from a trailer by the support system SYS (hereinafter referred to as "loading and unloading support function") will be described.

FIG. 6 is a functional block diagram illustrating an example of a configuration concerning the loading and unloading support function of the support system SYS. FIG. 7 is a diagram illustrating an example of an operation screen displayed on the display device 240 of the support device 200.

In an information acquiring device E1 of the shovel 100, various sensors or devices for acquiring information about the shovel 100 or information about the environment around the shovel 100 (hereinafter, referred to as "environmental information") are mainly explained. The information acquiring device E1 may include, for example, a spatial recognition device 70, an orientation detecting device 71, an input device 72, a positioning device 73, a boom angle sensor S1, an arm angle sensor S2, a bucket angle sensor S3, an airframe tilt sensor S4, a turning status sensor S5, and the like.

<Structure of Shovel Functions for Loading and Unloading Support Functions>

The controller 30 (an example of a controlling device) includes a communication processing unit 301, an operation control unit 302, a monitoring unit 303, and an information notification unit 304 as function units for the loading-unloading support function.

The communication processing unit 301 controls the short-range communication device 74 and performs two-way communication with the support device 200 around the shovel 100. The information notification unit 304 transmits an information signal or the like to the support device 200 through the communication processing unit 301.

The operation control unit 302 includes a traveling control unit 302A, a turning control unit 302B, a boom control unit 302C, an arm control unit 302D, and a bucket control unit 302E.

The traveling control unit 302A controls the traveling operation of the lower traveling structure 1. Specifically, the traveling control unit 302A automatically causes the lower traveling structure 1 to travel in accordance with a predetermined command received from the support device 200 through the communication processing unit 301. More specifically, the traveling control unit 302A controls the proportional valves 31EL, 31ER, 31FL, and 31FR. Accordingly, as described above, the traveling control unit 302A can apply pilot pressure to the control valves 171 and 172 corresponding to the traveling hydraulic oil motors 2ML and 2MR driving the crawler 1C from the shuttle valves 32EL, 32ER, 32FL, and 32FR regardless of the operation status of the traveling lever 26D, and automatically move the lower traveling structure 1.

For example, the traveling control unit 302A automatically moves the lower traveling structure 1 toward the trailer in accordance with a loading command received from the support device 200. Hereinafter, such a control mode is referred to as "automatic loading control".

Specifically, when the trailer is recognized around the shovel 100 by the monitoring unit 303 to be described later, the traveling control unit 302A determines the traveling direction (the forward direction or the backward direction) of the lower traveling structure 1 (the crawler 1C) toward the trailer based on various information input from the information acquiring device E1 (for example, the direction detecting device 71). The traveling control unit 302A moves the lower traveling structure 1 (the crawler 1C) in the determined traveling direction so that the lower traveling structure 1 is automatically driven toward the trailer.

Meanwhile, when the trailer is not recognized around the shovel 100 by the monitoring unit 303, which will be described later, the traveling control unit 302A may stop the automatic loading control of the lower traveling structure because the target (trailer) to be loaded by the shovel 100 is not present. Further, the traveling control unit 302A does not need to perform automatic loading control when it can be determined that the shovel 100 is already on the upper surface (the trailer bed) of the trailer based on the position information of the trailer recognized by the monitoring unit 303, which will be described later, and may stop the automatic loading control. Further, based on the position information of the trailer recognized by the monitoring unit 303, which will be described later, when it is determined that the lower traveling structure 1 of the shovel 100 is not disposed toward the rear of the trailer, and it is determined that the lower traveling structure 1 (the crawler 1C) cannot be loaded on the trailer even if the lower traveling structure (the crawler 1C) is forward or reversed, the automatic loading control may be stopped. However, the traveling control unit 302A may operate the lower traveling structure 1 based on various information input from the information acquiring device E1 (for example, the spatial recognition device 70) so that the lower traveling structure 1 is positioned in a positive direction toward the rear of the trailer. In this case, the automatic loading control may continue. When it is determined that an obstacle is present between the position of the shovel 100 and the upper surface of the trailer by the monitoring unit 303, which will be described later, the traveling control unit 302A may stop the automatic loading control. Further, when it is determined by the monitoring unit 303 to be described later that a predetermined status (hereinafter, a "loading traveling path status") concerning a traveling route from a position of the shovel 100 to a predetermined target position of the upper surface of the trailer (the trailer bed) is not satisfied, the traveling control unit 302A may discontinue the automatic loading control because the safety of the traveling route is not ensured. Further, when it is determined by the monitoring unit 303 that the stability of the shovel 100 (hereinafter, referred to as "posture stability") is below the predetermined standard, because of the possibility of the shovel 100 being over-turned, the traveling control unit 302A may stop the auto-matic loading control. However, the traveling control unit 302A automatically controls the attachment AT (boom 4, arm 5, and bucket 6) so that the posture stability of the shovel 100 is higher than the predetermined standard, for example, when the posture stability of the shovel 100 is lower than the predetermined standard due to the posture of the attachment AT (for example, when the boom 4 is raised or the arm 5 is opened). In this case, the automatic loading control may continue.

Stopping the automatic loading control includes a tem-porary stop and may be restarted when it is determined that an obstructive factor has been removed. The same applies to the stop of automatic loading and unloading control, which will be described later.

For example, the traveling control unit 302A automati-cally moves the lower traveling structure 1 from the upper surface (the trailer bed) of the trailer toward the rear of the trailer in accordance with a loading-unloading command received from the support device 200. Hereinafter, the control mode is referred to as "automatic unloading con-trol".

Specifically, when the trailer positioned below the shovel 100 is recognized by the monitoring unit 303 to be described later, the traveling control unit 302A determines the travel-ing direction (the forward direction or the backward direc-tion) of the lower traveling structure 1 (the crawler 1C) from the upper surface (the trailer bed) of the trailer toward the rear of the trailer. That is, the direction (the "approach direction") of approaching the trailer based on various information input from the information acquiring device E1 (for example, the direction detecting device 71) is deter-mined. The traveling control unit 302A automatically moves the lower traveling structure 1 (the crawler 1C) from the upper surface (the trailer bed) of the trailer toward the rear of the trailer by driving the lower traveling structure 1 in the determined traveling direction.

Meanwhile, when the trailer is not recognized around the shovel 100 by the monitoring unit 303, or when the shovel 100 has already been unloaded from the upper surface (trailer bed) of the trailer to the rear of the trailer, the traveling control unit 302A does not need to control auto-matic loading-unloading control. Therefore, the traveling control unit 302A may stop the automatic loading-unloading control because the target (trailer) to be loaded by the shovel 100 is not present. Further, the traveling control unit 302A does not need to perform automatic loading control when it can be determined that the shovel 100 is already on the upper surface (the trailer bed) of the trailer based on the position information of the trailer recognized by the monitoring unit 303, which will be described later, and may stop the auto-matic loading control. Further, when it is determined by the monitoring unit 303 that the stability of the shovel 100 (hereinafter, referred to as "posture stability") is below the predetermined standard, there is a possibility that the shovel 100 may tip over. Therefore, the automatic loading-unload-ing control may be stopped. However, the traveling control unit 302A automatically controls the attachment AT (boom 4, arm 5, and bucket 6) so that the posture stability of the shovel 100 is higher than the predetermined standard, for example, when the posture stability of the shovel 100 is lower than the predetermined standard due to the posture of the attachment AT. In this case, the automatic loading control may continue.

The turning control unit 302B performs control on the turning operation of the upper turning structure 3. Specifi-cally, the turning control unit 302B controls the proportional valves 31DL and 31DR. Accordingly, as described above, the turning control unit 302B can apply pilot pressure to a control valve 173 corresponding to the turning hydraulic oil motor 2A that drives the upper turning structure 3 from the shuttle valves 32DL and 32DR and automatically turn the upper turning structure 3 regardless of the turning operation, that is, the left-right direction operation of the left operating lever 26L.

The boom control unit 302C controls the operation of the boom 4. Specifically, the boom control unit 302C controls the proportional valves 31BL and 31BR. Therefore, as described above, the boom control unit 302C can apply pilot pressure to the control valves 175L and 175R corresponding to the boom cylinder 7 that drives the boom 4 from the shuttle valves 32BL and 32BR and automatically operate the boom 4 regardless of the operation of the boom 4, that is, the operation of the right operating lever 26R in the forward and backward direction.

The arm control unit 302D controls the operation of the arm 5. Specifically, the arm control unit 302D controls the proportional valves 31AL and 31AR. Thus, as described above, the arm control unit 302D can apply pilot pressure to the control valves 176L and 176R corresponding to the arm cylinders 8 that drive the arm 5 from the shuttle valves 32AL and 32AR and automatically operate the arm 5 regardless of the operation of the arm 5, that is, the operation of the left operating lever 26L in the forward and backward direction.

The bucket control unit 302E controls the operation of the bucket 6. Specifically, the bucket control unit 302E controls the proportional valves 31CL and 31CR. Therefore, as described above, the bucket control unit 302E can apply pilot pressure to the control valve 174 corresponding to the bucket cylinder 9 that drives the bucket 6 from the shuttle valves 32CL and 32CR and automatically operate the bucket 6 regardless of the operation of the bucket 6, that is, the operation of the right operating lever 26R in the left-right direction.

The monitoring unit 303 monitors the status of the shovel 100 and the surrounding status of the shovel 100 when performing automatic loading control and automatic unload-ing control by the traveling control unit 302A.

For example, the monitoring unit 303 recognizes a trailer around the shovel 100 based on various information input from the information acquiring device E1 (for example, the spatial recognition device 70).

The controller 30 may recognize the trailer by external signals. For example, the controller 30 may recognize the position and status of the trailer based on signals transmitted from the target trailer. The controller 30 may also recognize the position and status of the trailer based on signals transmitted from an external management device such as a server. In addition, the position and status of the trailer may be acquired using a mobile terminal possessed by an external worker and transmitted (transferred) from the mobile terminal to the shovel.

For example, the monitoring unit 303 determines whether or not an obstacle exists between the position of the shovel 100 and a predetermined target position of the upper surface (the trailer bed) of the trailer recognized by the traveling control unit 302A based on various information input from the information acquiring device E1 (for example, the spatial recognition device 70). When an automatic loading and unloading command is received from the support device 200 through the communication processing unit 301, the monitoring unit 303 determines whether or not an obstacle exists between a position of the shovel 100 and a predetermined target position at the rear of the trailer based on various information input from the information acquiring device E1 (for example, the spatial recognition device 70).

For example, the monitoring unit 303 determines whether or not the condition of the loading-traveling path is satisfied. The condition of the loading-traveling path is, for example, a condition relating to whether the traveling path from the position of the shovel 100 to a predetermined target position on the upper surface (trailer bed) of the trailer is secured. Specifically, the condition of the loading-traveling path includes "a ramp plate is installed (down) at the rear of the trailer" and "satisfy the predetermined standard (hereinafter referred to as the "horizontal standard") corresponding to the status where the horizontal degree (hereinafter referred to as "left and right horizontal level") in the left and right direction (hereinafter referred to as "left and right horizontal level") is relatively close to the horizontal level on the loaded-traveling path including the two ramp plates". When the automatic loading-unloading command is received from the support device 200 through the communication processing unit 301, the monitoring unit 303 determines whether or not the condition of the loading-unloading traveling path is satisfied. The condition of the loading-unloading is, for example, the status as to whether the traveling path from the position of the shovel 100 to the predetermined target position at the rear of the trailer is secured. Specifically, the condition of the loading-unloading path includes "a ramp plate is installed (down) at the rear of the trailer" and "the left-right levelness on the traveling path including the two ramp plates satisfies the levelness standard". The monitoring unit 303 may determine whether or not the condition of the traveling path for loading-unloading is satisfied based on various information input from the information acquiring device E1 (for example, the spatial recognition device 70 or the airframe tilt sensor S4).

For example, the monitoring unit 303 evaluates the stability of the posture of the shovel 100 (hereinafter, "posture stability"). The posture stability is, for example, an index value indicating a status in which the shovel 100 is not likely to fall when the index value is relatively high and a status in which the shovel 100 is likely to fall when the index value is relatively low. Specifically, the monitoring unit 303 may evaluate the stability of the shovel 100 based on the information acquiring device E1 (for example, the spatial recognition device 70, the boom angle sensor S1, the arm angle sensor S2, the bucket angle sensor S3, the airframe tilt sensor S4, and the like).

The information notification unit 304 transmits various information to the support device 200 and notifies a user of various information through, for example, the display device 240 of the support device 200.

For example, when the trailer is not recognized by the traveling control unit 302A, the information notification unit 304 transmits alert information (hereinafter, referred to as "trailer unrecognized alert information") indicating that the trailer is not recognized to the support unit 200. For example, the information notification unit 304 transmits an alert (hereinafter referred to as "an alert incapable of loading" or "an alert incapable of unloading") which is not able to perform loading (automatic loading control) or unloading (automatic unloading control). The information notification unit 304 also transmits an alert including auxiliary information indicating that the trailer could not be recognized, as the trailer unrecognized alert information, to the support unit 200. At this time, the alert incapable of loading and unloading includes alerts indicating that the loading and unloading operations cannot be started (hereinafter referred to as "an alert incapable of starting a loading and unloading") and alerts indicating that the loading and unloading operations cannot be continued after the start of operations (hereinafter referred to as "an alert incapable of continuing a loading and unloading"), respectively. The same applies to the loading and unloading alerts described below.

For example, when the lower traveling structure 1 of the shovel 100 is not disposed toward the back of the recognized trailer, the traveling control unit 302A determines that the lower traveling structure 1 (the crawler 1C) cannot be loaded into the trailer even if the lower traveling structure 1 is moved forward or backward. The information notification unit 304 transmits alert information (hereinafter, referred to as "non-appropriate arrangement alert information") to the support device 200. The information notification unit 304 may transmit an alert incapable of loading including auxiliary information indicating that the placement of the shovel 100 is inappropriate as the non-appropriate arrangement alert information to the support unit 200.

For example, when it is determined by the monitoring unit 303 such that an obstacle exists between a position of the shovel 100 and a predetermined loading target position or a predetermined unloading target position, the information notification unit 304 transmits alert information (hereinafter, referred to as "obstacle alert information") to the support device 200. The information notification unit 304 may transmit an alert incapable of loading or an alert incapable of unloading including auxiliary information indicating that the place where an obstacle presents as the non-appropriate arrangement alert information to the support unit 200.

For example, when it is determined by the monitoring unit 303 that the conditions of the traveling paths for loading and unloading are not satisfied, the information notification unit 304 transmits alert information (hereinafter, referred to as "alert information that does not satisfy the condition of traveling path") to the support unit 200. The information notification unit 304 may transmit an alert incapable of loading or an alert incapable of unloading to the support unit 200 including auxiliary information indicating that the conditions for traveling paths for loading and unloading are not satisfied as the alert information that does not satisfy the condition of traveling path.

For example, when it is determined by the monitoring unit 303 that the posture stability of the shovel 100 is lower than a predetermined standard, that is, the posture of the shovel 100 is in an unstable state, the information notification unit 304 transmits alert information (hereinafter, referred to as "unstable posture alert information") to the support device 200. The information notification unit 304 may transmit an alert incapable of loading or an alert incapable unloading to the support unit 200 including the auxiliary information indicating that the posture of the shovel 100 is unstable as the unstable posture alert information.

For example, during the execution of automatic loading control or automatic unloading control by the traveling control unit 302A, the information notification unit 304 transmits command information (hereinafter, referred to as "command information for displaying traveling path") for displaying the traveling path from a position of the shovel 100 to a predetermined loading target position or a predetermined unloading target position to the support device 200 (the display device 240). The command information for displaying traveling path may, for example, include an image (for example, captured images, distance images, and the like acquired by the spatial recognition device 70) that includes a range from a position of the shovel 100 to a target position on the upper surface (trailer bed) of the trailer.

For example, the information notification unit 304 transmits command information (hereinafter referred to as "command information for displaying operation status") for displaying the operation status of the shovel 100 on the support device 200 (the display device 240) for each of a plurality of steps in which the operation status is pre-classified after the automatic loading command or the automatic unloading command is received from the support device 200 through the communication processing unit 301 to the support device 200. For example, the operation of the shovel 100 may be divided into a plurality of steps as described above, including "a recognition (target recognition) of a target for loading or unloading (for example, the positions of a trailer, a ramp plate, a trailer bed of the trailer)"; "determination of the presence or absence of obstacles"; "determination of the success or failure of the conditions for loading or unloading traveling path"; "determination of the traveling direction of the lower traveling structure 1 (hereinafter referred to as "determination of traveling direction")"; and "execution of the automatic traveling". The information notification unit 304 transmits the command information for displaying the operation status including information concerning the step corresponding to the operation of the shovel 100 that is currently being executed among a plurality of steps that are preliminarily classified to the support device 200.

<Functional Configuration of Support Device Related to Loading and Unloading Support Function>

The control device 210 includes a communication processing unit 2101, a remote-control operation unit 2102, and a display control unit 2103 as a functional unit related to the loading-unloading support function.

The communication processing unit 2101 controls the short-range communication device 220 and performs bidirectional communication with the shovel 100 around the support device 200. The remote-control operation unit 2102 transmits information concerning the operation of the shovel 100 to the shovel 100 through the communication processing unit 2101.

The remote-control operation unit 2102 transmits an operation instruction (for example, the above-described automatic loading instruction or the automatic unloading instruction) regarding the loading and unloading operation of the shovel 100 to the shovel 100 in accordance with the user's predetermined operation on the operation input device 230.

The display control unit 2103 displays various information images related to the loading-unloading support function on the display device 240. Specifically, the display control unit 2103 may display an operation screen for transmitting the operation instructions regarding the loading and unloading operations of the shovel 100 to the shovel 100 through the remote-control operation unit 2102 on the display device 240.

For example, the display control unit 2103 displays an operation screen including an operation target (for example, a button icon and the like) for transmitting an automatic loading command or an automatic unloading command on the display device 240.

Specifically, as illustrated in FIG. 7, the left portion of the lower portion of the operation screen 700 (an example of the operation screen of the display control unit 2103) includes an operation area 710 for transmitting an automatic loading instruction or an automatic unloading instruction to the shovel 100. In this example (FIG. 7), the operation area 710 includes an upward arrow icon 711, a downward arrow icon 712, and directional information 713 disposed over the arrow icon 711 and indicating that the arrow icon 711 is oriented toward the trailer.

In the present example, the remote-control operation unit 2102 transmits an automatic loading instruction to the shovel 100 in response to the operation by the user through the operation input device 230 (for example, a touch panel mounted on the display device 240) by operating the arrow icon 711. In the present example, the remote-control operation unit 2102 transmits an automatic unloading command to the shovel 100 in response to the operation by the user through the operation input device 230 by operating the arrow icon 712.

For example, the display control unit 2103 displays various notification information received from the shovel 100 related to the loading-unloading support function on the operation screen.

Specifically, as illustrated in FIG. 7, the traveling path information area 720 including information on the traveling path from the position of the shovel 100 to the loading target position or the unloading target position is disposed on the left portion of the upper portion of the operation screen 700. The traveling path information area 720 of the present example (FIG. 7) corresponds to a loading operation and is configured by a birds-eye image viewed directly above the entire traveling path from the position of the shovel 100 to the target position of the trailer. The birds-eye image includes an image of the trailer (hereinafter referred to as a "trailer image") 721 and an image of the ramp plate (hereinafter referred to as a "ramp plate image") 722. Accordingly, the user can grasp the traveling path from the position of the shovel 100 to the loading target position viewed from the shovel 100 on the operation screen. The display control unit 2103 may display the traveling path information area 720 on the operation screen 700 by using a birds-eye image generated from an image captured by the spatial recognition device 70 and a viewpoint conversion process included in the traveling path command information received from the shovel 100 through the communication processing unit 2101. In the birds-eye image constituting the traveling path information area 720, frame images 723 and 724 representing the upper surface (the trailer bed) of the trailer from the shovel 100 and the portion (the portion in which the ramp plate is disposed) between the shovel 100 and the trailer are displayed in superimposed form. The display control unit 2103 may notify the user of the presence or absence of an obstacle in the trailer bed by changing the display mode of the frame image 723 (for example, changing the color, the thickness of the border, the presence or absence of blinking, etc.). Similarly, the display control unit 2103 may notify the user of the presence or absence of an obstacle between the position of the shovel 100 and the trailer by changing the display mode of the frame image 724. In this case, the display control unit 2103 may change the display mode of the frame images 723 and 724 from the ordinary display mode to a display mode indicating that an obstacle exists based on the information received from the shovel 100 through the communication processing unit 2101. This allows the user to grasp the status of the traveling path from the position of the shovel 100 to the loading target position.

When the loading and unloading work is targeted, the traveling path information area 720 may include a birds-eye image viewed directly above the entire traveling path from the position of the shovel 100 mounted on the trailer to the target unloading position at the rear of the trailer, including the portion disposed on the ramp plate. This allows the user to grasp the status of the traveling path from the position of the shovel 100 viewed from the shovel 100 to the target unloading position at the rear of the trailer. In addition, an image other than the bird's-eye image, for example, an image acquired by the spatial recognition device 70, may be directly displayed in the traveling path information area 720.

Further, as illustrated in FIG. 7, the shovel operation status information area 730 including information related to the operation status of the shovel 100 is disposed on the right portion of the upper portion of the operation screen 700. The shovel operation status information area 730 of this example (FIG. 7) includes step icons 731 to 735 and a cursor 736 corresponding to a plurality of steps (in this example, five steps) indicating operations related to the automatic loading control or automatic unloading control of the shovel 100. The step icons 731 to 735 correspond to "target recognition", "determination of obstacle", "determination of the traveling path status", "determination of the traveling direction" and "execution of automatic traveling", respectively. The cursor 736 represents an operation currently being performed by the shovel 100. In the present example, a "determination of obstacles" corresponding to the step icon 732 indicates that the determination is being executed. This allows the user to grasp the operating status of the shovel 100 relating to the automatic loading control or automatic unloading control. The display control unit 2103 displays the step icons 731 to 735 and the cursor 736 on the operation screen 700 based on the operation status display command information received from the shovel 100 through the communication processing unit 2101.

Further, as illustrated in FIG. 7, an alert information area 740 including an alert information (the alert information) relating to the automatic loading control or the automatic unloading control is disposed on the right portion of the lower portion of the operation screen 700. The display control unit 2103 displays the received alert information in the alert information area 740 when various alert information is received from the shovel 100 through the communication processing unit 2101. This allows the user to grasp and respond to the occurrence of an obstructive factor in the execution of the automatic loading control or automatic unloading control.

Detail of Loading and Unloading Support Function

Next, with reference to FIG. 8 (FIG. 8A and FIG. 8B) and FIG. 9, a detailed description of the loading and unloading support function and, more specifically, a processing flow of the control processing relating to the loading and unloading support function will be described.

Figure 8A:
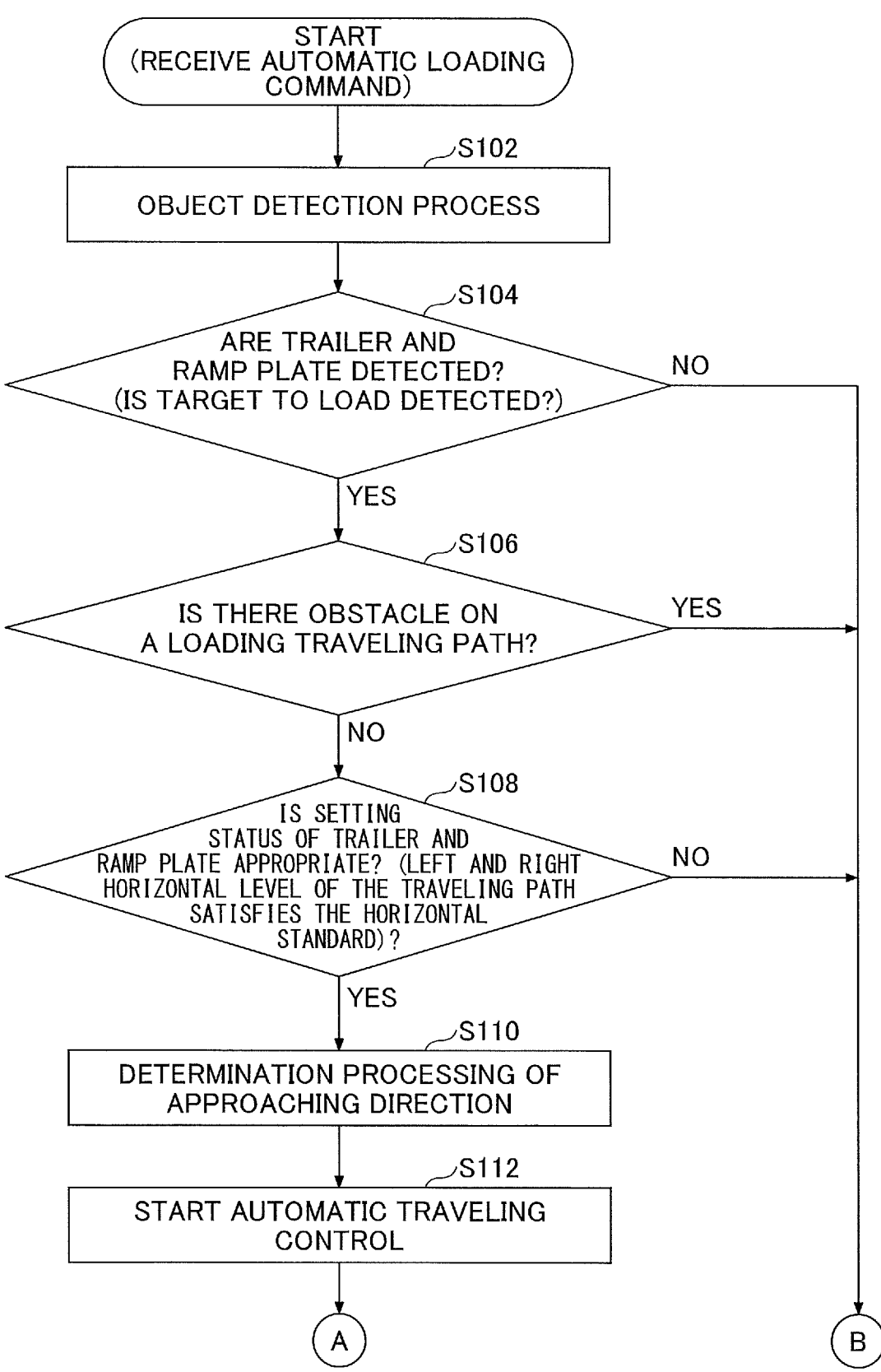
FIG. 8A is a flow chart schematically illustrating an example of a control process for the loading and unloading support functions by a controller of the shovel.
Figure 8B:
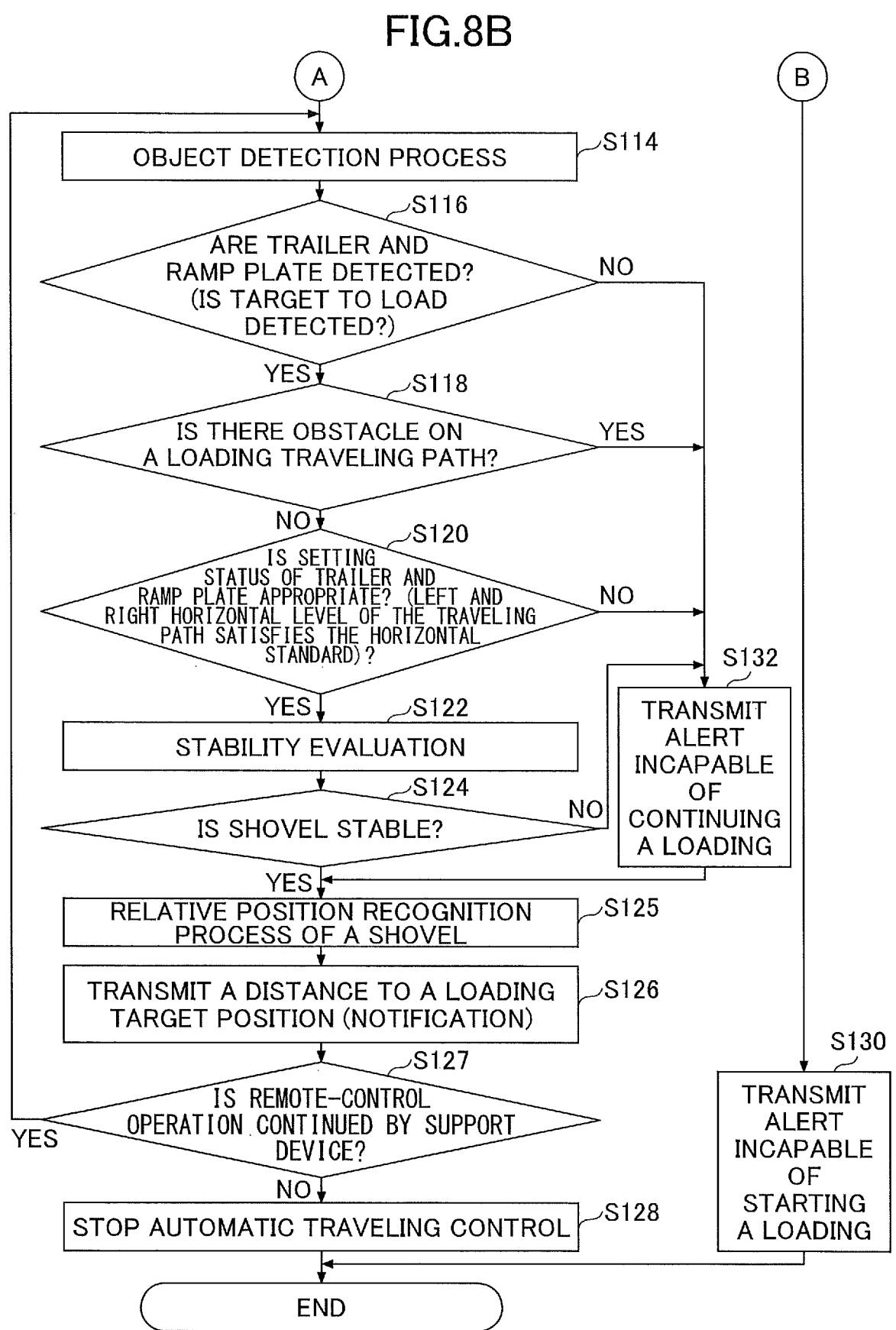
FIG. 8B is a flow chart schematically illustrating an example of a control process for the loading and unloading support functions by the controller of the shovel.

First, FIGS. 8A and 8B are flowcharts schematically illustrating an example of control processing relating to the loading and unloading support function of the shovel 100 by the controller 30. Specifically, FIGS. 8A and 8B are flowcharts illustrating an example of a control process (hereinafter referred to as "loading support control process") relating to the loading and unloading support function corresponding to the loading operation of the shovel 100. The flowchart starts when an automatic loading command is received from the support device 200 through the communication processing unit 301. Hereinafter, the same shall apply to the flowchart illustrated in FIG. 9.

Note that the loading and unloading support control process for the loading and unloading work of the shovel 100 corresponding to FIGS. 8A and 8B can be defined by a flowchart in which the phrase "loading" in FIGS. 8A and 8B is replaced by "unloading" and thus the description thereof will not be described. Hereinafter, the same shall apply to the support control process of loading and unloading relating to the loading and unloading operation of the shovel 100 corresponding to FIGS. 9A and 9B, which will be described later.

As illustrated in FIG. 8A, in step S102, the monitoring unit 303 performs a process of detecting an object around the shovel 100 (hereinafter referred to as "object detection process") based on information input from the information acquiring device E1 (for example, the spatial recognition device 70).

In step S104, the monitoring unit 303 determines whether or not an object (for example, a trailer, a ramp plate, or the like) of the loading operation has been detected (recognized) by the object detection process of step S102. When the target object of the loading operation is recognized, the monitoring unit 303 proceeds to step S106. Otherwise, the monitoring unit 303 proceeds to step S130 as illustrated in FIG. 7B.

In step S106, the monitoring unit 303 determines whether or not the presence of an obstacle is recognized on the traveling path of the loading operation (that is, from the position of the shovel 100 to the target position of the upper surface (the trailer bed) of the trailer) by the object detection process of step S102. When the monitoring unit 303 does not recognize the presence of an obstacle on the traveling path of the loading work, it proceeds to step S108. When the monitoring unit 303 recognizes the presence of an obstacle, it proceeds to step S130, as illustrated in FIG. 8B.

In step S108, the monitoring unit 303 determines whether or not the loading traveling path status is satisfied by the object detection process of step S102. For example, the monitoring unit 303 determines whether or not the installation status of the trailer, the ramp plate, or the like is appropriate, such as whether or not the left and right horizontal level of the traveling path satisfies the horizontal standard. The monitoring unit 303 proceeds to step S108 when the loading traveling path status is satisfied, and proceeds to step S130 when the loading traveling path status is not satisfied, as illustrated in FIG. 8B.

In step S110, the traveling control unit 302A determines the approaching direction (the forward direction or the backward direction) of the lower traveling structure 1 (the crawler 1C) toward the trailer. Hereinafter, for loading work, the mode of moving the trailer of the lower traveling structure 1 (the crawler 1C) toward the loading target position is referred to as "approaching", and the mode of moving the trailer of the lower traveling structure 1 in the opposite direction is referred to as "separating".

The order of the determination processing of steps S104 to S110 may be arbitrary and may be performed in parallel.

In step S112, the traveling control unit 302A starts the automatic traveling control of the shovel 100 based on the approaching direction determined in step S110.

In the automatic traveling control of the present embodiment, the determination of approach, separation, and stop of the lower traveling structure 1 is conducted by a user who holds the support device 200. That is, the traveling control unit 302A continues to cause approaching or separating of the lower traveling structure 1 while an operation (hereinafter referred to as "approaching operation") or an operation (hereinafter referred to as "separating operation") for bringing the shovel 100 (the lower traveling structure 1) closer or farther is continued during the automatic loading control (specifically, during the process of step S114 to step S126). In contrast, as will be described later, the user continues to perform an approaching operation or a separating operation of the shovel 100 by the support device 200 while grasping the traveling status of the shovel 100 and various other statuses of the loading continuation alert. Thereafter, when the user determines that the shovel 100 has reached a predetermined loading target position on the trailer bed visually, the user terminates the approaching and separating operations of the shovel 100 by the support device 200. The traveling control unit 302A stops the shovel 100 (the lower traveling structure 1) when neither an approaching operation nor a separating operation of the shovel 100 is performed by the support device 200 while the automatic loading control is continuing.

For example, in the case of the operation screen 700 illustrated in FIG. 7, the operation of the arrow icon 711 corresponds to an approaching operation, and the operation of the arrow icon 712 corresponds to a separating operation. Then, the user can continue to operate the arrow icon 711 (for example, continue to touch a position corresponding to the arrow icon 711 of the touch panel mounted on the display device 240) so that the shovel 100 can be moved to the loading target position of the upper surface (the trailer bed) of the trailer while visually checking the status of the shovel 100.

Returning to FIG. 8B, in step S114, the monitoring unit 303 performs the object detection process similar to step S102.

In step S116, the monitoring unit 303 performs a determination process similar to step S104 based on the result of the object detection process in step S114. For example, there is a possibility that an unexpected situation may occur, such as an unexpected situation in which a ramp plate that had been unloaded is raised due to an operational error. The monitoring unit 303 proceeds to step S118 when the target object of the loading operation is recognized, and otherwise proceeds to step S132.

In step S118, the monitoring unit 303 performs a determination process similar to step S106 based on the result of the object detection process of step S114. For example, for some reason, an unexpected situation may be postulated in which an obstacle is positioned on the traveling path after the fact. The monitoring unit 303 proceeds to step S120 when the monitoring unit 303 does not recognize the presence of an obstacle on the traveling path of the loading operation. The monitoring unit 303 proceeds to step S132 when the monitoring unit 303 recognizes the presence of the obstacle on the traveling path.

In step S120, the monitoring unit 303 performs a determination process similar to step S108 based on the result of the object detection process in step S114. For example, an unexpected situation which does not satisfy the loading traveling path status may be postulated in which the ground surface where the shovel 100 and the trailer are located is weak. The monitoring unit 303 proceeds to step S122 when the loading traveling path status is satisfied. The monitoring unit 303 proceeds to step S132 when the loading traveling path status is not satisfied.

In step S122, the monitoring unit 303 evaluates the posture stability of the shovel 100.

In step S124, the monitoring unit 303 determines whether or not the posture of the shovel 100 is stable based on the evaluation result of step S122. The monitoring unit 303 proceeds to step S126 when the posture of the shovel 100 is in a stable status. The monitoring unit 303 proceeds to step S132 when the posture is not in a stable status.

In step S125, the traveling control unit 302A performs a process (hereinafter referred to as "relative position recognition process") for recognizing a position of the shovel 100 relative to the target position of the trailer on the basis of information input from the information acquiring device E1 (for example, the spatial recognition device 70).

In step S126, the information notification unit 304 transmits a notification relating to the distance to the loading target position of the shovel 100 to the support device 200 based on the result of the relative position recognition process of step S125 and proceeds to step S127. Thus, the user of the support device 200 can check the distance to the loading target position displayed on the support device 200.

In step S127, the traveling control unit 302A determines whether or not remote-control operation of the shovel 100 continues based on the notification information relating to the operation status of the support device 200 (the display device 240) received by the communication processing unit 301. For example, when an operation for terminating the remote-control operation of the shovel 100 (hereinafter referred to as "termination operation") is performed on the operation screen of the support device 200 (the display device 240), the traveling control unit 302A may determine that the remote-control operation is not continued or that the remote-control operation is terminated. Even if the termination operation is not performed, when the status in which the operation of the operation screen of the support device 200 is not performed for a predetermined time or longer continues, the traveling control unit 302A may determine that the remote-control operation is not continued. That is, the remote-control operation is terminated. When the remote-control operation of the shovel 100 by the support device 200 is continued, the traveling control unit 302A returns to step S114. When the remote-control operation is not continued, that is, when the remote-control operation is completed, the traveling control unit 302A proceeds to step S128.

The order of the determination processing of steps S116 to S120, S124, and S126 may be arbitrary and may be performed in parallel.

In step S128, the traveling control unit 302A stops the automatic traveling control and terminates the process according to the present flowchart.

Meanwhile, in step S130, the information notification unit 304 transmits the alert incapable of starting a loading and terminates the processing. Accordingly, the user of the support device 200 can grasp that the loading operation of the shovel 100 cannot be started and the reason why the shovel 100 cannot be started based on the detail of the alert incapable of starting a loading (alert information) displayed on the support device 200.

In step S132, the information notification unit 304 transmits the alert incapable of continuing a loading and proceeds to step S125. That is, when an obstructive factor is generated with respect to the alert information such as the alert incapable of continuing a load, a user who operates the remote-control of the shovel 100 by the support device determines whether or not to continue the loading operation. Even in the case where the obstructive factor with respect to the alert information has occurred, it may be possible for the user to judge that it is possible to continue the actual loading operation of the shovel 100 visually. Accordingly, the user of the support device 200 can grasp the detail of the alert of incapable of continuing the loading displayed on the support device 200. That is, the user grasps the alert information and determines whether to continue or stop the loading operation of the shovel 100 after visually checking the situation.

In the present embodiment, various types of alert information are notified to the user through the support device 200. For example, the audio information corresponding to the alert information may be output from the audio output device (not illustrated) capable of outputting the audio toward the surroundings of the shovel 100. Hereinafter, the same shall apply to the case illustrated in FIG. 9.

Thus, in the present embodiment, with respect to the shovel 100 and around the trailer, the user can automatically cause the lower traveling structure 1 to travel by performing remote-control operation of loading and unloading the shovel 100 using the support device 200 to move the lower traveling structure 1 to the upper surface (the trailer bed) of the trailer. That is, the user may automatically allow the shovel 100 to perform loading and unloading operations using the support device 200 without boarding the cabin 10 of the shovel 100. Specifically, the user can continue the operation of the support device 200 while checking the alert information corresponding to the alert of incapable of continuing the loading displayed on the support device 200 or visually checking the status of the shovel 100. As a result, the user is capable of operating the support device 200 to operate the shovel 100 to automatically perform the loading and unloading operation.

Figure 9:
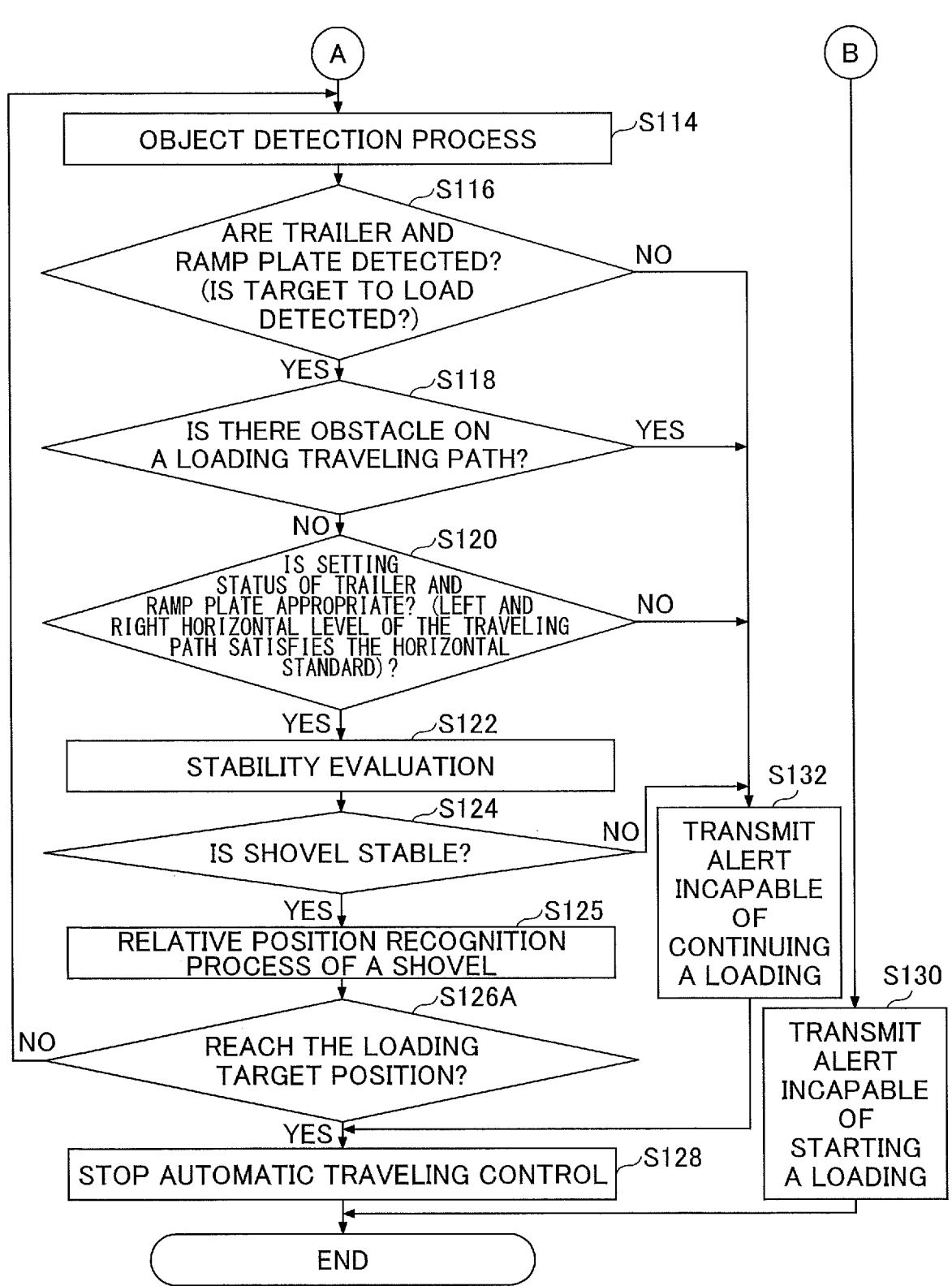
FIG. 9 is a flow chart schematically illustrating another example of a control process for the loading and unloading support functions by the controller of the shovel.

FIG. 9 is a flowchart schematically illustrating another example of a control process for the loading and unloading support function by the controller 30 of the shovel 100. Specifically, FIG. 9 is a portion (the latter part) of a flowchart illustrating another example of a loading support control process of the shovel 100. In the present example, only the process later than steps S102 through S110 in FIG. 8A (that is, the process in FIG. 9) differs from the above-described example (that is, the process in FIG. 8B). Therefore, the process in the first half is omitted because the process in the first half can be referenced from FIG. 8A.

As described above, the process in the first half is the same as step S102 through step S110 in FIG. 8A, and thus the description thereof will be omitted. Further, the process of steps S114 to S125 and S130 in FIG. 9 is the same process corresponding to FIG. 8B (the process of steps S114 to S125 and S135), and thus the description thereof will be omitted.

In the automatic traveling control of the present embodiment, the determination of approach, separation, and stop of the lower traveling structure 1 is performed by the controller 30 (specifically, the traveling control unit 302A). That is, when an automatic loading command is received from the support device 200 through the communication processing unit 301, the traveling control unit 302A automatically causes the lower traveling structure 1 to travel to a predetermined target position as long as no obstructive factor is generated, while determining whether or not the loading operation is to be continued in accordance with an obstructive factor corresponding to the alert information to be described later.

In step S126A, the traveling control unit 302A determines whether or not the shovel 100 reaches the loading target position based on the result of the relative position recognition process of step S125. The traveling control unit 302A returns to step S114 when the shovel 100 does not reach the loading target position. The traveling control unit 302A proceeds to step S128 when the shovel 100 reaches the loading target position.

As in the case of step S126 of FIG. 8B, the controller 30 may transmit a notification of the distance to the loading target position of the shovel 100 in conjunction with the determination process of step S126A to the support device 200.

In step S128, the traveling control unit 302A stops the autonomous traveling control of the shovel 100 and terminates the process according to the present flowchart.

Meanwhile, in step S132, the information notification unit 304 transmits the alert incapable of continuing the loading and proceeds to step S128. That is, in the present example, when an obstructive factor corresponding to the alert information occurs after the loading operation is started, the loading operation is automatically (autonomously) stopped regardless of the user's determination.

Thus, in the present embodiment, with respect to the shovel 100 and around the trailer, the user can automatically cause the lower traveling structure 1 to travel by performing remote-control operation of loading and unloading the shovel 100 using the support device 200 to move the lower traveling structure 1 to the upper surface (the trailer bed) of the trailer. That is, the user may automatically allow the shovel 100 to perform loading and unloading operations using the support device 200 without boarding the cabin 10 of the shovel 100. Specifically, the user can have the shovel 100 autonomously perform the loading and unloading operation while determining whether or not the shovel 100 can continue the loading operation simply by performing an operation equivalent to the start of the loading and unloading operation.

Example of Loading and Unloading by Loading and Unloading Support Function

Next, referring to FIG. 10 (FIGS. 10A and 10B), a specific example of the loading and unloading operation of the shovel 100 into and from a trailer by the loading and unloading support function will be described.

Figure 10A:
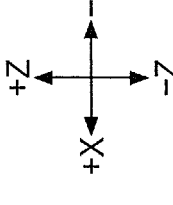
FIG. 10A is a diagram illustrating loading and unloading of the shovel.
Figure 10A:
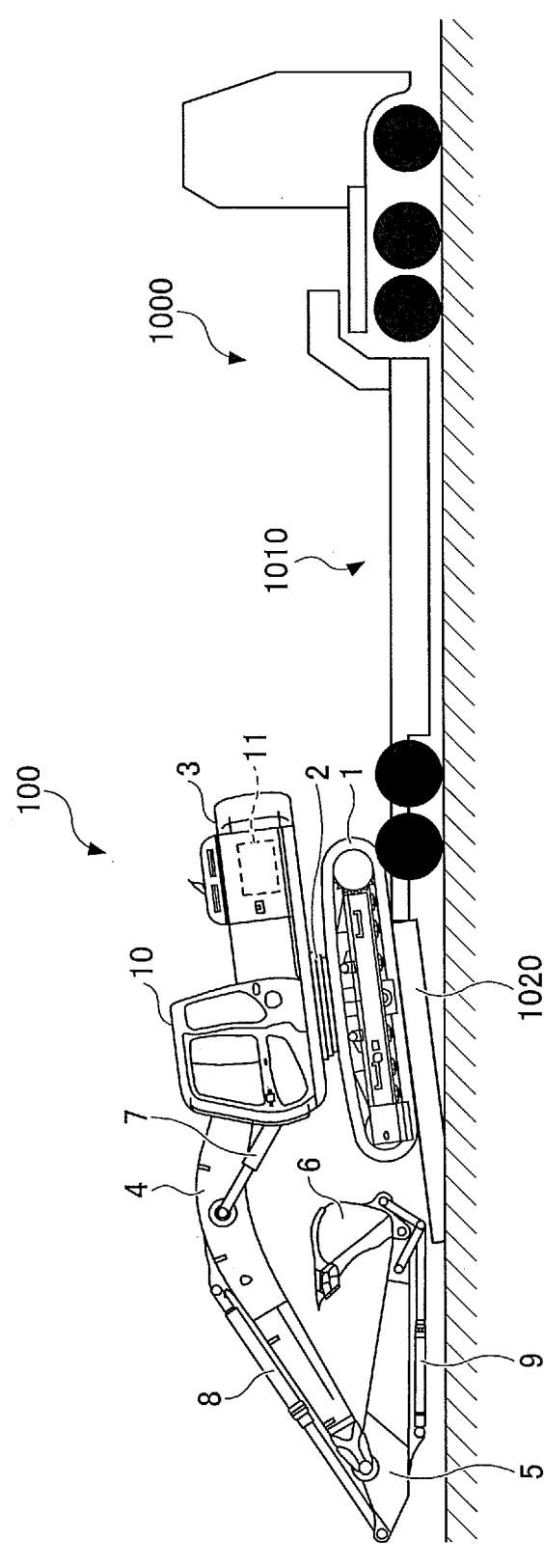
Figure 10B:
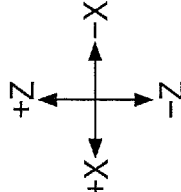
FIG. 10B is a diagram illustrating loading and unloading of the shovel.
Figure 10B:
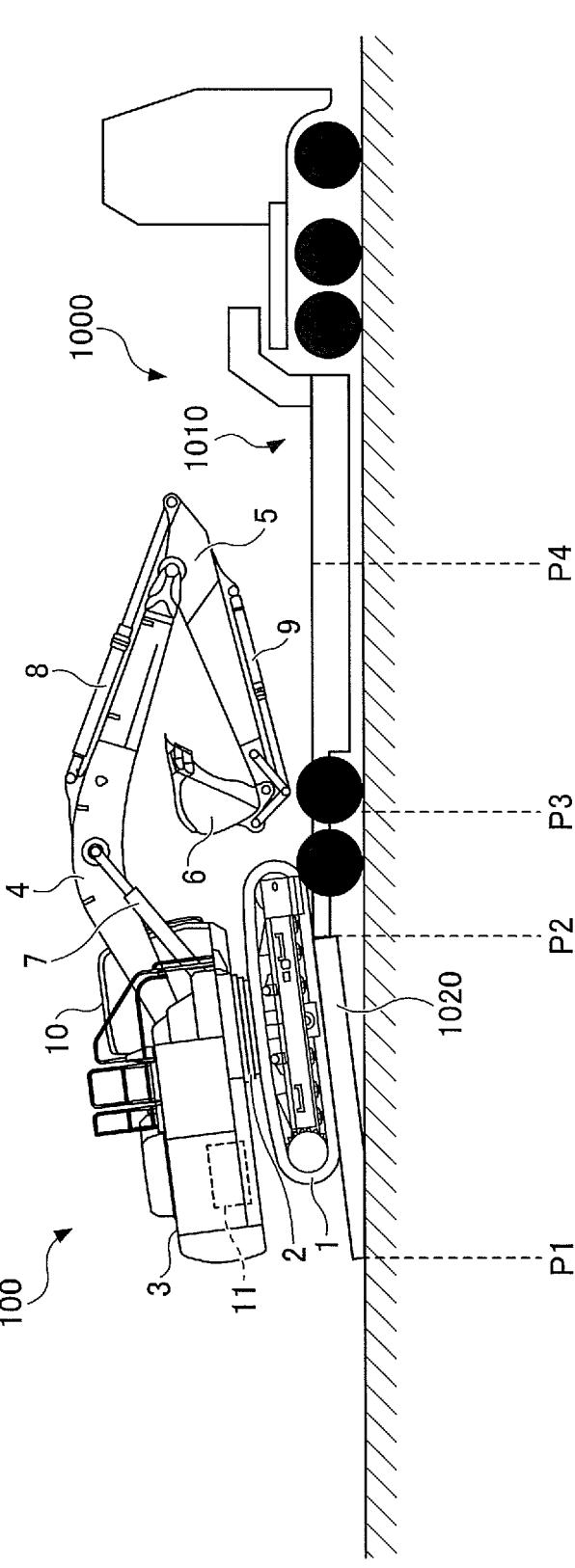

FIGS. 10A and 10B are diagrams illustrating loading and unloading operations of the shovel 100 by a supporting system SYS (shovel 100) in accordance with the present embodiment. Specifically, FIGS. 10A and 10B are diagrams illustrating a specific operating status of a loading operation of a trailer 1000 of a shovel 100 onto a trailer bed 1010 by the loading and unloading support function of the support system SYS.

In this embodiment, as described above, the traveling control unit 302A automatically causes the lower traveling structure 1 to travel toward the trailer in accordance with an automatic loading command received from the support device 200 through the communication processing unit 301. The traveling control unit 302A automatically causes the lower traveling structure 1 to travel from the upper surface (the trailer bed) of the trailer toward the rear of the trailer in accordance with an automatic unloading command received from the support device 200 through the communication processing unit 301. Accordingly, as illustrated in FIGS. 10A and 10B, the shovel 100 can automatically perform loading and unloading operations on a trailer or from the trailer in accordance with command information (automatic loading and unloading instructions or automatic unloading instructions) from the support device 200. Accordingly, the user of the support device 200 does not need to mount on the cabin 10 of the shovel 100 to operate the lower traveling structure 1. It is possible to keep the posture stability of the shovel 100 relatively high during loading and unloading operations while grasping the overall status of the shovel 100 and the status of the trailer from around the shovel 100. Thus, the shovel 100 can be loaded or unloaded into the trailer in a more stable position.

For example, when an operator or the like boards the cabin 10 of the shovel 100 to load the shovel 100 onto a trailer, the operator needs to operate the lower traveling structure 1 of the shovel 100 by aligning the orientation of the upper turning structure 3, that is, the orientation of the attachment AT, with the direction of the lower traveling structure 1 in the approaching direction of the lower traveling structure 1. After the shovel 100 has reached the loading target position of the trailer bed, the operator turns the upper turning structure 3 by 180 degrees in the turning operation so that the attachment AT is positioned backward of the trailer. In contrast, in the present embodiment, a user can perform loading operation by automatically causing the lower traveling structure 1 to travel through a remote-control operation from the support device 200, and the lower traveling structure 1 can be brought closer to the trailer bed 1010 of the trailer 1000 while the attachment AT is turned backward from the beginning, as illustrated in FIG. 10A. Therefore, after the shovel 100 is caused to travel to the loading target position of the trailer bed, the operation of turning the upper turning structure 3 by 180 degrees is omitted, and the loading operation can be efficiently performed.

Further, as illustrated in FIG. 10A, when the lower traveling structure 1 is brought closer toward the trailer bed 1010 of the trailer 1000 while the attachment AT is backwardly facing the trailer 1000, the position of the attachment AT when traveling the ramp portion of the ramp plate 1020 is lower than when the orientation of the attachment AT is towards the direction of the approaching. Thus, the shovel 100 can be loaded into the trailer in a more stable position.

Also, as illustrated in FIG. 10B, the shovel 100 (lower traveling structure 1) may be brought closer toward the trailer bed 1010 of the trailer 1000 with the attachment AT in the forward direction of the trailer 1000 by the loading and unloading support function. In this example, the center of gravity of the entire shovel 100 is relatively positioned in the front because the attachment AT is in the forward status of the trailer 1000. In this case, the controller 30 may decelerate the shovel 100 (lower traveling structure 1) just before the front end of the crawler 1C reaches the front and rear positions P1 (near the rear end of the contact portion with the ground surface of the ramp plate 1020). Thereafter, when the controller 30 determines that the front end of the crawler 1C passes through the front and rear positions P1 and runs onto the ramp plate 1020, the controller 30 restores the speed of travel to the extent that it is possible to climb the ramp plate 1020. The controller 30 can determine that the airframe tilt sensor S4 has caused the airframe to ride on the ramp plate 1020. The controller 30 may then decelerate the speed of the shovel 100 (the lower traveling structure 1) again just before the front end of the crawler 1C reaches the front and rear positions P2 (the connection between the ramp plate 1020 and the trailer bed 1010 of the trailer 1000). Thus, the impact on the shovel 100 (the lower traveling structure 1) associated with the inclination change between the ramp plate 1020 and the trailer bed 1010 can be mitigated. Thereafter, the controller 30 turns the upper turning structure 3 and directs the attachment AT toward the rear of the trailer 1000 when the center of the crawler 1C reaches the front and rear positions P3 (the predetermined position of the rear of the trailer bed 1010). Then, the controller 30 moves the shovel 100 (the lower traveling structure 1) while decelerating to the front and rear positions P4 (the predetermined stop position of the shovel 100 on the trailer bed 1010).

Other Examples of Functional Configurations for Loading and Unloading Support Functions Next, referring to FIG. 11 (FIGS. 11A to 11C), another example of a functional configuration regarding the loading and unloading support function by the support system SYS will be described. In the present example, the functional configuration of the shovel 100 will be mainly described.

Figure 11A:
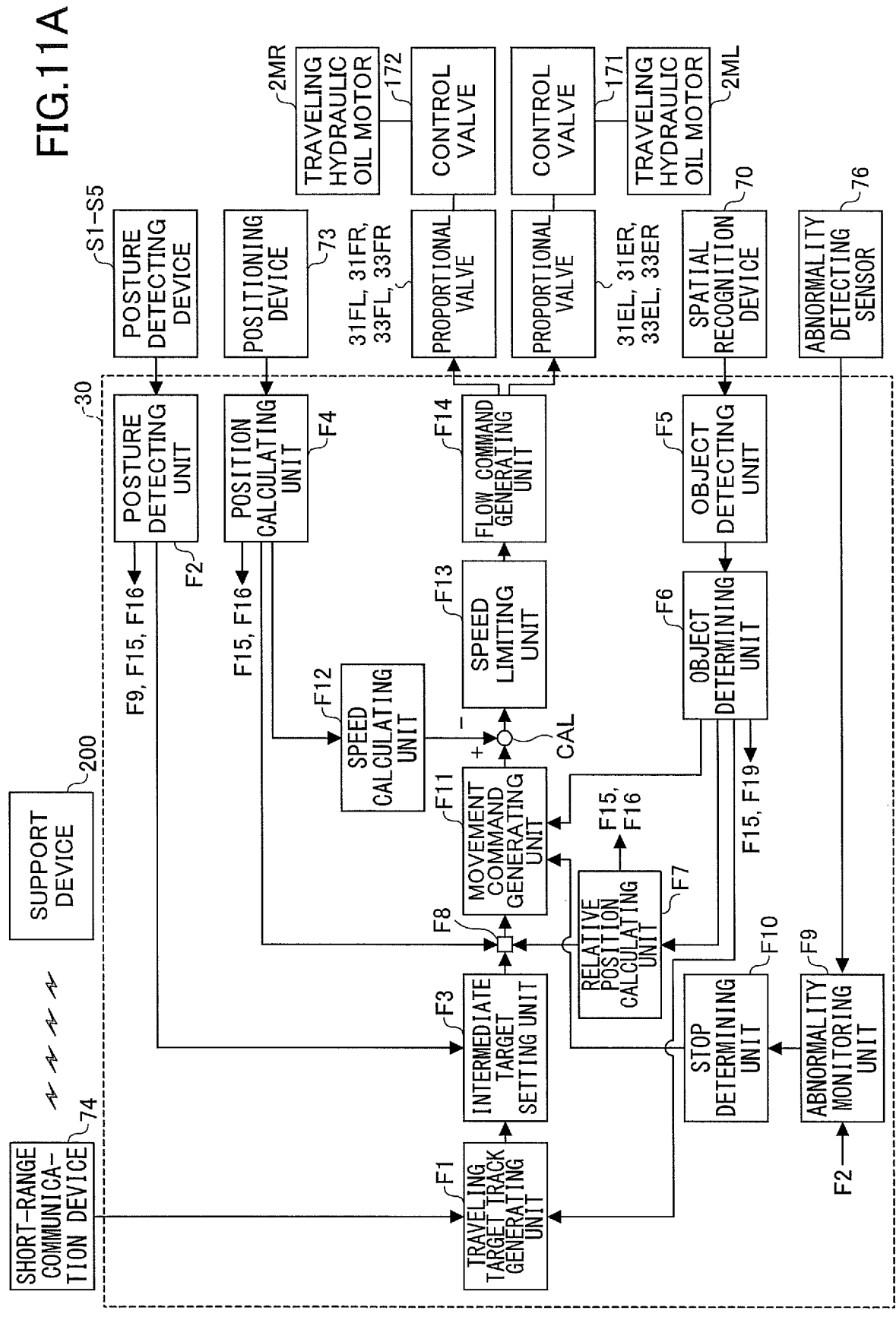
FIG. 11A is a functional block diagram illustrating another example of a configuration for loading and unloading support functions of the support system.
Figure 11B:
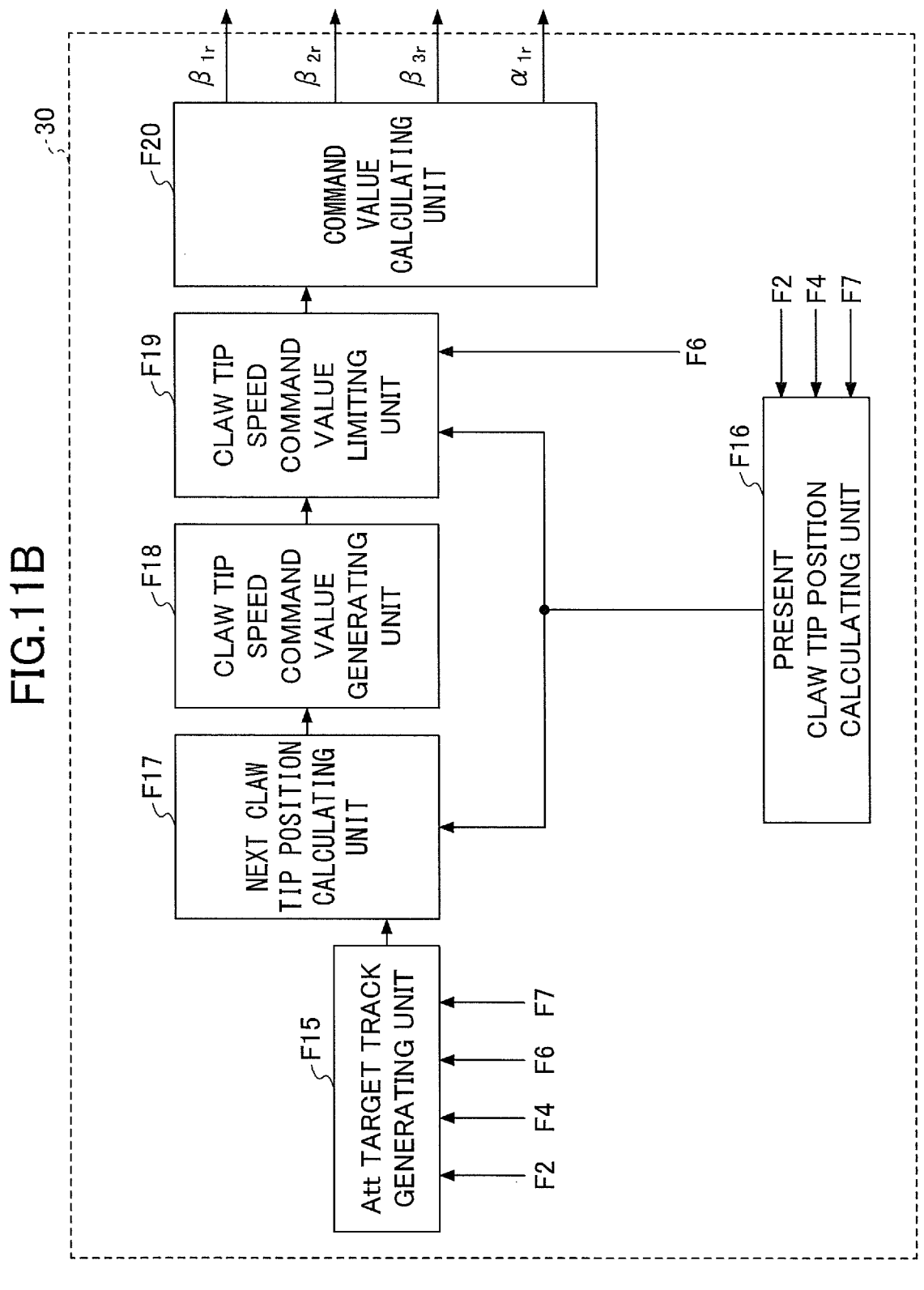
FIG. 11B is a functional block diagram illustrating another example of a configuration for loading and unloading support functions of the support system.
Figure 11C:
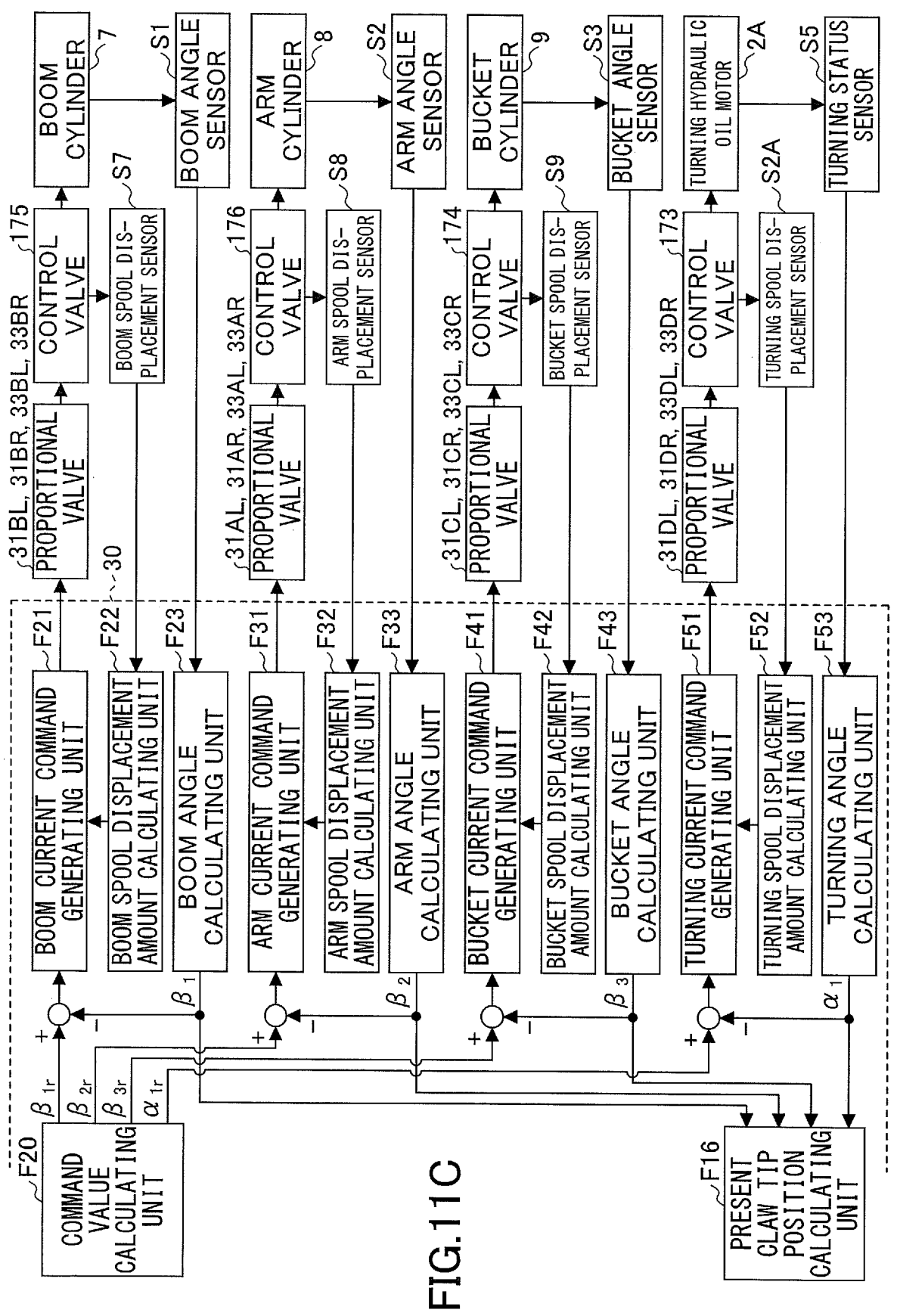
FIG. 11C is a functional block diagram illustrating another example of a configuration for loading and unloading support functions of the support systems.

FIGS. 11A to 11C are functional block diagrams illustrating other examples of configurations for the loading and unloading support functions of the support system SYS. Specifically, FIGS. 11A to 11C illustrate an exemplary configuration of the autonomous operation function of the shovel 100 for realizing the loading and unloading support function. FIG. 11A is a diagram illustrating a specific example of a component related to the autonomous operation function of the lower traveling structure 1, and FIGS. 11B and 11C are diagrams illustrating a specific example of a component related to the autonomous operation function of the upper turning structure 3 and the attachment AT.

In the present example, the controller 30 is configured to receive signals output by at least one of the postures detecting device, the spatial recognition device 70, the positioning device 73, the short-range communication device 74, the abnormality detecting sensor 76, and the like. Thus, the controller 30 performs various operations, and outputs control commands to the proportional valve 31 and the proportional valve 33. The posture detecting device includes the boom angle sensor S1, the arm angle sensor S2, the bucket angle sensor S3, the airframe tilt sensor S4, and the turning status sensor S5.

The controller 30 includes a traveling target track generating unit F1, an posture detecting unit F2, an intermediate target setting unit F3, a position calculating unit F4, an object detecting unit F5, an object determining unit F6, a relative position calculating unit F7, a comparing unit F8, an abnormality monitoring unit F9, a stop determining unit F10, a movement command generating unit F11, a speed calculating unit F12, a speed limiting unit F13, and a flow command generating unit F14. The controller 30 includes an Att target track generating unit F15, a current claw tip position calculating unit F16, a next claw tip position calculating unit F17, a claw tip speed command value generating unit F18, a claw tip speed command value limiting unit F19, a command value calculating unit F20, a boom current command generating unit F21, a boom spool displacement amount calculating unit F22, a boom angle calculating unit F23, an arm current command generating unit F31, an arm spool displacement amount calculating unit F32, an arm angle calculating unit F33, a bucket current command generating unit F41, a bucket spool displacement amount calculating unit F42, a bucket angle calculating unit F43, a turning current command generating unit F51, a turning spool displacement amount calculating unit F52, and a turning angle calculating unit F53.

The traveling target track generating unit F1 generates a traveling target track with respect to autonomous traveling of the shovel 100 (the lower traveling structure 1). In addition, the traveling target track generating unit F1 may set a tolerance range for the generated traveling target track. Specifically, the shovel 100 produces the traveling target track for loading or unloading operation from or to the trailer based on the output of the spatial recognition device 70. For example, the traveling target track generating unit F1 generates the traveling target track for loading or unloading the shovel to a trailer based on the determination result regarding the type of an object around the shovel 100 based on the output of the spatial recognition device 70 input from the object determining unit F6 and the output of the spatial recognition device 70.

The posture detecting unit F2 is configured to detect information about the posture of the shovel 100. Further, the posture detecting unit F2 may determine whether or not the position of the shovel 100 is in a traveling position. The posture detecting unit F2 may be configured to allow execution of autonomous traveling of the shovel 100 when it is determined that the position of the shovel 100 is in a traveling position.

The intermediate target setting unit F3 is configured to set an intermediate target position with respect to autonomous traveling of the shovel 100 on the traveling target track generated by the traveling target track generating unit F1. When it is determined by the posture detecting unit F2 that the posture of the shovel 100 is in the traveling position and it is determined by the stop determining unit F10 that it is not necessary to stop the shovel 100, a single intermediate target position or a plurality of positions may be set on the traveling target track by the intermediate target setting unit F3. For example, the intermediate target position may be a front and rear position P1 to P3 of FIG. 10B.

The position calculating unit F4 is configured to calculate the present position (for example, an absolute position) of the shovel 100. In the present example, the position calculating unit F4 calculates the present position of the shovel 100 based on the output of the positioning device 73.

The object detecting unit F5 is configured to detect an object around the shovel 100. In the present example, the object detecting unit F5 detects an object around the shovel 100 based on the output of the spatial recognition device 70.

The object determining unit F6 determines an object detected by the object detecting unit F5. For example, when an object to be monitored is detected around the shovel 100 by the object detecting unit F5, the object determining unit F6 may determine the type of the object to be detected. Types of objects include trailers. Thus, the object determining unit F6 can determine whether or not each object detected around the shovel 100 is a trailer from which the shovel 100 is loaded or in which the shovel 100 is going to be loaded. The object determining unit F6 may determine a distance from an object detected around the shovel 100. The object determining unit F6 may determine whether or not an object other than a trailer detected around the shovel 100 is related to the traveling direction of the shovel 100 (the lower traveling structure 1), that is, whether or not an object is present in the traveling direction of the shovel 100.

The relative position calculating unit F7 calculates the relative position of the shovel 100 with respect to a trailer detected around the shovel 100 based on the determination result of the object determining unit F6. Thus, the controller 30 can control the autonomous travel of the lower traveling structure 1 in relation to the loading and unloading operations of the shovel 100 while grasping the position relative to the trailer.

The comparing unit F8 is configured to compare the intermediate target position set by the intermediate target setting unit F3 with the present position (absolute position) of the shovel 100 calculated by the position calculation unit F4 and the relative position of the shovel 100 relative to the trailer calculated by the relative position calculation unit F7.

The abnormality monitoring unit F9 is configured to monitor the abnormality of the shovel 100. Specifically, the degree of abnormality of the shovel 100 may be determined based on the output of the posture detecting unit F2, the output (determination result) of the object determining unit F6, the output of the abnormality detecting sensor 76, or the like.

For example, the abnormality monitoring unit F9 may determine the degree of abnormality of the shovel 100 based on the output of the posture detecting unit F2, specifically, the tilted status of the airframe of the shovel 100. Specifically, the degree of abnormality may be increased as the angle of the shovel 100 increases relative to the traveling direction. Further, the abnormality monitoring unit F9 may increase the degree of abnormality as the amount of tilt of the airframe of the shovel 100 increases relative thereto.

For example, the abnormality monitoring unit F9 may determine the degree of abnormality of the shovel 100 based on the determination result of the object determining unit F6. Specifically, when it is determined that there is an object other than a trailer among the objects detected around the shovel 100 by the object determining unit F6, the degree of abnormality may be relatively high. Further, the object determining unit F6 may determine that the degree of abnormality is relatively high as the distance from the object detected around the shovel 100 is relatively close. In addition, when an object detected around the shovel 100 is present in the traveling direction of the shovel 100 (the lower traveling structure 1), the object determining unit F6 may have a relatively higher degree of abnormality than in other cases.

For example, the abnormality monitoring unit F9 determines the degree of abnormality of the shovel 100 based on the output of the abnormality detecting sensor 76. The abnormality detecting sensor 76 may include at least one of, for example, a sensor for detecting an error in the engine 11, a sensor for detecting an error in relation to the temperature of the hydraulic oil, a sensor for detecting an error in the controller 30, and the like.

The stop determining unit F10 is configured to determine whether or not it is necessary to stop the shovel 100 based on various information. In the present example, the stop determining unit F10 determines whether or not it is necessary to stop the shovel 100 during autonomous traveling based on the output (degree of abnormality) of the abnormality monitoring unit F9. Specifically, the stop determining unit F10 may determine that it is necessary to stop the shovel 100 during autonomous traveling when the degree of abnormality of the shovel 100 determined by the abnormality monitoring unit F9 exceeds a predetermined threshold value. In this case, the stop determining unit F10 may output the stop command to the movement command generating unit F11. Thus, for example, the controller 30 controls the traveling hydraulic oil motor 2M as a traveling actuator to slow down or stop the rotation of the traveling hydraulic oil motor 2M. Meanwhile, for example, when the degree of abnormality of the shovel 100 determined by the abnormality monitoring unit F9 is equal to or less than a predetermined threshold value, the stop determining unit F10 determines that it is not necessary to stop the shovel 100 during autonomous traveling, that is, the autonomous traveling of the shovel 100 can be continued. Further, when a person (an operator) is on board on the shovel 100, the stop determining unit F10 may determine whether or not autonomous traveling is canceled in addition to whether or not it is necessary to stop the shovel 100.

The movement command generating unit F11 is configured to generate a command regarding the movement of the lower traveling structure 1. In the present example, the movement command generating unit F11 generates a command regarding the movement direction and a command regarding the movement speed (hereinafter referred to as a "speed command") based on a comparison result of the comparing unit F8, an output of the stop determining unit F10 (presence or absence of the stop command), or the like. For example, the movement command generating unit F11 may be configured to generate a movement speed command that is larger as the difference between the intermediate target position and the present position of the shovel 100 is larger. The movement command generating unit F11 may be configured to generate a speed command that makes the difference close to zero.

In this manner, the controller 30 performs control over autonomous travel to the final target position, specifically to a predetermined position of the trailer bed (for example, the front and rear position P4 of FIG. 10B), while passing the shovel 100, for example, through the intermediate target position on the target track. The movement command generating unit F11 may change the value of the speed command when it is determined that the shovel 100 is present on a tilted ground based on the previously input information on the terrain and the detected value of the positioning device 73. For example, when it is determined that the shovel 100 is on a downhill slope, the movement command generating unit F11 may generate a speed command value corresponding to a speed that is slower than a normal speed. The movement command generating unit F11 may acquire information about a terrain, such as an inclination of the ground, based on the output of the spatial recognition device 70. In addition, based on the output of the spatial recognition device 70, when it is determined that the surface of the road is larger (for example, when it is determined that a large number of stones are present on the surface of the road), the movement command generating unit F11 may generate a speed command value corresponding to a speed that is slower than the normal speed. As described above, the movement command generating unit F11 may change the value of the speed command based on the information on the acquired road surface on the traveling route. For example, when the shovel 100 moves from sand to gravel in a riverbed, the movement command generating unit F11 may automatically change the value of the speed command. Accordingly, the travel command generating unit F11 can change the travel speed corresponding to the road surface condition. Further, the movement command generating unit F11 may generate a speed command value corresponding to the operation of the attachment. For example, when the shovel 100 is engaged in a slope work (in particular, when the excavation attachment AT is engaged in finishing work from top of the slope to bottom of the slope), the intermediate target setting unit F3 may determine the start of the movement to the next intermediate target position when the bucket 6 has reached the bottom. Therefore, the movement command generating unit F11 can generate the target speed command to the next intermediate target position. When it is determined that the boom 4 has risen to a predetermined height after the bucket 6 has reached the bottom, the intermediate target setting unit F3 may determine the start of the movement to the next intermediate target position. The movement command generating unit F11 may generate a target speed command to the next target position. In this manner, the movement command generating unit F11 may set the speed command value corresponding to the operation of the attachment.

The controller 30 may further include a mode setting section for setting the mode of operation of the shovel 100. In this case, when the crane mode is set as the mode of operation of the shovel 100, or when a slow mode, such as a slow speed high-torque mode, is set, the movement command generating unit F11 generates a speed command value corresponding to the slow mode. As described above, the traveling speed of the movement command generating unit F11 may be changed according to the status of the shovel 100.

The speed calculating unit F12 is configured to calculate the current traveling speed of the shovel 100. In the present example, the speed calculating unit F12 calculates the current traveling speed of the shovel 100 based on the transition of the present position of the shovel 100 calculated by the position calculating unit F4.

The calculation unit CAL is configured to calculate the difference between the speed corresponding to the speed command generated by the movement command generating unit F11 and the current speed of the shovel 100 calculated by the speed calculation unit F12.

The speed limiting unit F13 is configured to limit the traveling speed of the shovel 100. In the present example, when the speed difference calculated by the calculation unit CAL exceeds the limit value, the speed limiting unit F13 outputs the limit value instead of the speed difference. When the speed difference calculated by the calculation unit CAL is equal to or less than the limit value, the speed limiting unit F13 is configured to output the speed difference directly. The limit may be a pre-registered value or a dynamically calculated value.

The flow command generating unit F14 is configured to generate a command regarding the flow rate of the hydraulic oil supplied from the main pump 14 to the traveling hydraulic oil motor 2M. In this example, the flow command generating unit F14 generates the flow command based on the speed difference output by the speed limiting unit F13. Basically, the flow command generating unit F14 may be configured to generate a flow command having a larger speed difference thereof. The flow command generating unit F14 may be configured to generate the flow command for bringing the speed difference calculated by the calculation unit CAL close to zero.

The flow command generated by the flow command generating unit F14 is a current command for the proportional valves 31EL, 31ER, 31FL, 31FR, 33EL, 33ER, 33FL, and 33FR. The proportional valves 31EL, 31ER, 33EL, 33ER operate in response to their current commands to vary the pilot pressure acting on the pilot port of the control valve 171. Therefore, the flow rate of the hydraulic oil flowing into the traveling hydraulic oil motor 2ML is adjusted to be the flow rate corresponding to the flow rate command generated by the flow command generating unit F14. The proportional valves 31FL, 31FR, 33FL, and 33FR also operate in response to their current commands to vary the pilot pressure acting on the pilot port of the control valve 172.

Therefore, the flow rate of the hydraulic oil flowing into the traveling hydraulic oil motor 2MR is adjusted to be the flow rate corresponding to the flow rate command generated by the flow command generating unit F14. As a result, the traveling speed of the shovel 100 is adjusted to be the traveling speed corresponding to the speed command generated by the movement command generating unit F11. The velocity of the shovel 100 is a concept that includes the traveling direction. The traveling direction of the shovel 100 is determined based on the rotation speed and rotation direction of the traveling hydraulic oil motor 2ML and the rotation speed and rotation direction of the traveling hydraulic oil motor 2MR.

The present example describes that the flow command generated by the flow command generating unit F14 is output to the proportional valves 31EL, 31ER, 31FL, 31FR, 33EL, 33ER, 33FL, and 33FR. However, the controller 30 is not limited to this configuration. For example, usually, during the operation of the shovel 100, no other actuators other than the traveling hydraulic oil motor 2M, such as the boom cylinder 7 and the like, are operated. Therefore, the flow command generated by the flow command generating unit F14 may be output to the regulator 13 of the main pump 14. In this case, the controller 30 can control the traveling operation of the shovel 100 by controlling the discharge amount of the main pump 14. The controller 30 may control the steering of the shovel 100 by controlling each of the regulators 13L and 13R, that is, by controlling the discharge amount of each of the main pumps 14L and 14R. Further, the controller 30 may control the operation by controlling the amount of hydraulic oil supplied to each of the hydraulic oil motors 2ML and 2MR by the proportional valves 31EL, 31ER, 31FL, 31FR, 33EL, 33ER, 33FL, and 33FR, and control the speed by controlling the regulator 13.

In this manner, the controller 30 can achieve autonomous travel of the shovel 100 between the present position and the target position of the trailer bed.

An Att target track generating unit F15 is configured to generate a target track at the distal end of the attachment, that is, the working portion (for example, the claw tip) of the bucket 6. For example, the target track generating unit F15 may generate the track to be followed by the claw of the bucket 6 and the like as the target track based on the posture of the shovel 100, the present position of the shovel 100, the position relative to the trailer of the shovel 100, and the determination result regarding the object detected around the shovel 100. This allows the controller 30 to generate a target track for the working portion of the attachment that does not come into contact with the trailer and the like when, for example, the upper turning structure 3 is turned over the trailer bed. The Att target track generating unit F15 may set a tolerance range for the target track of the front end (the working portion of the bucket 6) of the generated attachment.

A present claw tip position calculating unit F16 is configured to calculate the present claw tip position of the bucket 6. The present claw tip position calculating unit F16 may calculate the coordinate point of the claw tip of the bucket 6 as the present claw tip position based on, for example, the output of the posture detecting unit F2 (for example, boom angle $\beta_1$, arm angle $\beta_2$, bucket angle $\beta_3$, and turning angle $\alpha_1$), the present position of the shovel 100, and the position relative to the trailer of the shovel 100.

A next claw tip position calculating unit F17 is configured to calculate the target next claw tip position on the target track of the claw tip of the bucket 6. In the present example, the next claw tip position calculating unit F17 calculates the claw tip position after a predetermined time as the target claw tip position based on the detail of the operation command corresponding to the autonomous operation function, the target track generated by the Att target track generating unit F15, and the present claw tip position calculated by the present claw tip position calculating unit F16.

A next claw tip position calculating unit F17 may determine whether or not the deviation between the present claw tip position and the target track of the claw tip of the bucket 6 is within an acceptable range. In the present example, the next claw tip position calculating unit F17 determines whether or not the distance between the current claw tip position and the target track of the claw tip of the bucket 6 is equal to or less than a predetermined value. When the distance is equal to or less than a predetermined value, the next claw tip position calculating unit F17 determines that the deviation is within an acceptable range and calculates the target claw tip position. In contrast, when the distance exceeds the predetermined value, the next claw tip position calculating unit F17 determines that the deviation does not fall within the acceptable range and decelerates or stops the movement of the actuator regardless of the operation command corresponding to the autonomous operation function. Thus, the controller 30 prevents the execution of autonomous control from continuing while the claw tip position is out of the target track.

A claw tip speed command value generating unit F18 is configured to generate a command value related to the claw tip speed. In the present example, based on the present claw tip position calculated by the present claw tip position calculating unit F16 and the next claw tip position calculated by the next claw tip position calculating unit F17, the claw tip speed required to move the current claw tip position to the next claw tip position at a predetermined time is calculated as a command value concerning the claw tip speed.

A claw tip speed command value limiting unit F19 is configured to limit the command value related to the claw tip speed. In the present example, when it is determined that the distance between the claw tip of the bucket 6 and the predetermined object is less than the predetermined value based on the present claw tip position calculated by the claw tip position calculating unit F16 and the output of the object determining unit F6, the claw tip speed command value limiting unit F19 limits the command value concerning the claw tip speed by the predetermined upper limit value. This allows the controller 30 to decelerate the claw tip speed when the claw tip is in proximity to an object around the shovel 100.

A command value calculating unit F20 is configured to calculate a command value for operating the actuator. In this example, in order to move the present claw tip position to the target claw tip position, the command value calculating unit F20 calculates a command value $\beta_{1r}$ for the boom angle $\beta_1$, a command value $\beta_{2r}$ for the arm angle $\beta_2$, a command value $\beta_{3r}$ for the bucket angle $\beta_3$, and a command value $\beta_{3r}$ for the turning angle $\alpha_1$ based on the target claw tip position calculated by the next claw tip position calculating unit F17.

A boom current command generating unit F21, an arm current command generating unit F31, a bucket current command generating unit F41, and a turning current command generating unit F51 are configured to generate a current command output to the proportional valves 31 and 33. In this example, the boom current command generating unit F21 outputs a boom current command to the proportional valves 31BL and 31BR corresponding to the control valve 175. The arm current command generating unit F31 outputs an arm current command to the proportional valves 31AL and 31AR corresponding to the control valve 176. The bucket current command generating unit F41 outputs a bucket current command to the proportional valves 31CL and 31CR corresponding to the control valve 174. The turning current command generating unit F51 outputs a turning current command to the proportional valves 31DL and 31DR corresponding to the control valve 173. The boom current command generating unit F21, the arm current command generating unit F31, the bucket current command generating unit F41, and the turning current command generating unit F51 may output a decompression command for depressurizing the pilot pressure output from the operating device 26 to a corresponding proportional valve 33, respectively.

A boom spool displacement amount calculating unit F22, an arm spool displacement amount calculating unit F32, a bucket spool displacement amount calculating unit F42, and a turning spool displacement amount calculating unit F52 are configured to calculate the displacement amount of the spool constituting the spool valves. In the present example, the boom spool displacement amount calculating unit F22 calculates a displacement amount of the boom spool constituting the control valve 175 with respect to the boom cylinder 7 based on the output of a boom spool displacement sensor S7. The arm spool displacement amount calculating unit F32 calculates the displacement amount of the arm spool constituting the control valve 176 with respect to the arm cylinder 8 based on the output of an arm spool displacement sensor S8. The bucket spool displacement amount calculating unit F42 calculates the displacement amount of the bucket spool constituting the control valve 174 with respect to the bucket cylinder 9 based on the output of a bucket spool displacement sensor S9. The turning spool displacement amount calculating unit F52 calculates the displacement amount of the turning spool constituting the control valve 173 with respect to the turning hydraulic oil motor 2A based on an output of the turning spool displacement sensor S2A.

The boom angle calculating unit F23, the arm angle calculating unit F33, the bucket angle calculating unit F43, and the turning angle calculating unit F53 are configured to calculate the rotation angle (posture angle) of the boom 4, the arm 5, the bucket 6, and the upper turning structure 3. In the present example, the boom angle calculating unit F23 calculates the boom angle $\beta_1$ based on the output of the boom angle sensor S1. The arm angle calculating unit F33 calculates the arm angle $\beta_2$ based on the output of the arm angle sensor S2. The bucket angle calculating unit F43 calculates the bucket angle $\beta_3$ based on the output of the bucket angle sensor S3. The turning angle calculating unit F53 calculates the turning angle $\alpha_1$ based on the output of the turning status sensor S5. That is, the boom angle calculating unit F23, the arm angle calculating unit F33, the bucket angle calculating unit F43, and the turning angle calculating unit F53 are included in the posture detecting unit F2, and the calculating result (the boom angle $\beta_1$, the arm angle $\beta_2$, the bucket angle $\beta_3$, and the turning angle $\alpha_1$) may be output to the present claw tip position calculating unit F16.

The boom current command generating unit F21 basically generates a boom current command to the proportional valve 31 so that the difference between the command value $\beta_{1r}$ generated by the command value calculating unit F20 and the boom angle $\beta_1$ calculated by the boom angle calculating unit F23 is zero. At that time, the boom current command generating unit F21 adjusts the boom current command so that the difference between the target boom spool displacement amount derived from the boom current command and the boom spool displacement amount calculated by the boom spool displacement amount calculating unit F22 is zero. The boom current command generating unit F21 outputs the boom current command after adjustment to the proportional valve 31 corresponding to the control valve 175.

The proportional valves 31BL and 31BR corresponding to the control valve 175 vary the opening area in response to the boom current command to apply the pilot pressure corresponding to the size of the opening area to the pilot port of the control valve 175. The control valve 175 moves the boom spool in response to pilot pressure to allow hydraulic oil to flow into the boom cylinder 7. The boom spool displacement sensor S7 detects a displacement amount of the boom spool and feeds the detection result back to the boom spool displacement amount calculating unit F22 of the controller 30. The boom cylinder 7 is extended or contracted in response to the inflow of hydraulic oil to move the boom 4 up and down. The boom angle sensor S1 detects the turning angle of the vertically moving boom 4 and feeds the detection result back to the boom angle calculating unit F23 of the controller 30. The boom angle calculating unit F23 feeds the calculated boom angle $\beta_1$ back to the boom current command generating unit F21.

The arm current command generating unit F31 basically generates an arm current command to the proportional valve 31 so that the difference between the command value $\beta_{2r}$ generated by the command value calculating unit F20 and the arm angle $\beta_2$ calculated by the arm angle calculating unit F33 is zero. At this time, the arm current command generating unit F31 adjusts the arm current command so that the difference between the target arm spool displacement amount derived from the arm current command and the arm spool displacement amount calculated by the arm spool displacement amount calculating unit F32 is zero. The arm current command generating unit F31 outputs the adjusted arm current command to the proportional valve 31 corresponding to the control valve 176.

The proportional valves 31AL and 31AR corresponding to the control valve 176 vary the opening area in response to an arm current command to apply a pilot pressure corresponding to the size of the opening area to the pilot port of the control valve 176. The control valve 176 moves the arm spool in response to pilot pressure to allow hydraulic oil to flow into the arm cylinder 8. The arm spool displacement sensor S8 detects the displacement of the arm spool and feeds the detection result back to the arm spool displacement amount calculating unit F32 of the controller 30. The arm cylinder 8 expands and contracts in response to the inflow of hydraulic oil to open and close the arm 5. The arm angle sensor S2 detects the rotation angle of the opening and closing arm 5 and feeds the detection result back to the arm angle calculating unit F33 of the controller 30. The arm angle calculating unit F33 feeds back the calculated arm angle $\beta_2$ to the arm current command generating unit F31.

The bucket current command generating unit F41 basically generates a bucket current command to the proportional valve 31 corresponding to the control valve 174 so that the difference between the command value $\beta_{3r}$ generated by the command value calculating unit F20 and the bucket angle $\beta_3$ calculated by the bucket angle calculating unit F43 is zero. At that time, the bucket current command generating unit F41 adjusts the bucket current command so that the difference between the target bucket spool displacement amount derived from the bucket current command and the bucket spool displacement amount calculated by the bucket spool displacement amount calculating unit F42 is zero. The bucket current command generating unit F41 outputs the bucket current command after adjustment to the proportional valve 31 corresponding to the control valve 174.

The proportional valves 31CL and 31CR corresponding to the control valve 174 vary the opening area in response to a bucket current command to apply a pilot pressure corresponding to the size of the opening area to the pilot port of the control valve 174. The control valve 174 moves the bucket spool in response to pilot pressure to allow hydraulic oil to flow into the bucket cylinder 9. The bucket spool displacement sensor S9 detects the displacement of the bucket spool and feeds the detection result back to the bucket spool displacement amount calculating unit F42 of the controller 30. The bucket cylinder 9 extends and contracts in response to the inflow of hydraulic oil to open and close the bucket 6. The bucket angle sensor S3 detects the rotation angle of the opening and closing bucket 6 and feeds the detection result back to the bucket angle calculating unit F43 of the controller 30. The bucket angle calculation unit F43 feeds the calculated bucket angle $\beta_3$ back to the bucket current command generation unit F41.

The turning current command generating unit F51 basically generates a turning current command for the proportional valve 31 corresponding to the control valve 173 so that the difference between the command value $\alpha_{1r}$ generated by the command value calculating unit F20 and the turning angle $\alpha_1$ calculated by the turning angle calculating unit F53 becomes zero. At this time, the turning current command generating unit F51 adjusts the turning current command so that the difference between the target turning spool displacement amount derived from the turning current command and the turning spool displacement amount calculated by the turning spool displacement amount calculating unit F52 is zero. The turning current command generating unit F51 outputs the turning current command after adjustment to the proportional valve 31 corresponding to the control valve 173.

The proportional valves 31DL and 31DR corresponding to the control valve 173 vary the opening area in response to a turning current command to apply a pilot pressure corresponding to the size of the opening area to the pilot port of the control valve 173. The control valve 173 moves the turning spool in response to pilot pressure to allow hydraulic oil to flow into the turning hydraulic oil motor 2A. The turning spool displacement sensor S2A detects the displacement of the turning spool and feeds the detection result back to the turning spool displacement amount calculating unit F52 of the controller 30. The turning hydraulic oil motor 2A turns in response to the inflow of hydraulic oil to turn the upper turning structure 3. The turning status sensor S5 detects the turning angle of the upper turning structure 3 and feeds the detection result back to the turning angle calculating unit F53 of the controller 30. The turning angle calculating unit F53 feeds the calculated turning angle $\alpha_1$ back to the turning current command generating unit F51.

As such, the controller 30 forms a three-stage feedback loop for each working portion. That is, the controller 30 constitutes a feedback loop for spool displacement amount, a feedback loop for rotation angle of the working portion, and a feedback loop for the claw tip position. Accordingly, the controller 30 can control the movement of the working portion (for example, the claw tip) of the bucket 6 with high accuracy to achieve predetermined operations of the upper turning structure 3 and the attachment AT (for example, a change in orientation of the attachment on the trailer bed and the like) associated with the loading or unloading operation of the shovel 100.

Other Examples of Support Systems

Figure 12:
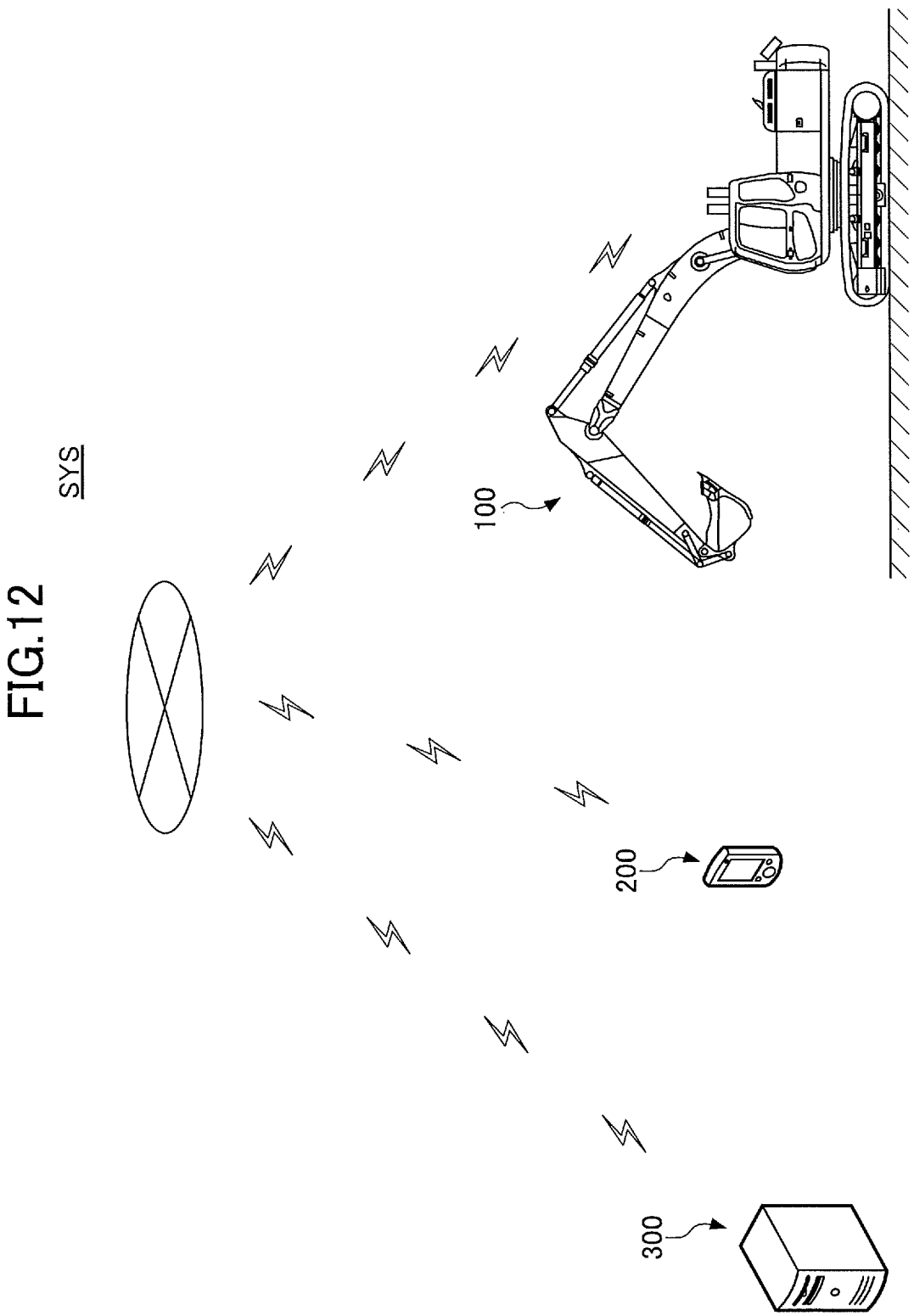
FIG. 12 is a schematic diagram illustrating another example of a configuration of the support system.

Referring to FIG. 12, another example of a support system SYS will be described.

FIG. 12 is a schematic diagram illustrating another example of a support system SYS. The support system SYS is a system that manages one shovel 100 or a plurality of shovels 100.

As illustrated in FIG. 12, the support system SYS includes the shovel 100, the support device 200, and the management device 300. That is, the support system SYS in this example differs from the above example in that it further includes the management device 300.

The information obtained by the shovel 100 may be shared with the administrator and other operators of the shovel through the support system SYS. Each of the shovel 100, the support device 200, and the management device 300 including the support system SYS may be a single unit or multiple units. In this example, the support system SYS includes one shovel 100, one support device 200, and one management device 300.

The support device 200, like the above example, is typically a portable terminal device, such as a laptop computer terminal, a tablet terminal, or a smartphone carried by a worker or the like at a construction site. The support device 200 may be a portable terminal carried by an operator of the shovel 100. The support device 200 may be a fixed terminal device.

The management device 300 is typically a fixed terminal device, for example, a server computer (so-called cloud server) provided in a management center or the like outside a construction site. The management device 300 may be, for example, an edge server provided at a construction site. The management device 300 may also be a portable terminal device (for example, a laptop computer terminal, a tablet terminal, a portable terminal such as a smartphone, and the like).

At least one of the support device 200 and the management device 300 may include a monitor and a remote-control device. In this case, an operator using the support device 200 or the management device 300 may operate the shovel 100 while using the remote-control device. That is, in the present embodiment, the management device 300 may transmit an automatic loading instruction or an automatic unloading instruction to the shovel 100 to allow the shovel 100 to perform loading and unloading operations automatically (autonomously). The remote-control device is communicatively connected to the controller 30 mounted on the shovel 100 via, for example, a wireless communication network, such as a short-range wireless communication network, a mobile telephone communication network, a satellite communication network, and the like.

The various information images displayed on the display device 40 disposed in the cabin 10 (for example, image information showing the surrounding of the shovel 100, various setting screens and the like) may be displayed by a display device connected to at least one of the support device 200 and the management device 300. The image information surrounding the shovel 100 may be generated based on the image in the image device included in the spatial recognition device 70. Accordingly, a person who uses the support device 200 or an administrator who uses the management device 300 may remotely control the shovel 100 or make various settings regarding the shovel 100 while checking the surroundings of the shovel 100.

For example, in the support system SYS, the controller 30 of the shovel 100 may transmit information of at least one of the target routes used to autonomously move the shovel 100 (for example, during loading and unloading operation into and from the trailer by autonomous traveling) and the path actually tracked by a predetermined portion during autonomous traveling to at least one of the support device 200 and the management device 300. In this case, the controller 30 may transmit the output of the spatial recognition device 70 (for example, the image of the imaging device) to at least one of the support device 200 and the management device 300. The image may be a plurality of images captured during autonomous traveling. Additionally, the controller 30 may transmit information to at least one of the support device 200 and the management device 300, such as data about the operation of the shovel 100 during autonomous traveling, data about the posture of the shovel 100, and data about the posture of the excavation attachment. Thus, a worker using the support device 200 or an administrator using the management device 300 can obtain information about the shovel 100 during autonomous traveling.

Thus, the support system SYS can cause at least one of the support device 200 and the management device 300 to transmit automatic loading and unloading commands to the shovel 100 and allow the shovel 100 to automatically (autonomously) perform loading and unloading operations on and from the trailer. In addition, the support system SYS enables information about the shovel 100 to be acquired during autonomous traveling to be shared with the administrator and other operators of the shovel.

Deformation and Change

While the embodiments of the invention have been described in detail above, the invention is not limited to such specific embodiments, and various modifications and variations are possible within the scope of the invention as defined in the appended claims.

For example, in the above-described embodiment, the shovel 100 was configured to hydraulically drive all of various operating elements such as the lower traveling structure 1, the upper turning structure 3, the boom 4, the arm 5, and the bucket 6, but a portion of the shovel 100 may be electrically driven. That is, the configuration and the like disclosed in the above-described embodiments may be applied to a hybrid shovel, an electric shovel, and the like.

What is claimed is:

1. An excavator comprising:
a lower traveling structure;
an upper turning structure which is turnably mounted to the lower traveling structure;
an attachment mounted on the upper turning structure;
a sensor configured to recognize an object in a three-dimensional space around the excavator; and
a processing circuitry provided in the upper turning structure and configured to, upon receipt of a predetermined command from an external device, perform a control of automatically causing the lower traveling structure to travel either toward a bed of a trailer or from the bed to a rear area of the trailer,
wherein the processing circuitry is further configured to transmit a command to the external device, the command requesting the external device to display, in a form of a plurality of steps, a plurality of icons including respective texts corresponding to a plurality of different operations that are performed during the control of automatically causing the lower traveling structure to travel, and to indicate, with a cursor, one of the plurality of different operations that is currently in execution, the plurality of different operations include
determining whether a ramp plate is installed at a rear of the trailer,
determining, while the excavator is not on the ramp plate, whether a horizontal level of the ramp plate extending from the rear of the trailer onto ground satisfies a predetermined standard, based on an output of the sensor, and
starting automatically causing the lower traveling structure to travel either toward the bed of the trailer or from the bed to the rear area of the trailer, in response to determining that the ramp plate is installed at the rear of the trailer and that the horizontal level of the ramp plate satisfies the predetermined standard,
the texts corresponding to the plurality of different operations include a text indicating an operation of said determining, while the excavator is not on the ramp plate, whether the horizontal level of the ramp plate extending from the rear of the trailer onto the ground satisfies the predetermined standard, based on the output of the sensor, and
the command further requests the external device to display an operation area for transmitting the predetermined command to the excavator separately from an operation status information area in which the plurality of icons, the texts, and the cursor are displayed, the operation area including an upward arrow icon, a downward arrow icon, and directional information in text form indicating that the upward arrow icon indicates a direction toward the trailer, the upward arrow icon being configured to be operated to transmit the predetermined command to cause the processing circuitry to perform the control of automatically causing the lower traveling structure to travel toward the bed of the trailer, the downward arrow icon being configured to be operated to transmit the predetermined command to cause the processing circuitry to perform the control of automatically causing the lower traveling structure to travel toward the rear area of the trailer.

2. The excavator according to claim 1, wherein the processing circuitry is further configured to detect the trailer based on the output of the sensor.

3. The excavator according to claim 1, wherein the processing circuitry is further configured to detect the trailer based on an external signal.

4. The excavator according to claim 1, wherein the processing circuitry is further configured to evaluate a stability of the excavator when the lower traveling structure automatically travels under own control, and to output alert information indicating that the excavator is unstable when the stability falls below another predetermined standard.

5. The excavator according to claim 1, wherein the processing circuitry is further configured to determine a presence or absence of a first obstacle in a traveling path from a position of the excavator to a predetermined position on the bed of the trailer when the trailer is behind the excavator, and to determine a presence or absence of a second obstacle in the traveling path from the position of the excavator to the predetermined position in the rear area of the trailer when the excavator is on the bed of the trailer.

6. The excavator according to claim 1, wherein the processing circuitry is further configured to transmit, to the external device, a command for displaying a traveling path on a display unit of the external device.

7. The excavator according to claim 1, further comprising:

a plurality of actuators including a traveling actuator configured to drive the lower traveling structure and a turning actuator configured to drive the upper turning structure, wherein the processing circuitry is further configured to stop the actuators prior to a start of operation of the actuators when it is determined that a person is within a predetermined range from the excavator based on the output of the sensor.

8. The excavator according to claim 1, further comprising:

a plurality of actuators including a traveling actuator configured to drive the lower traveling structure and a turning actuator configured to drive the upper turning structure, wherein the processing circuitry is further configured to disable the actuators prior to a start of operation of the actuators when it is determined that a person is within a predetermined range from the excavator based on the output of the sensor, even when the predetermined command is received.

9. The excavator according to claim 1, wherein the processing circuitry is further configured to determine whether the ramp plate is installed at the rear of the trailer, determine, while the excavator is not on the ramp plate, whether the horizontal level of the ramp plate extending from the rear of the trailer onto the ground satisfies the predetermined standard, based on the output of the sensor, start automatically causing the lower traveling structure to travel either toward the bed of the trailer or from the bed to the rear area of the trailer, in response to determining that the ramp plate is installed at the rear of the trailer and that the horizontal level of the ramp plate satisfies the predetermined standard, and stop said automatically causing the lower traveling structure to travel, in response to determining that the ramp plate is not installed at the rear of the trailer, that the horizontal level of the ramp plate does not satisfy the predetermined standard, or that stability of posture of the excavator is below another predetermined standard, after starting said automatically causing the lower traveling structure to travel.

10. The excavator as claimed in claim 1, wherein the command further requests the external device to display, on a same screen as the operation area and the operation status information area, a traveling path information area configured by a bird's-eye view image of an entirety of a traveling path from a position of the excavator to a loading target position on the bed of the trailer or an unloading target position in the rear area of the trailer as viewed from directly above the traveling path, the bird's-eye view image including an image of the trailer and an image of the ramp plate.

11. A control device for an excavator, the excavator including a lower traveling structure, an upper turning structure turnably mounted on the lower traveling structure, a sensor configured to recognize an object in a three-dimensional space around the excavator, and an attachment mounted on the upper turning structure, the control device comprising:

a processing circuitry configured to, upon receipt of a predetermined command from a predetermined external device, perform a control of automatically causing the lower traveling structure to travel either toward a bed of a trailer or from the bed to a rear area of the trailer, wherein the processing circuitry is further configured to transmit a command to the external device, the command requesting the external device to display, in a form of a plurality of steps, a plurality of icons including respective texts corresponding to a plurality of different operations that are performed during the control of automatically causing the lower traveling structure to travel, and to indicate, with a cursor, one of the plurality of different operations that is currently in execution, the plurality of different operations include determining whether a ramp plate is installed at a rear of the trailer, determining, while the excavator is not on the ramp plate, whether a horizontal level of the ramp plate extending from the rear of the trailer onto ground satisfies a predetermined standard, based on an output of the sensor, and starting automatically causing the lower traveling structure to travel either toward the bed of the trailer or from the bed to the rear area of the trailer, in response to determining that the ramp plate is installed at the rear of the trailer and that the horizontal level of the ramp plate satisfies the predetermined standard, the texts corresponding to the plurality of different operations include a text indicating an operation of said determining, while the excavator is not on the ramp plate, whether the horizontal level of the ramp plate extending from the rear of the trailer onto the ground satisfies the predetermined standard, based on the output of the sensor, and the command further requests the external device to display an operation area for transmitting the predetermined command to the control device separately from an operation status information area in which the plurality of icons, the texts, and the cursor are displayed, the operation area including an upward arrow icon, a downward arrow icon, and directional information in text form indicating that the upward arrow icon indicates a direction toward the trailer, the upward arrow icon being configured to be operated to transmit the predetermined command to cause the processing circuitry to perform the control of automatically causing the lower traveling structure to travel toward the bed of the trailer, the downward arrow icon being configured to be operated to transmit the predetermined command to cause the processing circuitry to perform the control of automatically causing the lower traveling structure to travel toward the rear area of the trailer.

12. The control device as claimed in claim 11, wherein the command further requests the external device to display, on a same screen as the operation area and the operation status information area, a traveling path information area configured by a bird's-eye view image of an entirety of a traveling path from a position of the excavator to a loading target position on the bed of the trailer or an unloading target position in the rear area of the trailer as viewed from directly above the traveling path, the bird's-eye view image including an image of the trailer and an image of the ramp plate.

* * * * *